(12) United States Patent
Yamazaki

(10) Patent No.: US 8,891,128 B2
(45) Date of Patent: Nov. 18, 2014

(54) DEFECTIVE RECORDING ELEMENT DETECTING APPARATUS AND METHOD, AND IMAGE FORMING APPARATUS AND METHOD

(75) Inventor: Yoshirou Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 517 days.

(21) Appl. No.: 13/328,641

(22) Filed: Dec. 16, 2011

(65) Prior Publication Data

US 2012/0154837 A1   Jun. 21, 2012

(30) Foreign Application Priority Data

Dec. 17, 2010   (JP) .................................. 2010-282273

(51) Int. Cl.
| | |
|---|---|
| H04N 1/60 | (2006.01) |
| H04N 1/46 | (2006.01) |
| G06K 15/10 | (2006.01) |
| B41J 29/38 | (2006.01) |
| B41J 2/205 | (2006.01) |
| B41J 29/393 | (2006.01) |
| B41J 2/21 | (2006.01) |

(52) U.S. Cl.
CPC .............. B41J 2/2142 (2013.01); B41J 2/2146 (2013.01)
USPC ............... 358/1.9; 358/504; 358/1.8; 347/14; 347/15; 347/19

(58) Field of Classification Search
USPC .................... 358/1.9, 504, 1.8; 347/14, 15, 19
See application file for complete search history.

(56) References Cited

U.S. PATENT DOCUMENTS

| | | |
|---|---|---|
| 2007/0040878 A1 | 2/2007 | Ikefuji et al. |
| 2010/0238459 A1 | 9/2010 | Yamazaki |

FOREIGN PATENT DOCUMENTS

| | | |
|---|---|---|
| JP | 5-301426 A | 11/1993 |
| JP | 2000-221424 A | 8/2000 |
| JP | 2007-54970 A | 3/2007 |
| JP | 2010-221494 A | 10/2010 |

Primary Examiner — Charlotte M Baker
(74) Attorney, Agent, or Firm — Birch, Stewart, Kolasch & Birch, LLP

(57) ABSTRACT

A defective recording element detecting apparatus includes: a read image data acquiring device which acquires read image data of a test pattern recorded on a recording medium by a recording head having recording elements; a reference area setting device which sets a reference area including a part of the test pattern on a read image representing image contents of the read image data; a comparison area setting device which sets a comparison area on the read image; a correlation operation device which performs a correlation operation between the comparison area and the reference area; a distortion correction value determining device which determines a distortion correction value, from a result of the correlation operation; an image distortion correcting device which corrects image distortion of the read image using the distortion correction value; and a defective recording element determining device which identifies a defective recording element according to the corrected read image.

11 Claims, 34 Drawing Sheets

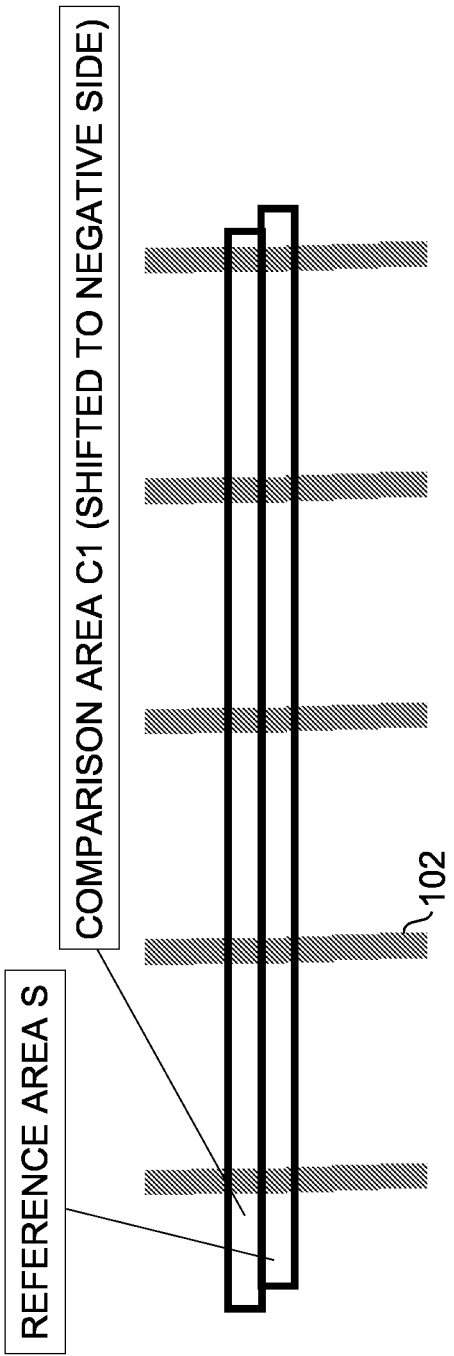
FIG.21A
FIG.21B

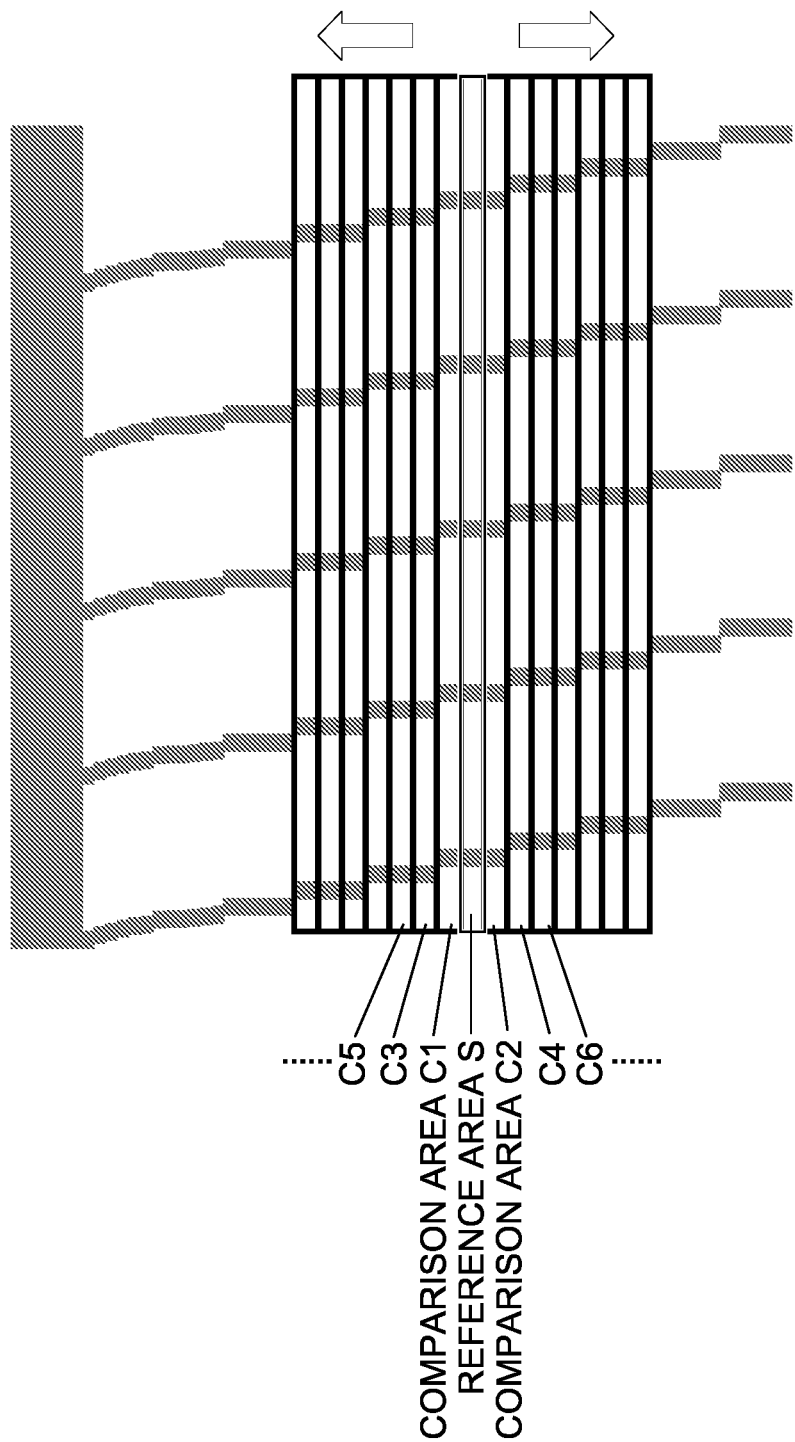

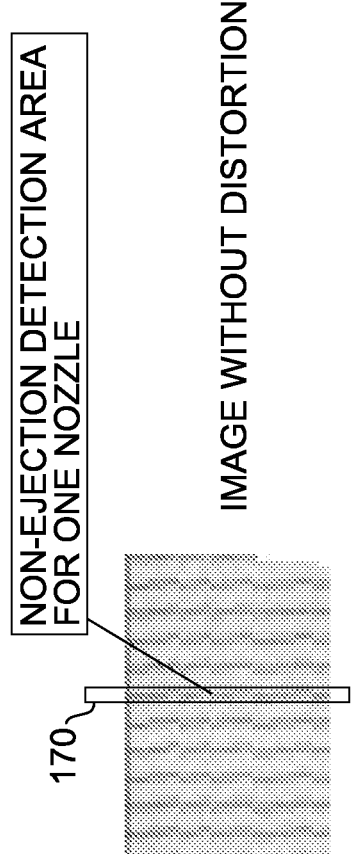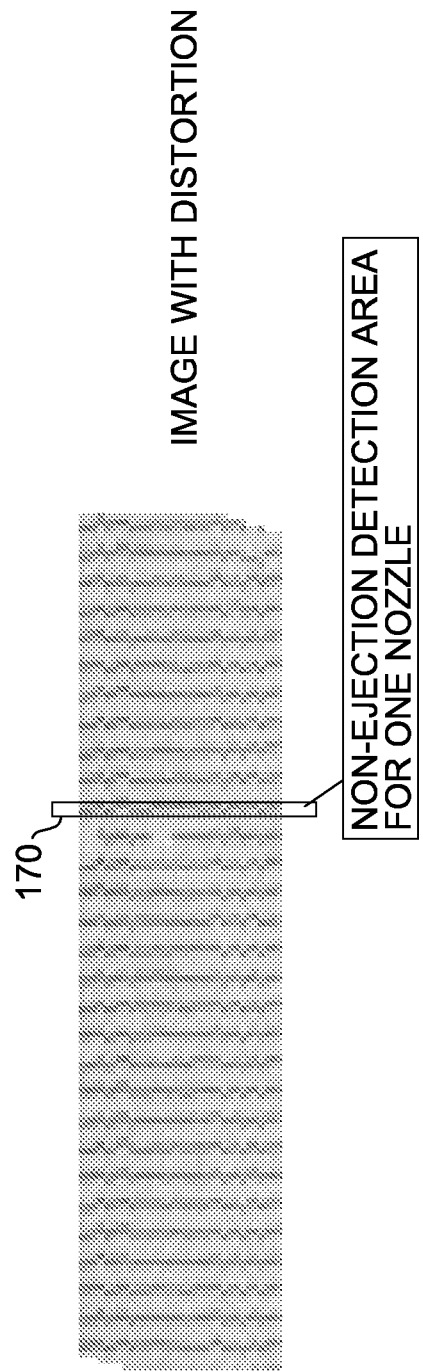
FIG.25A
FIG.25B

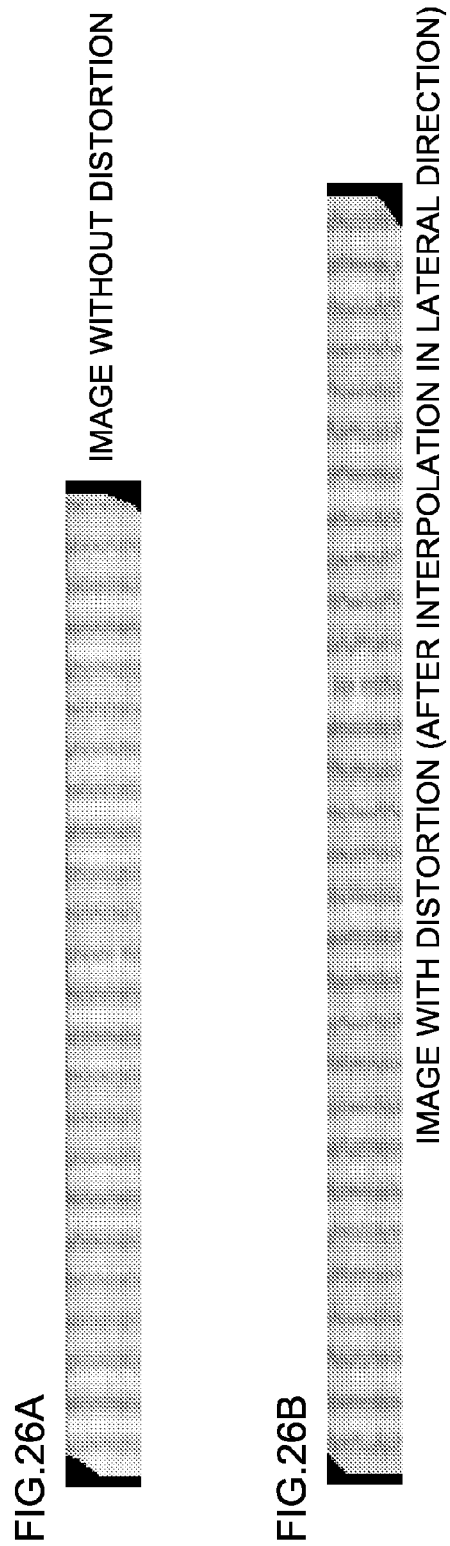

DEFECTIVE RECORDING ELEMENT DETECTING APPARATUS AND METHOD, AND IMAGE FORMING APPARATUS AND METHOD

BACKGROUND OF THE INVENTION

1. Field of the Invention

The present invention relates to a detection technique of identifying a defective recording element among a plurality of recording elements in a recording head (for example, an inkjet head) by means of a result of test pattern recording by the recording head, and an image forming technique to which the detection technique is applied.

2. Description of the Related Art

Methods of recording an image on a recording medium such as a sheet of recording paper (hereinafter referred to as a "recording sheet") include an inkjet image forming system in which ink droplets are ejected from a recording head in accordance with an image signal and the ejected ink droplets are deposited onto the recording medium. An example of an image forming apparatus using such an inkjet image forming system is a full-line head image forming apparatus in which an ejection unit (including a plurality of nozzles) that ejects ink droplets is linearly disposed correspondingly to an entire range of one side of a recording medium, and the recording medium is conveyed in a direction perpendicular to the ejection unit in order to enable an image to be recorded on an entire area of the recording medium. Since the full-line head image forming apparatus is capable of forming an image on an entire area of a recording medium by conveying the recording medium without moving the ejection unit, the full-line head image forming apparatus is suitable for increasing recording speed.

However, with a full-line head image forming apparatus, an actual dot position that is actually recorded on a recording medium can be rendered deviated from an ideal dot position due to various reasons such as production tolerance, deterioration with age, or the like of recording elements (including nozzles) constituting the ejection unit, and the deviation causes a recording position error (droplet deposition position error). As a result, a problem arises in that streaky artifacts occur in an image recorded on the recording medium. In addition to artifacts due to such a recording position error, there are phenomena in which streaky artifacts occur in an image recorded on the recording medium due to failures in a recording element such as an abnormality in which droplets are not ejected (non-ejection), an abnormality in ejection volume, and an abnormality in ejection shape (e.g., splash). Such recording elements which cause a decline in recording quality are collectively referred to as "defective nozzles" or "defective recording elements".

Since a length of a full-line recording head is equivalent to a width of a recording sheet, for example, when recording resolution is 1200 DPI (dots per inch), recording elements of an apparatus capable of accommodating a recording sheet having a width similar to that of half Kiku size (636 mm by 469 mm) number approximately 30,000 nozzles per ink. With such a large number of recording elements, defective nozzles can occur at various timings. More specifically, a nozzle can become defective at the time of manufacture of a recording head, a nozzle can become defective due to deterioration with age, a nozzle can become defective during maintenance (when a nozzle suffers maintenance-induced defectiveness, the nozzle is often restored by a next maintenance), and a nozzle can become defective midway through continuous printing.

A technique is known in which, when a defective nozzle occurs, usage of the defective nozzle is suspended (ejection suspension) and other surrounding nozzles capable of normal ejection are used in order to correct an image. When applying such a correction technique, it is important to accurately identify the defective nozzle.

As techniques for identifying defective nozzles, Japanese Patent Application Publication Nos. 2007-054970, 2000-221424 and 05-301426 describe methods of identifying defective nozzles by printing predetermined test patterns aimed at detection of defective nozzles, reading a printing result with an image reading device, and analyzing read image data obtained.

Japanese Patent Application Publication No. 2007-054970 describes a technique involving using a scanner that reads at a lower resolution than a resolution of a recording head and interpolating with respect to read data to detect a defective nozzle. However, the publication does not make any mention of distortion of a read image and a problem and a solution of image distortion. Moreover, with the technique described in the publication, a sufficiently accurate detection result cannot be obtained under a condition where a width of a line formed by dots on a test pattern does not satisfy a sampling theorem, since a certain amount of error (an estimation error of a line profile formed by dots) remains on an identified line position.

Japanese Patent Application Publication No. 2000-221424 describes a technique in which an image fluctuation correction pattern is disposed additionally and adjacently to a detection pattern in order to correct a read image fluctuation. However, disposing the correction pattern additionally to the detection pattern as described in the publication increases used area in the recording sheet and problematically increases area in the recording sheet that is worthless from a user's perspective. Moreover, the publication does not make any mention of an issue as to whether or not distortion of a read image necessitates correction of the image structure.

Japanese Patent Application Publication No. 05-301426 describes in paragraph 0037 that an output of a sensor is subjected to output correction or so-called shading correction by assuming that a recording material prior to pattern printing is a white level, but does not make any mention of a technique for acquiring shading correction data from a read image of a pattern to perform correction.

<Problems in Analyzing a Read Image>

When reading a test pattern printing result with an image reading device such as a scanner and analyzing the read image data, a distorted image of the test pattern can sometimes be read during acquisition of the read image data.

For example, the following phenomena (1) to (3) occur in an inkjet printing apparatus adopting a conveyer system in which a leading end portion of a recording sheet is gripped with grippers (gripping claws) and the recording sheet is fixed to a peripheral surface of a drum (cylinder) and conveyed by a rotation of the drum, and has an image reading sensor disposed at a position opposing the drum for reading a printing result.

(1) Since the leading end portion of a recording sheet is pinned by the gripper, an amount of sinking of the recording sheet differs depending on how the recording sheet is pressed down and also on a rigidity of the recording sheet, and a distance between the recording sheet and the image reading sensor fluctuates according to a position on a recording sheet surface. The distance fluctuation renders distortion of a read image.

(2) A vibration of the apparatus or the like can cause an image reading optical system to sway and can generate swaying or winding of a line on the read image which reflects the vibration.

In the present specification, distortion of read images occurring due to various factors as exemplified in (1) and (2) above is collectively referred to as "distortion". Such distortion of read images lowers a detection accuracy of defective nozzles.

(3) A reading device including an image reading sensor is provided with an illuminating light source that irradiates light to a read position on a recording sheet. A difference in an amount of sinking of the recording sheet causes an uneven light distribution of the illuminating light and, depending on a position on a recording sheet surface, illuminating light intensity fluctuates. Moreover, differences in light intensity can occur due to a fluctuation in illuminating light intensity of the light source and due to light distribution of the light source.

The above-described phenomena (1) to (3) are irreproducible, and circumstances such as how a recording sheet is gripped and a state of a light source differ for each recording sheet and for each occurrence. Therefore, such irreproducible distortion and light intensity fluctuation (shading) are fluctuation factors that are difficult to correct using a fixed correction table or the like.

SUMMARY OF THE INVENTION

The present invention has been contrived in view of these circumstances, an object thereof being to provide defective recording element detecting apparatus and method and image forming apparatus and method which uses the detection technique which are capable of accurately identifying a defective recording element even when distortion occurs in a test pattern read image.

In order to attain the aforementioned object, the present invention is directed to a defective recording element detecting apparatus, comprising: a read image data acquiring device which acquires read image data of a test pattern recorded on a recording medium by a recording head having a plurality of recording elements; a reference area setting device which sets a reference area including a part of the test pattern on a read image representing image contents of the read image data; a comparison area setting device which sets a comparison area to be compared with the reference area on the read image; a correlation operation device which performs a correlation operation between the comparison area and the reference area while relatively shifting the comparison area with respect to the reference area; a distortion correction value determining device which determines a distortion correction value for correcting an amount of deviation of an image in the comparison area with respect to an image in the reference area, from a result of the correlation operation; an image distortion correcting device which corrects image distortion of the read image using the distortion correction value; and a defective recording element determining device which identifies a defective recording element among the plurality of recording elements of the recording head in accordance with the read image having been corrected by the image distortion correcting device.

According to this aspect of the present invention, even if the read image of the test pattern is distorted, the distortion can be effectively corrected and a defective recording element can be accurately identified from the test pattern recording result. In particular, since the correlation operation is performed on the basis of the read image data to determine the distortion correction value, even irreproducible image distortion can be favorably corrected.

As the read image data acquiring device, an image reading device which reads the test pattern recorded on the recording medium and converts the read test pattern to generate read image data can be adopted. Moreover, configurations can be adopted which acquire read image data generated by an image reading device through an external storage medium such as a memory card or through a communication interface (including both wired and wireless) such as a USB or a LAN. In this case, a media interface or a communication interface corresponds to the "read image data acquiring device".

Preferably, the test pattern includes an image content in which a pattern having a resemblance appears repetitively along a direction in which the comparison area is relatively shifted; and the correlation operation device performs the correlation operation between the comparison area and the reference area by relatively shifting the comparison area within a predetermined range that is smaller than a repetition interval of the pattern having the resemblance.

Examples of "the pattern having the resemblance" include a pattern that is regularly disposed at approximately a constant interval and a pattern having a similarity. Even in with an ideal test pattern image that should be formed as a regular pattern if all recording elements are normal, a regularity of a test pattern that is actually recorded may sometimes be disrupted due to a defective recording element or the like. However, regularity (similarity) is approximately retained as a whole. "Resemblance" as used herein tolerates such a disruption in regularity and encompasses patterns that substantially have regularity (similarity).

Preferably, the test pattern includes a line pattern in which lines recorded by the recording elements are regularly aligned.

A so-called "1-on n-off" type line pattern can be adopted as a favorable example of the test pattern.

Preferably, the correlation operation device calculates a correlation evaluation function while the comparison area is relatively shifted with respect to the reference area, and finds a shift amount with which a highest correlation is obtained in accordance with a calculation result of the correlation evaluation function; and the distortion correction value determining device determines the distortion correction value from the shift amount with which the highest correlation is obtained.

By calculating the correlation evaluation function while shifting the comparison area in the direction in which the distortion of the read image occurs (the direction that corrects the distortion), a position with the high correlation can be found. In a case where distortion of the read image may possibly occur in two directions, namely, the recording medium conveyance direction and the recording medium widthwise direction, which is perpendicular to the conveyance direction, distortion is corrected in the two directions.

Preferably, the defective recording element detecting apparatus further comprises: an interpolating device which performs interpolation of image data of the comparison area along the shifting direction, wherein the correlation operation device performs the correlation operation after the interpolation by the interpolating device.

According to this aspect of the present invention, the shift amount can be set in units smaller than one pixel of the read image, and the distortion can be determined with precision in units smaller than one pixel.

Preferably, the defective recording element detecting apparatus further comprises: an analytical area setting device which sets analytical areas for analyzing shading characteristics of the read image, at a plurality of positions in the read image; a histogram generating device which generates a histogram of image signals inside each of the analytical areas set in the image area by the analytical area setting device; a shading characteristic information generating device which obtains a gradation value corresponding to a predetermined percentage point of the histogram of each of the analytical areas and generates distribution information indicating the shading characteristics of the read image; and a shading correcting device which performs shading correction of the read image in accordance with the distribution information indicating the shading characteristics, wherein the defective recording element determining device identifies the defective recording element in accordance with results of the shading correction by the shading correcting device and the image distortion correction by the image distortion correcting device.

According to this aspect of the present invention, data for the shading correction (distribution information that indicates shading characteristics) is obtained from the image area of the test pattern for detecting the defective recording element to perform the shading correction. As a result, even irreproducible shading can be favorably corrected. The shading correction and the image distortion correction combine with each other to enable detection of the defective recording element at an even higher accuracy.

By two-dimensionally disposing analytical areas for analyzing the shading characteristics within the image area of the test pattern in the read image, two-dimensional shading characteristic distribution information can be obtained. Using the two-dimensional distribution information, a two-dimensional light intensity difference can be corrected.

Preferably, the recording head is an inkjet head provided with the recording elements each of which includes a nozzle that functions as a droplet ejection port and an ejection energy generating element that generates ejection energy for ejecting a droplet from the nozzle; and the defective recording element determining device identifies the defective recording element rendering at least one abnormality of a recording position error exceeding a predetermined position error permissible range, inability to record due to non-ejection, and an error of a volume of ejected droplet exceeding a predetermined volume error permissible range.

The inkjet head can be adopted as an example of the recording head. Abnormalities of the defective recording element in the inkjet head or, in other words, a defective nozzle can include a droplet deposition position error abnormality, a non-ejection, an ejection volume abnormality, and the like.

In order to attain the aforementioned object, the present invention is also directed to an image forming apparatus, comprising: the above-described defective recording element detecting apparatus; the recording head which has the plurality of recording elements; a medium conveying device which relatively moves the recording medium with respect to the recording head; a test pattern output control device which controls a recording operation of the recording head so that the test pattern is recorded on the recording medium by the recording head; an image reading device which reads the test pattern recorded on the recording medium and converts the read test pattern into electronic image data to produce the read image data to be acquired by the read image data acquiring device; a storage device which stores information on the defective recording element identified by the defective recording element determining device; an image correcting device which suspends a recording operation of the identified defective recording element and corrects image data to record a target image by compensating a recording defect rendered by the defective recording element using at least one of the recording elements other than the defective recording element; and a recording control device which performs image recording by controlling recording operations of the recording elements other than the defective recording element, according to the image data corrected by the image correcting device.

According to this aspect of the present invention, by adopting the configuration of the image forming apparatus that is provided with the image reading device and the analyzing function of the image read by the image reading device, the test chart can be outputted and, at the same time, the output result can be read. As a result, efficient analysis, identification of the defective recording element on the basis of the analysis, and image correction according to a result of the identification can be performed.

While an image-formation defect of a given single defective recording element is compensated by correcting output of one or more of recording elements that are responsible for recording by pixels in a vicinity of the defective recording element, a range of recording elements subjected to the output correction (defective recording correcting recording elements) favorably includes at least two recording elements that are responsible for forming image at recording positions (pixels) adjacent to both sides of a non-recording position rendered by the defective recording element.

As a configuration example of a print head (recording head) used in the image forming apparatus, a full-line head (page-wide head) can be used which has a row of nozzles in which a plurality of head modules are coupled together and a plurality of ejecting ports (nozzles) are aligned across a length equal to or exceeding a full width of a recording medium on which the image formation is to be performed. While such a full-line head is normally disposed along a direction perpendicular to a relative feed direction of the recording medium (the recording medium conveyance direction), a mode is also possible in which a full-line head is disposed along an oblique direction having a predetermined angle with respect to a direction perpendicular to the recording medium conveyance direction.

In order to attain the aforementioned object, the present invention is also directed to a defective recording element detecting method, comprising the steps of: acquiring read image data of a test pattern recorded on a recording medium by a recording head having a plurality of recording elements; setting a reference area including a part of the test pattern on a read image representing image contents of the read image data; setting a comparison area to be compared with the reference area on the read image; performing a correlation operation between the comparison area and the reference area while relatively shifting the comparison area with respect to the reference area; determining a distortion correction value for correcting an amount of deviation of an image in the comparison area with respect to an image in the reference area, from a result of the correlation operation; correcting image distortion of the read image using the distortion correction value; and identifying a defective recording element among the plurality of recording elements of the recording head in accordance with the read image having been corrected in the image distortion correcting step.

Preferably, the defective recording element detecting method further comprises the steps of: recording the test pattern on the recording medium by the recording head having the plurality of recording elements; and generating the read image data by reading, using an image reading device, the test pattern recorded on the recording medium in the test pattern recording step.

In order to attain the aforementioned object, the present invention is also directed to an image forming method comprising the above-described defective recording element detecting method, and further comprising the steps of: relatively moving the recording medium with respect to the recording bead having the plurality of recording elements to form an image on the recording medium by the recording head; controlling a recording operation of the recording head so that the test pattern is recorded on the recording medium by the recording head; reading the test pattern recorded on the recording medium and converting the read test pattern into electronic image data to produce the read image data to be acquired in the read image data acquiring step; storing information on the defective recording element identified in the defective recording element determining step, in a storage device; suspending a recording operation of the identified defective recording element, and correcting image data to record a target image by compensating a recording defect rendered by the defective recording element using at least one of the recording elements other than the defective recording element; and performing image recording by controlling recording operations of the recording elements other than the defective recording element, according to image data corrected in the image correcting step.

Moreover, each step in each of the methods can be realized by a computer. A program for realizing such a read image analyzing function by a computer can be applied as an operating program of a central processing unit (CPU) that is incorporated into a printer or the like and can be applied to a computer system such as a personal computer. Such an analyzing program can be recorded on an information storage medium (external storage device) such as a CD-ROM or a magnetic disk to be provided to a third party through the information storage medium. Alternatively, a download service of the program can be provided through a communication line such as the Internet or the program can be provided as an ASP (Application Service Provider) service.

According to the present invention, even when the test pattern read image is distorted, a defective recording element can be accurately identified from the read image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 21A and 21B are explanatory diagrams of a correlation operation of a reference area and a comparison area;

FIG. 22 is a diagram showing a relationship between a read result with image distortion and a reference area and a comparison area in a distortion correction operation;

FIGS. 25A and 25B are diagrams showing examples of the read images after the image distortion correction;

FIGS. 26A and 26B are diagrams showing examples of the undistorted read image and the distorted read image read image, which have been subjected to interpolation in the lateral direction and then to the distortion correction;

DETAILED DESCRIPTION OF THE PREFERRED EMBODIMENTS

<Description of Error in Droplet Deposition Position>

Figure 1A:
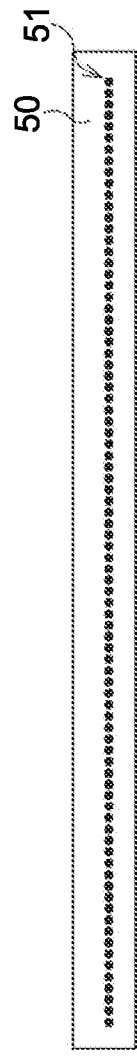
FIGS. 1A to 1C are diagrams for schematically describing a state where deposition positions of ink droplets ejected from nozzles deviate from ideal deposition positions on a recording medium.
Figure 1B:
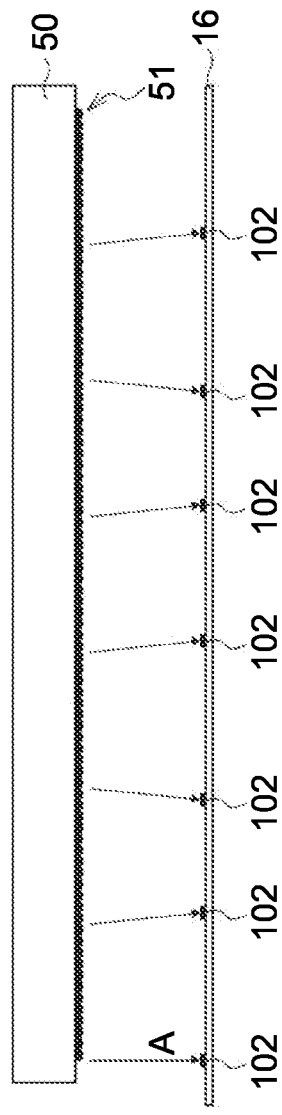
Figure 1C:
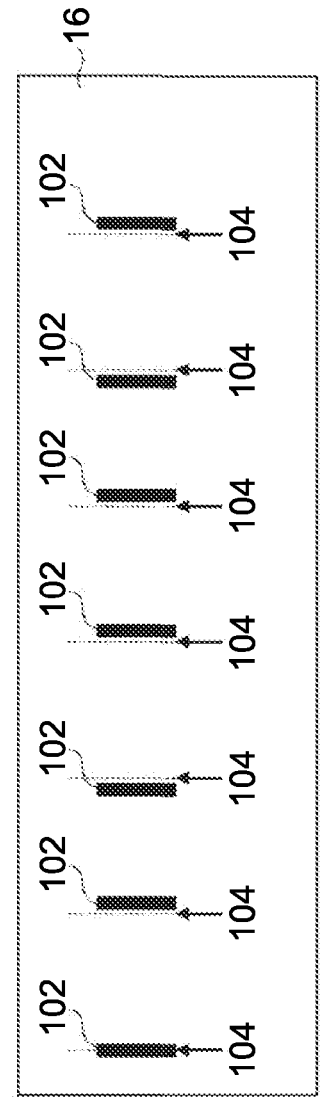

Errors in droplet deposition positions (recording positions) are described as examples of errors rendered by defective nozzles. FIGS. 1A to 1C are diagrams that schematically illustrate a state where deposition positions of ink droplets ejected from nozzles are deviated from ideal deposition positions on a recording medium. FIG. 1A is a plan view showing a line alignment of a plurality of nozzles 51 in a head 50. FIG. 1B is a diagram in which a state where ink droplets are ejected from nozzles 51 toward a sheet of recording medium or paper (hereinafter referred to as a "recording sheet") 16 is viewed from a lateral direction. Arrows A in FIG. 1B schematically show the ejection directions of ink droplets from the nozzles 51. FIG. 1C is a diagram showing examples of test patterns 102 formed on the recording sheet 16 by the ink droplets which have been ejected from the nozzles 51 and deposited on the recording sheet 16, wherein the ideal deposition positions 104 are shown with dashed lines and the actual deposition positions 102 are shown with solid lines.

While FIGS. 1A and 1B show the head 50 in which the nozzles 51 are arranged in a single row to simplify illustration, the present embodiment of the invention can also be applied to a matrix head in which a plurality of nozzles are two-dimensionally arranged. In other words, a group of two-dimensionally arranged nozzles can be treated as being substantially the same as a single row of nozzles by considering a substantial row of nozzles obtained by projecting the nozzles orthographically onto a straight line along a main scanning direction.

As shown in FIGS. 1A to 1C, the nozzles 51 of the head 50 include normal nozzles having normal ejection characteristics as well as defective nozzles in which flight trajectories of ejected ink droplets excessively deviate from ideal trajectories. The linear dot patterns (test patterns) 102 formed by the ink droplets which are ejected from the defective nozzles and deposited on the recording sheet 16 deviate from the ideal deposition positions 104, and the deviation deteriorates the image quality.

<Description of Image Correcting Process>

Figure 2:
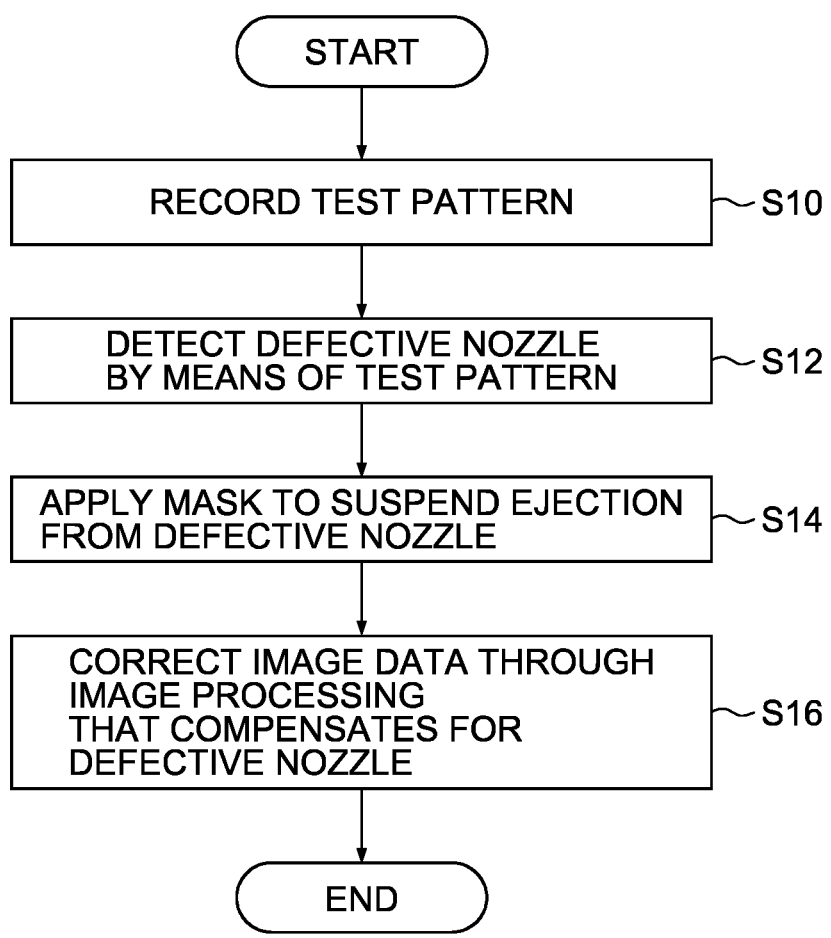
FIG. 2 is a flow chart showing an image correcting process of an inkjet recording apparatus according to an embodiment of the present invention.

In a single-pass recording system of a high-speed recording technique, nozzles corresponding to a width of the recording sheet 16 can number in tens of thousands per ink, and in full-color recording, the number of recording elements are multiplied by the number of ink colors (for example, multiplied by four in a case where inks of four colors including cyan, magenta, yellow and black are used). A basic operating procedure in the single-pass recording system inkjet recording apparatus (image forming apparatus) having such a large number of recording elements is shown in FIG. 2. FIG. 2 shows an example of an image correcting process in which a defective recording element (defective nozzle) is detected among a large number of recording elements, and an image-formation defection due to the defective recording element is corrected by other normal recording elements.

First, in order to grasp ejection characteristics of the nozzles, as shown in FIGS. 1A to 1C, ink droplets are ejected from the nozzles 51 toward the recording sheet 16 and the test patterns 102 are printed on the recording sheet 16 (S10 in FIG. 2).

The test patterns 102 are then read by an image reading device such as an imaging unit (in-line sensor) disposed in the inkjet recording apparatus or an external scanner (off-line scanner), and thereby electronic image data (read image data) representing a recording result of the test patterns 102 is produced. As a result of an analysis of the read image data according to a predetermined detection algorithm, a position of a non-ejection nozzle and an error in droplet deposition position from the ideal deposition position 104 of the test pattern 102 are determined. In this case, a nozzle having an excessive error in droplet deposition position that exceeds a predetermined value (a value defining a predetermined tolerable range) is detected and identified as a defective nozzle, and a non-ejection nozzle is also detected and identified as a defective nozzle (S12 in FIG. 2). A specific flow of the detection of defective nozzles is described later with reference to FIG. 9.

The defective nozzle thus identified is subjected to masking and is treated as a non-ejection nozzle that does not eject any ink droplet during image formation (a non-ejection nozzle that is not used in recording) (S14 in FIG. 2). Moreover, the input image data is corrected by image processing conceived to compensate for image-formation defection rendered by the non-ejection nozzle (nozzle subjected to ejection suspension), by means of an ink droplet ejected from another normal nozzle (for example, an adjacent nozzle) (S16). In accordance with the corrected input image data, a desired image is recorded with favorable quality on the recording sheet 16.

Figure 3:
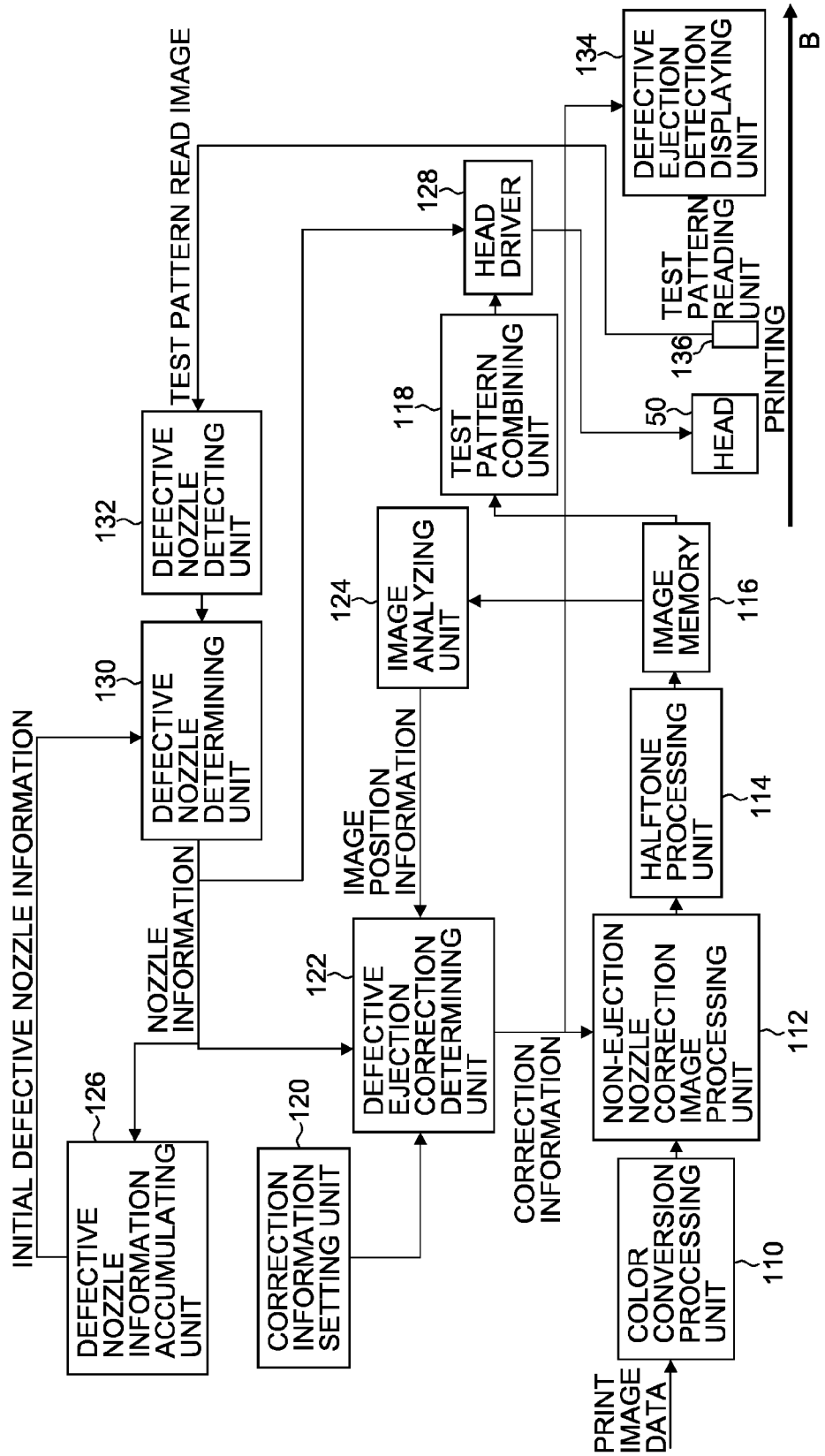
FIG. 3 is a functional block diagram of a system responsible for detection of a defective nozzle and correction of input image data.

Next, a flow of a series of processing including the detection of defective nozzles and the correction of input image data is described. FIG. 3 is a functional block diagram of a system responsible for the detection of defective nozzles and the correction of input image data.

Print image data that is a print object is subjected to predetermined color conversion at a color conversion processing unit 110, and image data of each of colors corresponding to recording inks (in the present embodiment, CMYK inks) is obtained. The color image data for each ink thus obtained is sent from the color conversion processing unit 110 to a non-ejection nozzle correction image processing unit 112.

A defective ejection correction determining unit 122 comprehensively acquires defective nozzle correction information, and identifies a corrected image position that is a position on an image on which, under normal circumstances, a dot having been expected to be recorded by the defective nozzle, from a correspondence relationship between the image positions (image dot positions) and the nozzle positions. In this case, "position" as used herein refers to a position in the nozzle alignment direction (main scanning direction) of the recording head.

Since the defective nozzle is incapable of appropriately recording the image portion at the corrected image position, the defective ejection correction determining unit 122 assigns recording information of the portion at the corrected image position that corresponds to the defective nozzle to one or more of normal nozzles nearby the defective nozzle, including the nozzles on both sides of the defective nozzle. "Assigning of recording information that corresponds to the defective nozzle" as used herein refers to data processing (correction) for causing an ink droplet to be ejected from another normal nozzle (substitution nozzle) so that recording of the portion at the corrected image position that corresponds to the defective nozzle is compensated by the ink ejection from the substitution nozzle. Furthermore, the defective ejection correction determining unit 122 corrects the thus assigned image information according to recording characteristics.

The defective ejection correction determining unit 122 compares information (image position information data) obtained from an image analyzing unit 124 with defective nozzle information obtained from a defective nozzle determining unit 130, and creates correction information only for an image portion that has been expected to be recorded by the defective nozzle. At this point, by referring to data indicating a necessity of correction obtained from a correction information setting unit 120 (for example, data indicating a correction area set on the print image, or data indicating a correction area (per nozzle) set by the print unit of the head 50), the defective ejection correction determining unit 122 is also capable of creating correction information only for a high necessity area in a more sophisticated manner. The thus created correction information is sent from the defective ejection correction determining unit 122 to the non-ejection nozzle correction image processing unit 112.

The non-ejection nozzle correction image processing unit 112 performs correction in accordance with the correction information related to the defective nozzle, which is sent from the defective ejection correction determining unit 122, on the image data sent from the color conversion processing unit 110. The image data after the correction which reflects the non-ejection information of the defective nozzle is sent from the non-ejection nozzle correction image processing unit 112 to a halftone processing unit 114.

The halftone processing unit 114 performs halftone processing on the image data sent from the non-ejection nozzle correction image processing unit 112, and produces multiple-valued image data for driving the recording head 50. At this point, the halftone processing is performed so that the multiple value of the produced multiple-valued image data (recording head driving multiple value) is smaller than an image gradation value (i.e., so that "image gradation value">"recording head driving multiple value").

The image data subjected to the halftone processing is sent from the halftone processing unit 114 to an image memory 116. The image data subjected to the halftone processing which is sent to the image memory 116 is also sent to the image analyzing unit 124. The image data subjected to the halftone processing is stored in the image memory 116. At the same time, the image analyzing unit 124 analyzes the image data subjected to the halftone processing, and produces data (image position information data) related to positions for which the image information exists (image positions) and positions for which the image information does not exist. The thus produced image position information data is sent from the image analyzing unit 124 to the defective ejection correction determining unit 122, and is used by the defective ejection correction determining unit 122 to create the correction information corresponding to the defective nozzle.

The image data subjected to the halftone processing (halftone image data) is also sent from the image memory 116 to a test pattern combining unit 118.

The test pattern combining unit 118 synthesizes image data by combining image data regarding a test pattern (test pattern image data) with the halftone image data sent from the image memory 116. The synthesized image data is sent to a head driver 128. While details are described later, the "test pattern" refers to a dot pattern that is formed on a recording sheet by each nozzle for the purpose of detecting the defective nozzle. The test pattern image data and the halftone image data are combined by the test pattern combining unit 118 so that the test pattern is printed on an end portion of the recording sheet.

The image data obtained by combining the halftone image data and the test pattern image data is sent from the test pattern combining unit 118 to the head driver 128. The head driver 128 drives the head 50 in accordance with the image data sent from the test pattern combining unit 118, and records a desired image and the test pattern onto the recording sheet. In this manner, a pattern forming device which uses ink droplets ejected from nozzles to form a plurality of test patterns corresponding respectively to the nozzles is configured to include the test pattern combining unit 118 and the head driver 128.

The method according to the present embodiment which is capable of identifying a position of a test pattern in units smaller than a reading pixel pitch, the position of the test pattern can be appropriately identified even when a width of the test pattern is approximately equal to the reading pixel pitch with respect to a reading direction or when the width of the test pattern is not larger than three to five times the reading pixel pitch.

The recording sheet on which the image and the test pattern have been recorded is sent toward a recording sheet discharging unit along a recording sheet path (represented with an arrow B in FIG. 3). At this point, a test pattern reading unit (image reading device) 136 disposed at the middle of the recording sheet path reads the test pattern recorded on the recording sheet, and produces data of a test pattern read image.

As the test pattern reading unit 136, for example, a color CCD line sensor is used which includes a color-specific photocell (pixel) array having three color filters of RGB and which is capable of reading a color image with RGB color separation. The test pattern reading unit 136 reads the recording sheet 16 on which the test pattern 102 has been formed, at a predetermined reading pixel pitch in the lengthwise direction of the head 50 (nozzle row direction, main scanning direction, X-direction) and acquires the test pattern read image data based on the reading pixel pitch. The test pattern read image data is sent from the test pattern reading unit 136 to a defective nozzle detecting unit 132.

The defective nozzle detecting unit 132 detects a defective nozzle (including a defective nozzle of which the error in the ink droplet deposition position on the recording sheet is greater than the predetermined value, and a non-ejection nozzle which does not eject any ink droplet) by means of the data of the test pattern read image sent from the test pattern reading unit 136. The data regarding the detected defective nozzle (defective nozzle information) is sent from the defective nozzle detecting unit 132 to the defective nozzle determining unit 130.

The defective nozzle determining unit 130 includes a memory (not shown) which is capable of storing, a predetermined number of times, the defective nozzle information sent from the defective nozzle detecting unit 132. The defective nozzle determining unit 130 references previous defective nozzle information having been stored in the memory, and determines the defective nozzle on the basis of judgment as to whether or not a nozzle has been previously determined as being defective a predetermined number of times or more. Moreover, when a nozzle has been previously determined as being normal (not defective) a predetermined number of times or more, even if the nozzle has been treated until then as a defective nozzle, the treatment of the nozzle is changed and defective nozzle information is modified so that the nozzle is now treated as a normal nozzle.

The thus determined defective nozzle information is sent from the defective nozzle determining unit 130 to the head driver 128 and the defective ejection correction determining unit 122. In addition, when a predetermined condition is satisfied (for example, after printing of a predetermined number of pages, after a JOB, upon user's instruction, or the like), the determined defective nozzle information is also sent from the defective nozzle determining unit 130 to a defective nozzle information accumulating unit 126.

The head driver 128 suspends the drive of the nozzle corresponding to the defective nozzle in accordance with the defective nozzle information sent from the defective nozzle determining unit 130.

The defective nozzle information sent to the defective nozzle information accumulating unit 126 is accumulated and stored in the defective nozzle information accumulating unit 126, and is used as statistical information on the defective nozzles. Moreover, the defective nozzle information accumulated in the defective nozzle information accumulating unit 126 is sent as initial defective nozzle information at an appropriate timing to the defective nozzle determining unit 130. The initial defective nozzle information as used herein refers to information indicating which nozzle (corresponding to CMYK inks) is defective. Inspection information upon head shipment is set as initial data of the initial defective nozzle information, and the initial defective nozzle information is timely updated on the basis of the defective nozzle information accumulated in the defective nozzle information accumulating unit 126 at a specific frequency. The defective nozzle determining unit 130 stores a necessary amount of defective nozzle information among the initial defective nozzle information in a memory (not shown) at the start of printing, and uses the defective nozzle information to determine the defective nozzle.

The defective ejection correction determining unit 122 produces correction information on an image portion to be corrected (an image portion that has been expected to be recorded by the defective nozzle) from the defective nozzle information sent from the defective nozzle determining unit 130, and sends the correction information to the non-ejection nozzle correction image processing unit 112.

Moreover, the defective ejection correction determining unit 122 determines whether or not a defective nozzle (favorably, at least a predetermined number of defective nozzles) has newly occurred and correction information has increased, by comparing the newly produced correction information with the immediately-previous correction information. When it is found that correction information has increased, a predetermined instruction is sent from the defective ejection correction determining unit 122 to a defective ejection detection displaying unit 134.

When receiving the predetermined instruction, the defective ejection detection displaying unit 134 performs processing to make a defective ejection printed material, on which the recording has been performed with the head 50 having the new defective nozzle (in other words, the printed matter that has been printed without having correction performed with respect to the new defective nozzle), identifiable. More specifically, the defective ejection detection displaying unit 134 puts tags on the printed recording sheets ranging from the sheet from which the defection has been detected to the sheet on which the printing is started with the correction having been performed, and the like. Then, upon printing after the correction has been performed with respect to the new defective nozzle (upon printing based on image data (halftone image data) after the correction has been performed), an instruction signal is sent from the defective ejection correction determining unit 122 to the defective ejection detection displaying unit 134 so that the above-described predetermined instruction is withdrawn and the defective ejection detection displaying unit 134 performs a normal operation (normal display).

According to the above-described flow of the series of processing, the detection of defective nozzles and the correction of input image data are appropriately performed. Moreover, depending on a stability of the recording head 50, configurations can be adopted in which the above-described detection and correction are performed only on a first predetermined number of recording sheets at start of printing (a configuration using an off-line scanner is also possible), or only when instructed by a user.

<<Description of Print Layout>>

Figure 4:
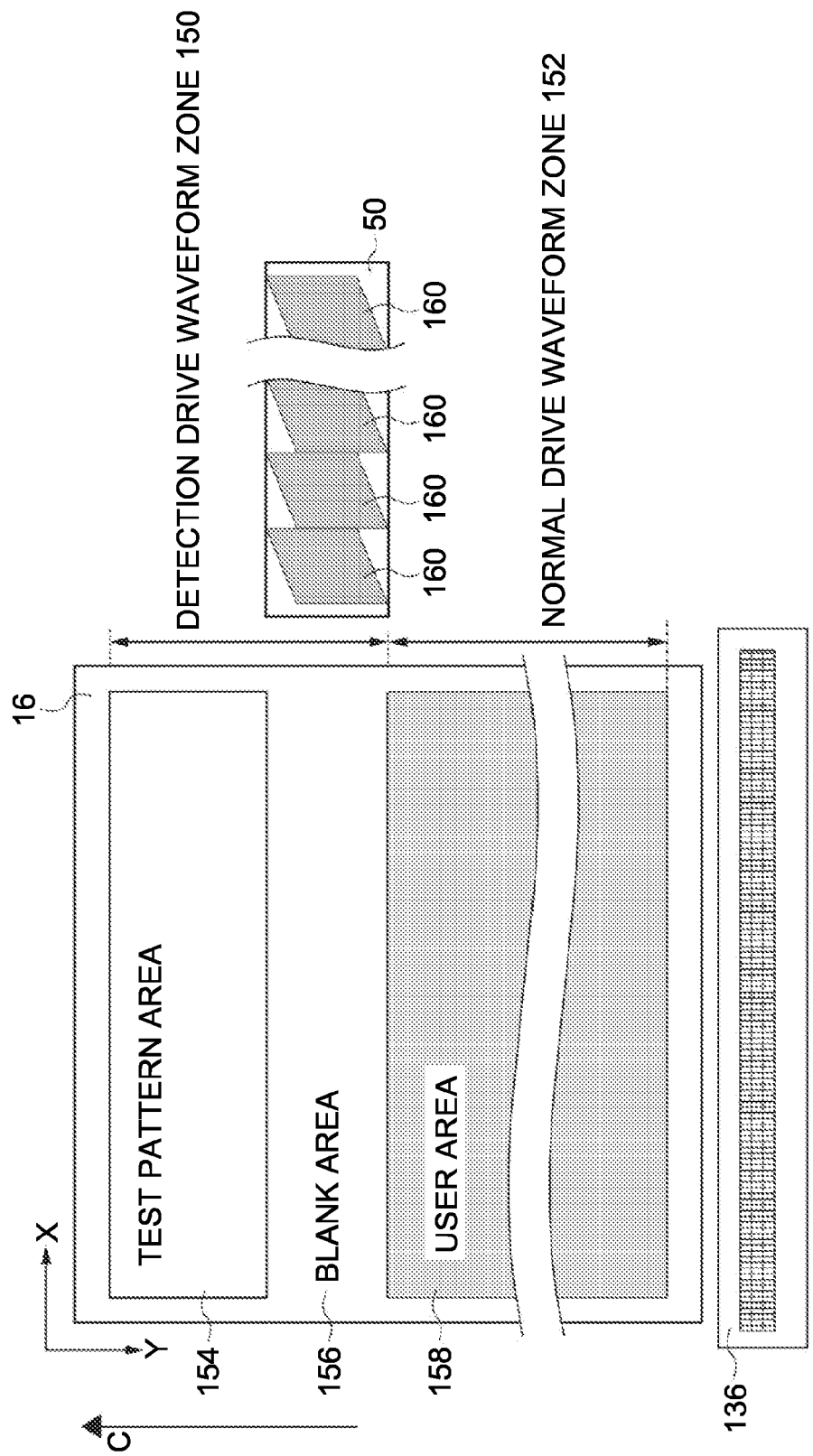
FIG. 4 is a diagram showing a layout on a recording sheet in a system that detects and corrects a defective nozzle.

Next, a print layout on the recording sheet 16 according to an embodiment is described. FIG. 4 is a diagram showing the layout on the recording sheet 16 in the system that detects and corrects the defective nozzle. An upper side of FIG. 4 represents a leading side of the recording sheet 16, and the recording sheet 16 is conveyed from bottom to top in FIG. 4 (in the conveyance direction indicated with an arrow C). For example, in a case of a drum conveying system in which the recording sheet 16 is fixed on a peripheral surface of a drum (not shown) and the recording sheet 16 is conveyed by a rotation of the drum, a configuration is adopted in which the leading end portion of the recording sheet 16 is held by a gripper arranged on the drum.

The recording sheet 16 is divided into a detection drive waveform zone 150 disposed at the leading end portion of the recording sheet 16 and a normal drive waveform zone 152. The detection drive waveform zone 150 includes a test pattern area 154 for printing the above-described test pattern 102 and a blank area 156, and the normal drive waveform zone 152 is configured to include a user area 158 for printing a desired image.

The blank area 156 disposed between the test pattern area 154 and the user area 158 corresponds a transition interval for switching over from test pattern printing to normal printing. As the blank area 156, an area necessary for the switchover is secured in accordance with a conveying speed of the recording sheet 16. In particular, when forming a test pattern in the test pattern area 154 by means of a special drive waveform signal, the blank area is secured which corresponds to a period of time necessary for switching from the special drive waveform signal to a normal drive waveform signal. It is desirable that at least an area corresponding to a nozzle area 160 of the head 50 with respect to the conveyance direction C of the recording sheet 16 is disposed as the blank area 156. Moreover, the special drive waveform signal for printing the test pattern 102 is used to make it easier to distinguish between a defective nozzle and a normal ejection nozzle. A drive waveform signal that amplifies a droplet deposition position error or a drive waveform signal that brings a defective nozzle functioning as a non-ejection nozzle can be specially designed and used.

<<Description of Test Pattern>>

Figure 5:
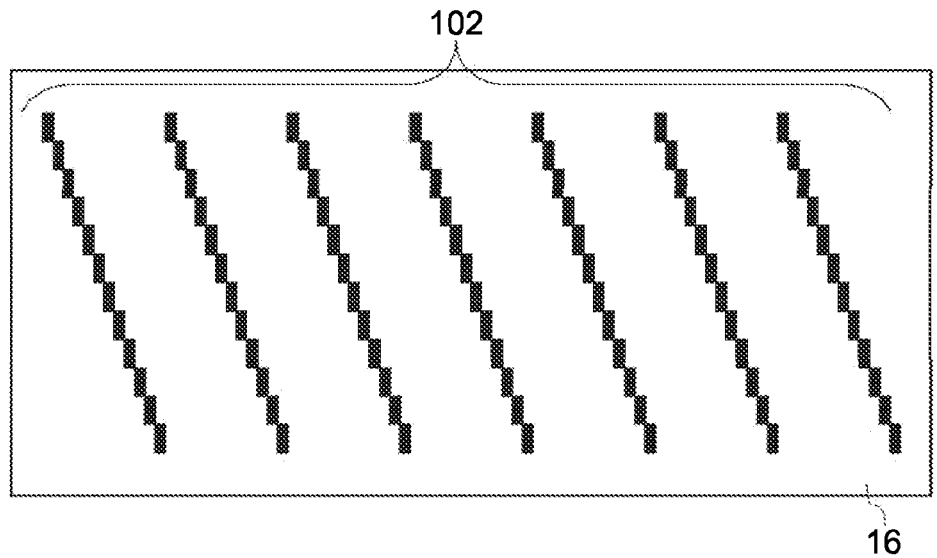
FIG. 5 is a diagram showing a basic form of a test pattern that is recorded on a recording sheet.
Figure 6:
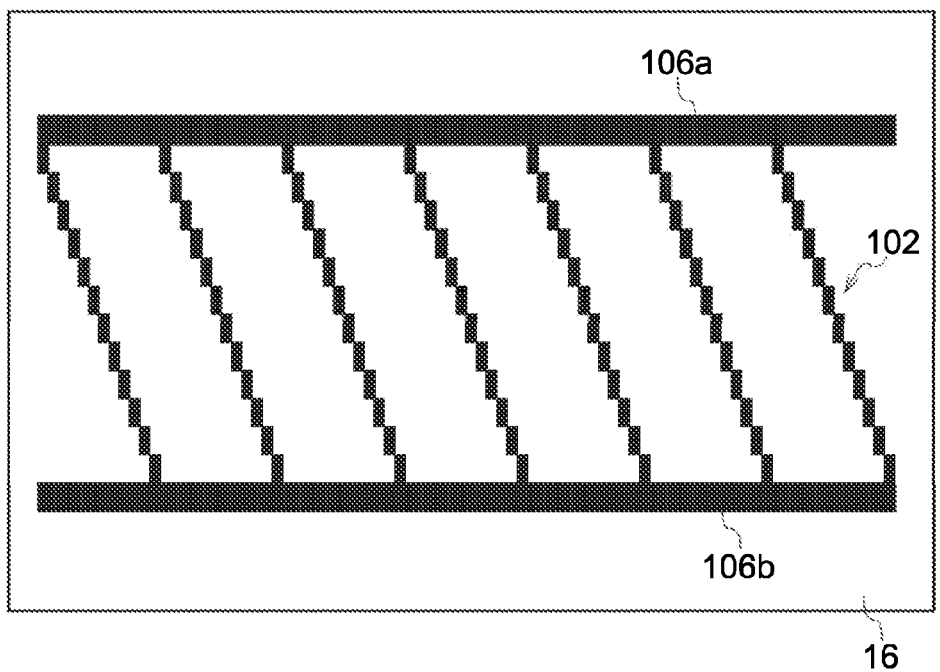
FIG. 6 is a diagram showing a specific example of a test pattern.

Next, a specific embodiment of a test pattern is described. FIG. 5 is a diagram showing a basic form of the test pattern recorded on a recording sheet. FIG. 6 is a diagram showing a specific embodiment of a test pattern including a reference position determination bar. Each of FIGS. 5 and 6 is an enlarged view of an end of the recording sheet 16 on which the test pattern 102 is printed.

A basic portion of the linear test pattern 102 is formed on the recording sheet 16 by driving the plurality of nozzles of the recording head at a certain interval while conveying the recording sheet 16 with respect to the recording head. More specifically, ink droplets are ejected per each nozzle block that is configured by a nozzle group having a predetermined interval among the plurality of nozzles of the recording head to form the linear test pattern 102, and by sequentially changing a nozzle block that ejects ink droplets while the recording sheet 16 is being conveyed, the test pattern 102 is formed in a staggered pattern as shown in FIG. 5.

The test pattern 102 shown in FIG. 5 is a so-called "1-on n-off" line pattern (where n is a natural number). When nozzles constituting a single row of nozzles substantially aligned along a recording sheet widthwise direction (x-direction) (a substantial row of nozzles obtained by orthogonal projection) in a single line head are sequentially assigned nozzle numbers starting from an end in the x-direction of the nozzle alignment, a 1-on n-off line pattern such as that shown in FIG. 5 can be obtained by grouping simultaneously-ejecting nozzle groups according to a remainder "B" (B=0, 1, ..., A−1) of a division of the nozzle numbers by an integer "A" that is larger than 1, varying an ejection timing for each of groups having nozzle numbers of AN+0, AN+1, ..., AN+B (where N is an integer not smaller than 0), and forming a line group constituted of continuous ink droplets from each nozzle.

FIG. 5 shows an example of "1-on 11-off" (A=12, B=0 to 11). While A=12 is exemplified in the present embodiment, it is generally applicable that AN+B (B=0, 1, A−1), and A is an integer larger than 1.

By using such the 1-on n-off test pattern, adjacent lines do not overlap within each line block, and independent (nozzle-specific) lines can be formed respectively for all nozzles which are distinguishable from each other. Since each line constituting the test pattern 102 corresponds to ink ejection from each nozzle, by determining whether or not each line is appropriately formed, it is possible to determine whether or not ink droplets are appropriately ejected from a corresponding nozzle.

Moreover, in addition to the so-called "1-on n-off" line pattern described above, a test pattern can include other patterns such as another line block (for example, a block for position error verification between line blocks), a horizontal line (partition line) that separates line blocks, reference position determination bars 106a and 106b shown in FIG. 6, and the like.

In the present embodiment, as shown in FIG. 6 in particular, the reference position determination bars 106a and 106b are respectively recorded above and below the test pattern 102. As described later, the reference position determination bars 106a and 106b become references for position determination of the test pattern 102.

In a case of an inkjet printing apparatus having a plurality of heads for different ink colors, a similar line pattern is formed for each of heads corresponding to the ink colors (for example, each of heads which correspond to the colors of CMYK).

However, since an area of a non-image portion (a margin portion including the test pattern area 154 and the blank area 156 shown in FIG. 4) on the recording sheet 16 is limited, line patterns (test chart) of all color heads and all nozzles cannot always be formed on a single recording sheet 16. In such a case, the test pattern is formed across a plurality of recording sheets.

<Description of Test Pattern Read Image>

Figure 7:
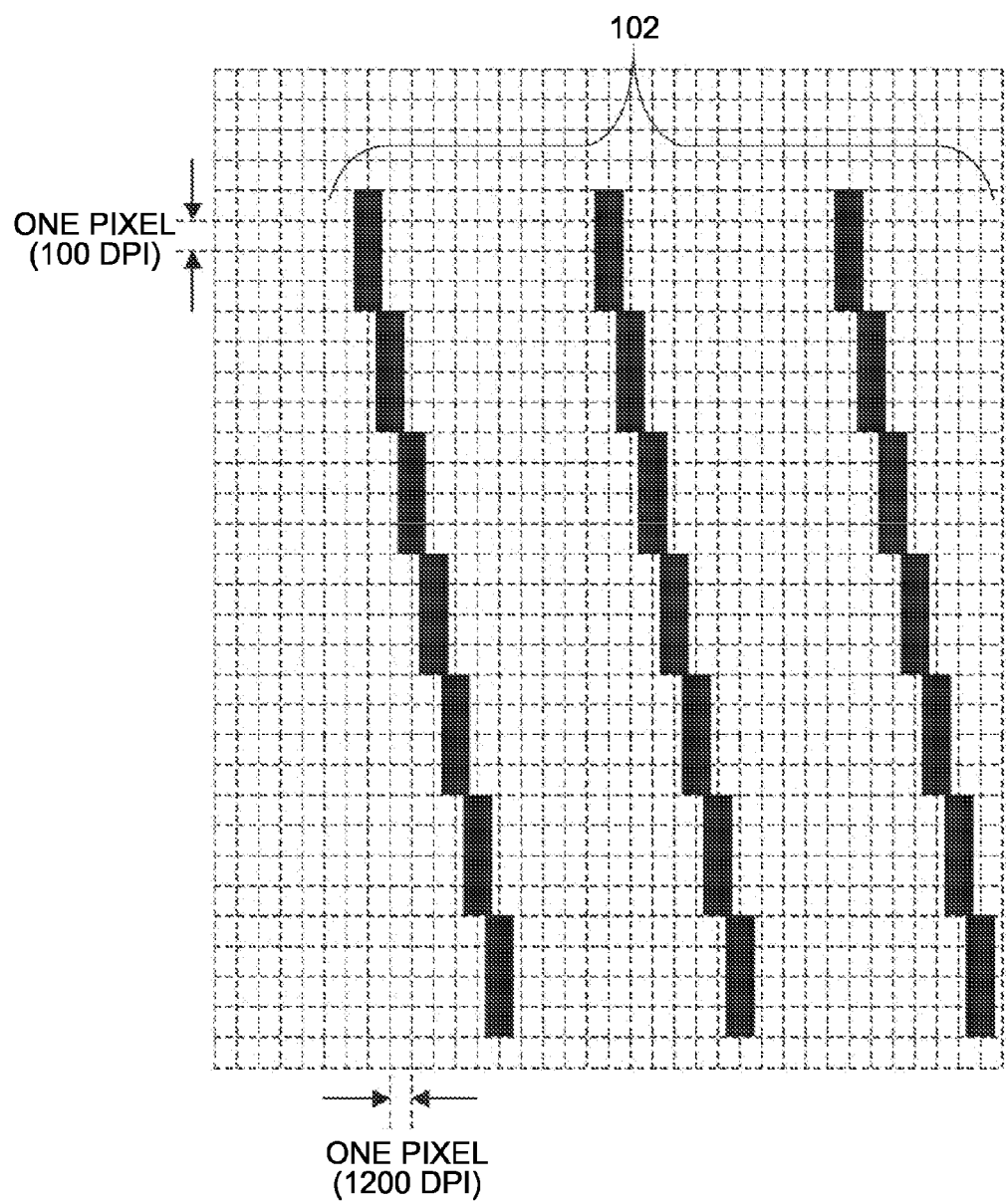
FIG. 7 is a conceptual diagram of a read image of the test pattern when reading resolution is set to 1200 DPI.

FIG. 7 is a conceptual diagram of a test pattern read image when a resolution of a printing apparatus is set to 1200 DPI (dots per inch). In the read image shown in FIG. 7, a length in a longitudinal direction (Y-direction, sub-scanning direction, recording sheet conveyance direction) of each linear pattern corresponds to 4 pixels at 100 DPI, and to 48 pixels at 1200 DPI.

Figure 8:
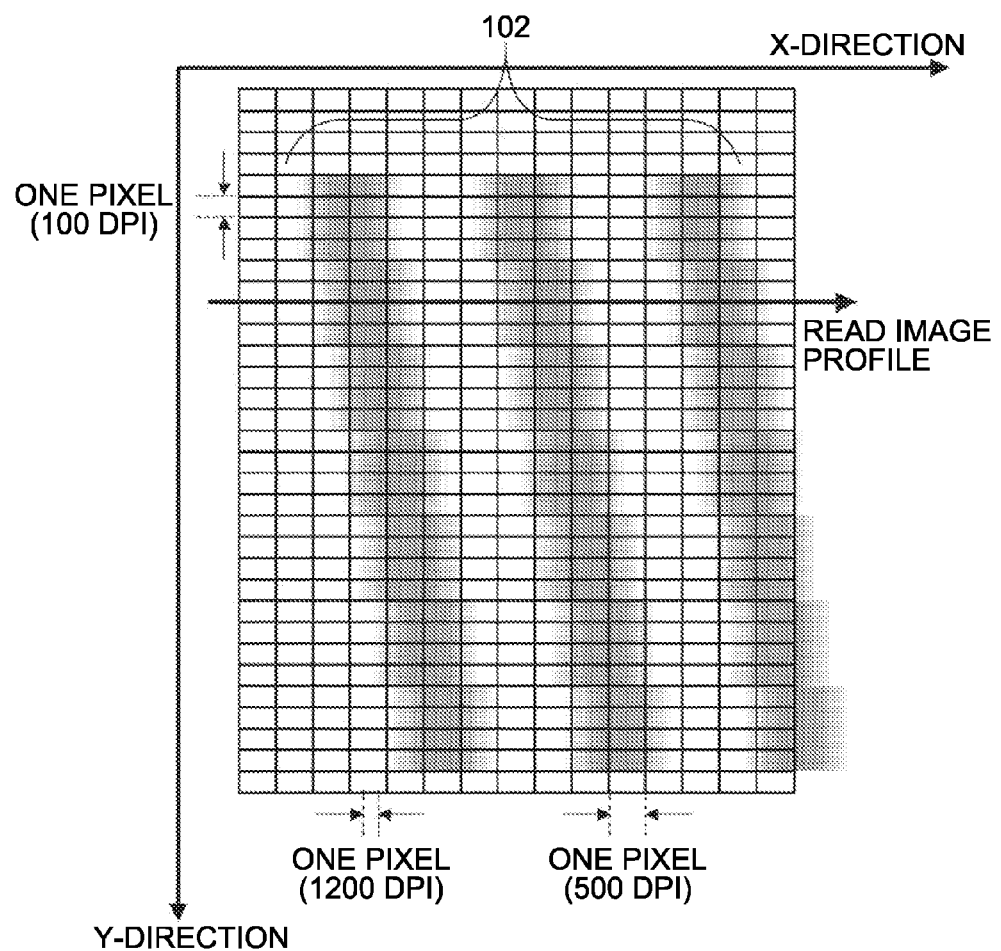
FIG. 8 is a conceptual diagram of a read image of the test pattern when reading resolution is set to 500 DPI.

FIG. 8 is a conceptual diagram of a test pattern read image when a reading resolution in X-direction is set to 500 DPI. As is apparent from FIG. 8, at the reading resolution of 500 DPI, each line in the read image of the test pattern 102 becomes blurry which makes it difficult to identify a distinctive contour.

A high-resolution read image enables a position of each line to be clearly identified, while a low-resolution read image results in blurry contours and makes it difficult to simply identify a position of each line. However, a high-resolution image reading device (scanner) is very expensive, and from a perspective of cost reduction, a method is desired which enables a position of each line of a test pattern to be accurately identified even when using a low-resolution image reading device.

In consideration thereof, an embodiment of a method of accurately identifying a test pattern position from a low-resolution read image is described below. In the following description, an image density (grayscale) distribution when a read image is cut away in one direction (X-direction) is referred to as a profile. The profile need not necessarily indicate a density (grayscale) distribution for only a single pixel and, for example, an X-direction density (grayscale) distribution using a density (grayscale) averaged in a Y-direction can be adopted as a profile.

<Description of Defective Nozzle Detection Flow>

A method of obtaining a deposition position error of each line position of a test pattern (line pattern) is described.

Figure 9:
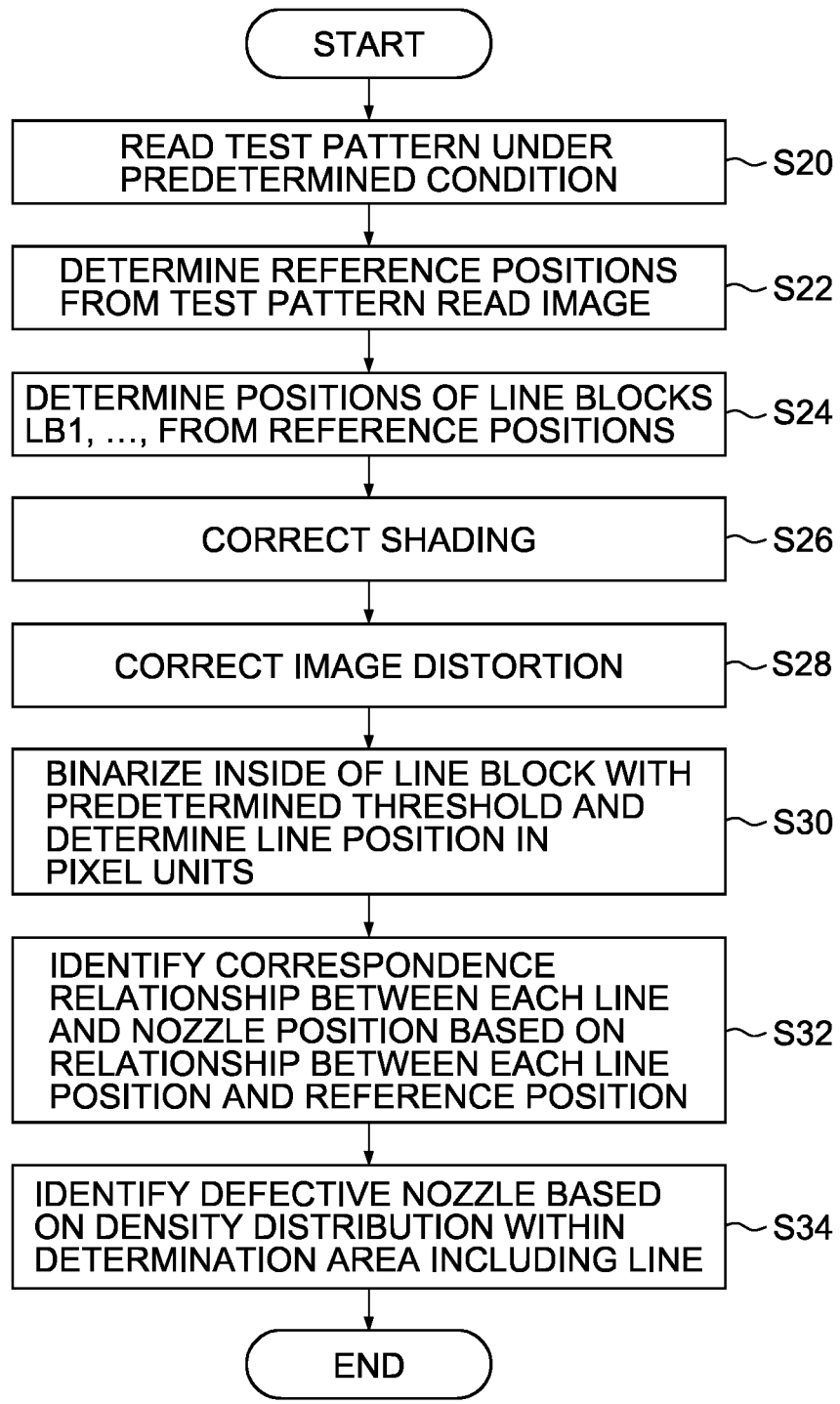
FIG. 9 is a flow chart showing a flow of processing for detecting a defective nozzle.
Figure 10:
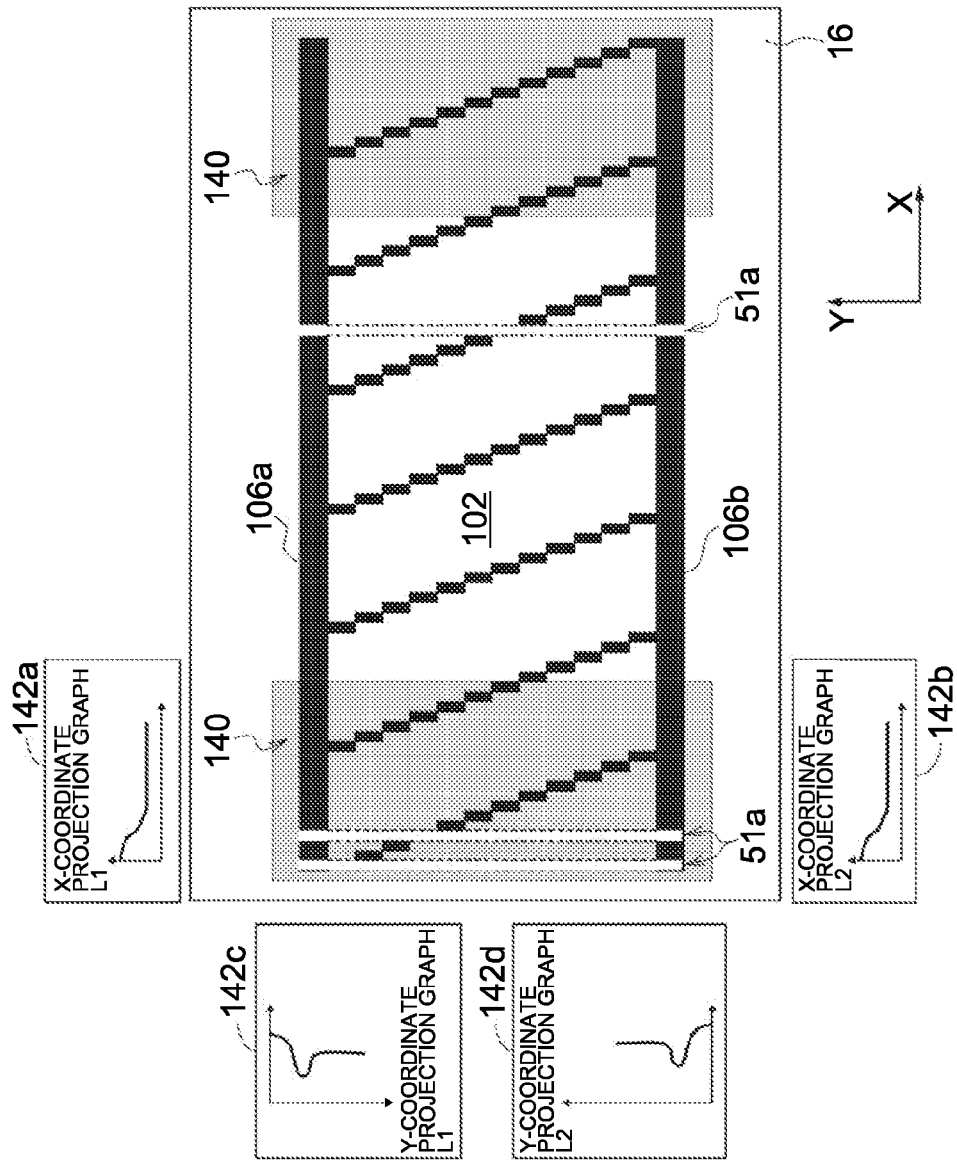
FIG. 10 is a diagram for describing a method of detecting a reference position for line position identification from a read image.
Figure 11:
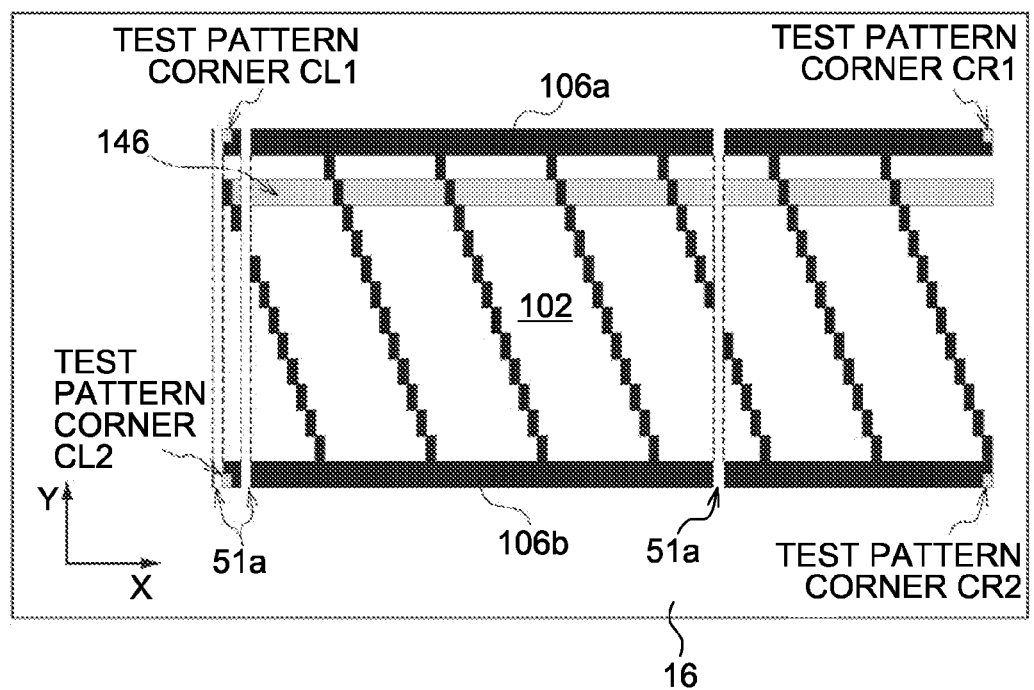
FIG. 11 is a diagram for describing clipping of a line block on the basis of the reference position.

FIG. 9 is a flow chart showing a flow of processing for determining a deposition position error of each line position of a test pattern. FIG. 10 is a diagram describing a method of determining a reference position for line position identification from a read image. FIG. 11 is a diagram describing clipping of a line block of a nozzle according to the reference position.

The test pattern 102 printed on the recording sheet 16 by the nozzles of the recording head is read as image data by the test pattern reading unit 136 (see FIG. 3), and read image data of the test pattern 102 is obtained (S20 in FIG. 9). For example, a reading condition of the test pattern 102 in this case is set to 500 DPI in the X-direction (main scanning direction) and 100 DPI in the Y-direction (sub scanning direction).

Subsequently, a reference position (reference position determination bars 106a and 106b) used when identifying a line position of each test pattern 102 is determined from read image data of the test pattern 102 (S22 in FIG. 9).

<<Description of Processing for Determining Reference Position>>

More specifically, as shown in FIG. 10, a reference position determination window 140 that is a rectangular area which always includes an end of the test pattern 102 is set at each end (each of the left-hand end and the right-hand end in the X-direction) of the test pattern 102. At this point, with respect to the read image (in RGB colors), it is assumed that a position of the test pattern 102 in the read image is identified to some extent from a positional relationship between the test pattern 102, the recording sheet 16, and the reading device (the test pattern reading unit 136 shown in FIG. 3). The reference position determination window 140 is set so as to always include at least one of the ends of the test pattern 102 in regards to the test pattern position range that is known to some extent.

Subsequently, the reference position determination window 140 is longitudinally divided into two areas and, in each area, X-direction and Y-direction optical density projection graphs 142a to 142d (an X-coordinate projection graph L1, an X-coordinate projection graph L2, a Y-coordinate projection graph L1, a Y-coordinate projection graph L2, an X-coordinate projection graph R1, an X-coordinate projection graph R2, a Y-coordinate projection graph R1, and a Y-coordinate projection graph R2) are produced. In this case, the X-coordinate projection graph L1 (142a) and the Y-coordinate projection graph L1 (142c) represent the projection graphs of the upper area of the reference position determination window 140 on the left-hand end in FIG. 10. In a similar manner, the X-coordinate projection graph L2 (142b) and the Y-coordinate projection graph L2 (142d) represent the projection graphs of the lower area of the reference position determination window 140 on the left-hand end in FIG. 10. Furthermore, although not shown in the drawing, the projection graphs of the upper area of the reference position determination window 140 on the right-hand end in FIG. 10 are referred to as the X-coordinate projection graph R1 and the Y-coordinate projection graph R1, and the projection graphs of the lower area of the reference position determination window 140 on the right-hand end in FIG. 10 are referred to as the X-coordinate projection graph R2 and the Y-coordinate projection graph R2. These projection graphs are produced for each of the RGB colors, and the X (Y) coordinate projection graph of the one of the colors with the highest contrast is used. Hereinafter, it is assumed that calculation is performed on a color image plane with the highest contrast.

The Y-coordinate projection graph L1 is described below as an example. The Y-coordinate projection graph L1 is produced by averaging, in the X-axis direction, the density gradation value in the upper part of the left-hand end rectangular area (the reference position determination window 140). The rectangular area includes the blank part of the recording sheet 16, the first reference position determination bar 106a of the test pattern 102, and each linear test pattern 102. Therefore, sections respectively representing the blank part (white), the first reference position determination bar 106a (high density), and the line part (low density) line up in sequence in the Y-coordinate projection graph L1 (142c). Consequently, the upper-left end Y-coordinate of the first reference position determination bar 106a can be obtained by determining the edge of changing from white to the high density.

The X-coordinate projection graph L1 (142a) is produced by averaging, in the Y-axis direction, the density gradation value in the upper part of the left-hand end rectangular area (the reference position determination window 140). The rectangular area includes the blank part of the recording sheet 16 and the first reference position determination bar 106a of the test pattern 102 (as well as the linear test patterns 102 overlapping the first reference position determination bar 106a). Therefore, a section representing the blank part (white), and a section representing the first reference position determination bar 106a and the line part (high density) line up in sequence in the X-coordinate projection graph L1 (142a). Consequently, the upper-left end X-coordinate of the first reference position determination bar 106a can be obtained by determining the edge of changing from white to the high density.

The other projection graphs can be analyzed in a similar manner. As a result, XY-coordinates of the respective corners as shown in FIG. 11 (test pattern corners CL1, CL2, CR1 and CR2) of the first reference position determination bar 106a and the second reference position determination bar 106b can be obtained. The test pattern corners CL1, CL2, CR1 and CR2 are used as the reference positions.

Moreover, even if the head 50 has a non-ejection nozzle and the first reference position determination bar 106a and the second reference position determination bar 106b are printed by a nozzle group including the non-ejection nozzle, since the first reference position determination bar 106a and the second reference position determination bar 106b are solid portions that are continuous in the X-direction (nozzle row direction) and the Y-direction, the non-ejection nozzle has only a small effect on a position determination result of a print location 51a corresponding to the defective nozzle (non-ejection nozzle). In addition, by analyzing the RGB colors with respect to each portion of the first reference position determination bar 106a and the second reference position determination bar 106b, a corresponding ink can be determined.

<<Description of Processing for Determining Position of Each Line Block>>

Next, a position of each line block 146 is obtained from the test pattern corners CL1, CL2, CR1 and CR2, which are the reference positions (S24 in FIG. 9). As shown in FIG. 11, each line block 146 is constituted of a group of lines aligned at an approximately constant interval in the X-direction. The line blocks 146 that are adjacent to each other in the Y-direction are printed by ink droplets dejected from the nozzles that are adjacent to each other in the alignment of nozzles in the single row (projected nozzle alignment). Therefore, each line in the test pattern 102 is assigned to any of line blocks 146 sequentially aligned in the Y-direction.

First, an angle of rotation and X-direction and Y-direction magnification errors (a deviation between an actual magnification and a design magnification) of the test pattern 102 are calculated from the positional relationship among the test pattern corners CL1, CL2, CR1 and CR2. Since the layout of the test pattern 102 is the known information, the position of the line block 146 (the relative positions with respect to the test pattern corners CL1, CL2, CR1 and CR2, and the coordinates of four corners of the rectangle) is obtained on the basis of the known test pattern design information (for example, an X-direction pitch, a Y-direction pitch, an X-direction width, a Y-direction length, and the like of the test pattern 102). The relative position of each line block 146 on the read image is calculated from the test pattern corner CL1 in accordance with the magnification errors and the angle of rotation obtained beforehand. At this point, even if there is the location 51a that was to have been printed by the defective nozzle, the position of the line block 146 can be accurately calculated since the first reference position determination bar 106a and the second reference position determination bar 106b are hardly affected by the location 51a that corresponds to the defective nozzle. In this manner, the positions of all line blocks 146 are identified.

<<Description of Shading Correction>>

Next, shading correction is performed on the read image data (S26 in FIG. 9). Hereinafter, contents of shading correction according to the present embodiment are described.

Figure 12A:
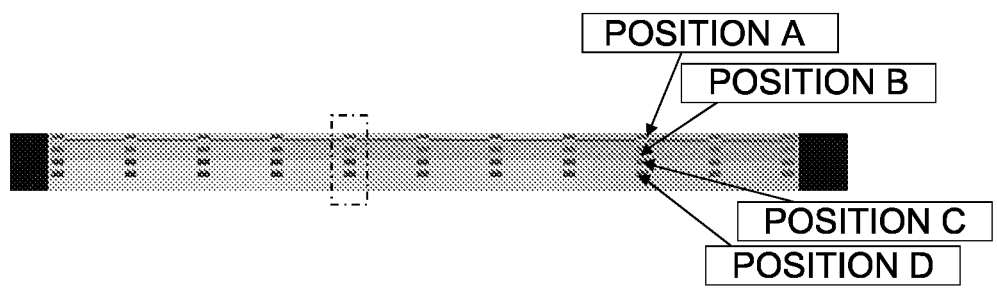
FIGS. 12A and 12B are explanatory diagrams showing a relationship between a test pattern read image and a position of an analytical area for analyzing shading characteristics.

FIG. 12A is a schematic diagram showing acquisition positions (analysis positions) of shading characteristic data with respect to the read image of the entire test pattern. In the recording sheet conveyance direction, four locations constituted of a position A, a position B, a position C and a position D are adopted in sequence from the leading end (the upper end in FIG. 12A) of the recording sheet toward the trailing end (the lower part in FIG. 12A) of the recording sheet. In the recording sheet widthwise direction (X-direction), eleven (11) positions at equal intervals are adopted. The rectangular areas indicated with gray tones in FIG. 12A correspond to plot points in FIGS. 13 and 14.

Figure 12B:
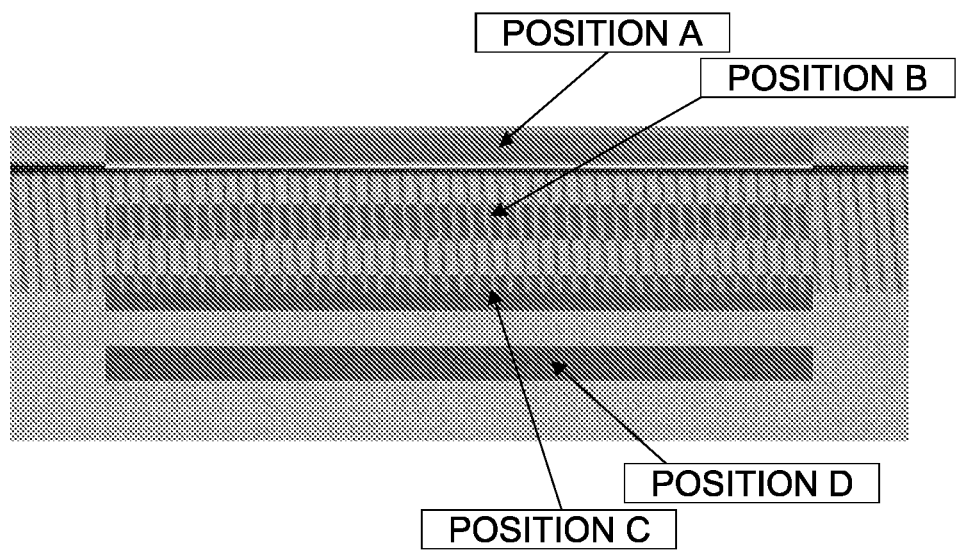

FIG. 12B is a partially enlarged view of FIG. 12A. As shown in FIGS. 12A and 12B, the positions A and C correspond to the end areas of the test pattern, the position B corresponds to the area inside the test pattern, and the position D corresponds to the area outside the test pattern.

As for the read image, it is expected that performing shading correction produces a flat read signal distribution in blank portions of the recording sheet. As described above with reference to FIG. 3, influence of the gripper that holds the recording sheet at an area that is close to the leading end of the recording sheet causes a variation in the distance between the recording sheet and the sensor in the reading unit 136. More specifically, the distance is greatest at the leading end of the recording sheet that is pressed down by the gripper, and the further away from the leading end, the gradually closer to the normal position (distance). When light diffusion of the illuminating light source arranged at the reading unit 136 is insufficient, due to the influence of distance variation, the light distribution characteristics vary according to the distance. As a result, the shading characteristics vary depending on the position on the recording sheet.

Since the distance between the recording sheet and the sensor in the reading unit 136 varies depending on the rigidity of the recording sheet and, moreover, has low reproducibility, there is a problem in that sufficient correction accuracy cannot be ensured even if a shading correction table is created in advance.

Furthermore, even if an area for shading correction is arranged adjacent to the test pattern 102, since the shading characteristics vary in the recording sheet conveyance direction, a contrivance becomes necessary such as arranging areas for shading correction at a plurality of locations on the recording sheet while changing positions in the recording sheet conveyance direction (e.g., in front and in back of the test pattern 102). However, arranging such shading correction areas disadvantageously increases the detection pattern area including the area of the test pattern 102 and the shading correction areas.

Figure 13:
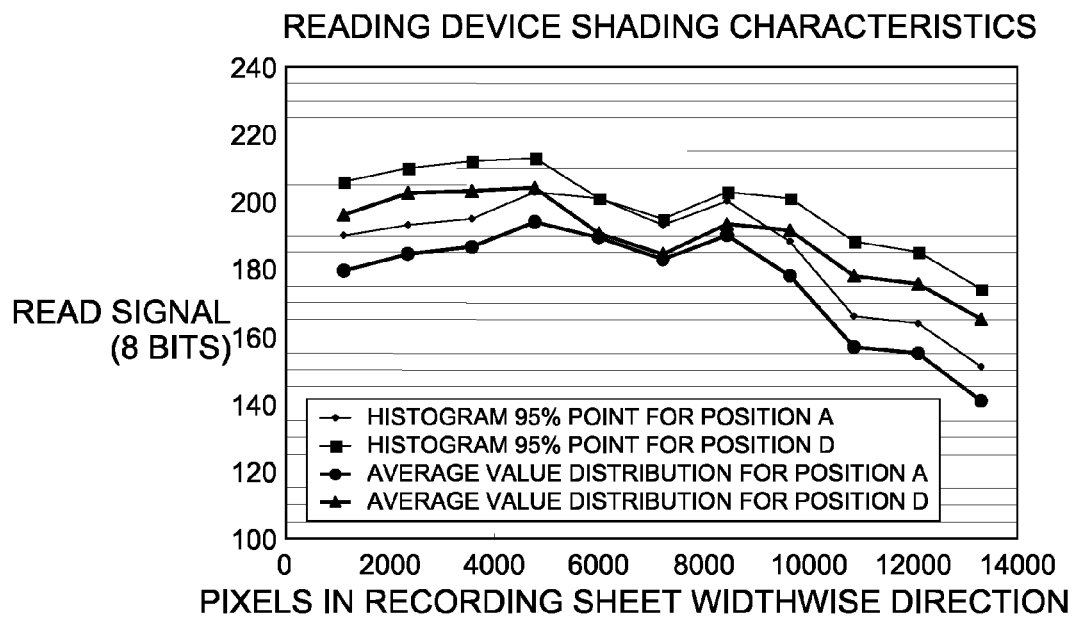
FIG. 13 is a graph showing shading characteristics of a reading device (for a blank portion of a recording sheet)

FIG. 13 shows a comparison between characteristics at 95% points which are obtained by producing histograms of the read signals for the predetermined areas (the rectangular areas) in the read image shown in FIGS. 12A and 12B, and average values of the read signals in the rectangular areas. When a histogram of a predetermined area is produced, a histogram 95% point represents a signal value at which the number of pixels reaches 95% of all the pixels in the predetermined area when the read signals are counted from the smallest signal. In the test pattern 102 such as 1-on 11-off (see FIGS. 5 and 6), since 50% or more of the area is occupied by blank, the histogram 95% point includes information on the portion that is solely blank Therefore, the characteristics of the histogram 95% points reflect an illuminating light distribution of the reading device.

FIG. 13 shows the histogram 95% point and the average value distribution of the position A, and the histogram 95% point and the average value distribution of the position D.

As shown in FIG. 13, the two characteristics (the histogram 95% point characteristics and the average value characteristics) are consistent with each other. Moreover, since the average values and the histogram 95% points are considered, the absolute values of the signals have been offset.

Figure 14:
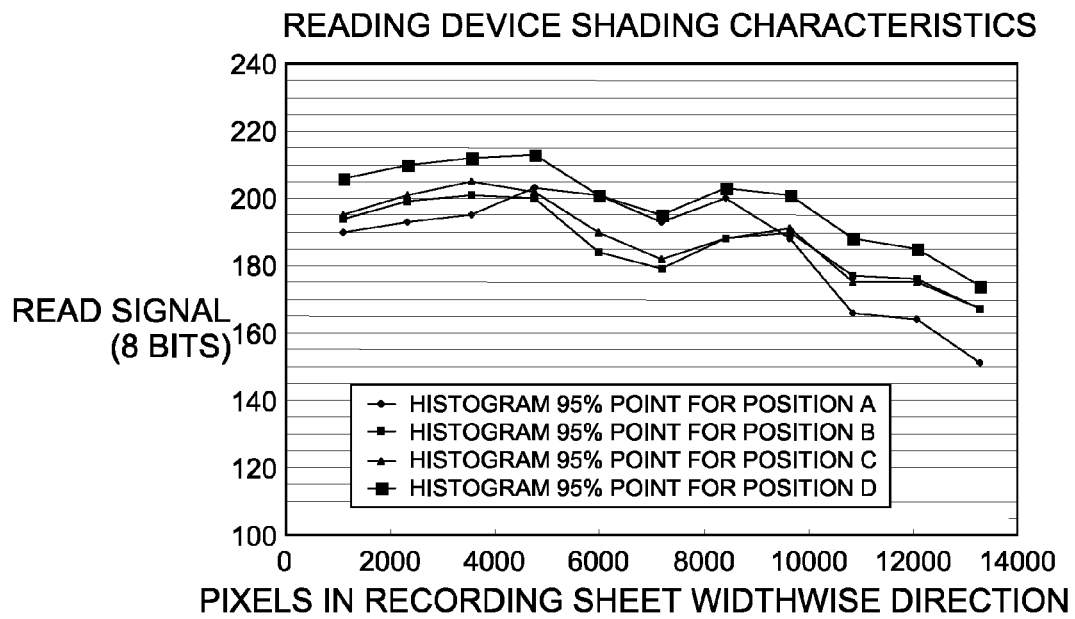
FIG. 14 is a graph showing shading characteristics of a reading device (for portions inside and outside of a test pattern image area)

FIG. 14 is a diagram comparing the histogram 95% points among the positions A, B, C and D. As shown in FIG. 14, the characteristics of each of the positions A to D reflect shading characteristics which vary in the recording sheet conveyance direction.

In the present embodiment, the shading correction is performed on the read image according to findings from the consideration of FIGS. 13 and 14 (S26 in FIG. 9). More specifically, a procedure shown in FIG. 15 is performed.

Figure 15:
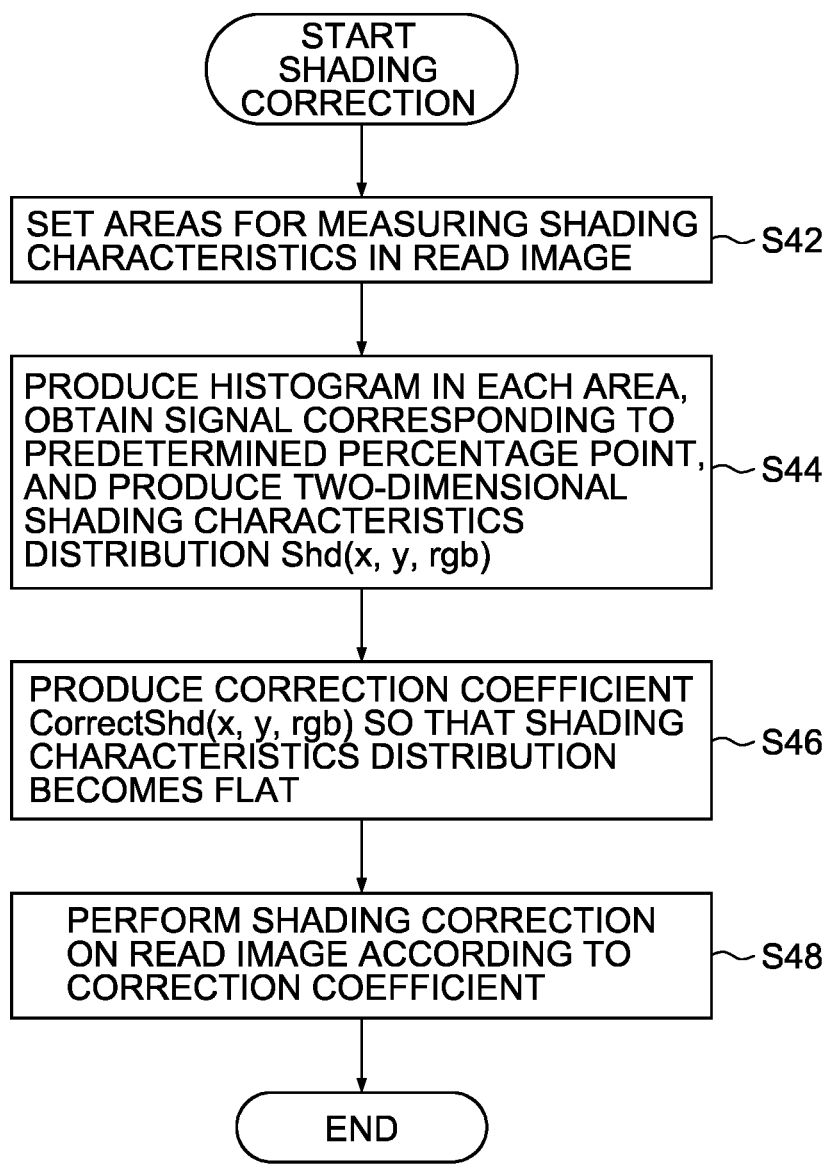
FIG. 15 is a flow chart showing contents of shading correction.

FIG. 15 is a flow chart of the shading correction. First, with respect to the read image, the areas in which shading characteristics are to be measured are set along the variations of the light intensity distribution of the illuminating light (S42). As already described with reference to FIG. 12A, in the present embodiment, the measurement areas (corresponding to "analytical areas") are set at a plurality of positions in two directions including the recording sheet widthwise direction and the recording sheet conveyance direction. The recording sheet widthwise direction primarily has the light intensity difference in accordance with the light distribution of the light source, and the recording sheet conveyance direction primarily has the light intensity difference in accordance with the variation of the amount of sinking of the recording sheet due to the recording sheet being held by the gripper. By two-dimensionally disposing the measurement areas in correspondence with such a two-dimensional light intensity distribution, a two-dimensional distribution of the shading characteristics can be grasped.

For each measurement area (shading characteristic correction area) set in S42 in FIG. 15, the histogram is produced, the signal corresponding to the predetermined percentage point (for example, a 95% point) is obtained, and a two-dimensional shading characteristics distribution Shd(x, y, rgb) is produced (S44).

Next, a correction coefficient CorrectShd(x, y, rgb)=Const/Shd(x, y, rgb) is obtained so that the shading characteristics distribution Shd(x, y, rgb) becomes flat (S46), where the "Const" represents a predetermined constant.

Using the thus obtained correction coefficient CorrectShd (x, y, rgb), shading correction is performed on the read image in accordance with the correction coefficient CorrectShd(x, y, rgb) (S48). The correction coefficient is applied to a signal value of each pixel in the read image in order to obtain shading-corrected read image data.

When the correction coefficient is decimated with respect to the image positions, the calculation is performed using a known interpolation operation (for example, linear interpolation, nearest neighbor, spline interpolation, or the like) so that shading correction coefficients have a one-to-one correspondence with the image positions.

In addition, while the 95% points of the histograms have been exemplified in FIGS. 13 and 14, adopting a percentage point other than the 95% point is also effective. Effective percentage points vary according to duties of the test patterns (the greater the value of N in "1-on N-off", the lower the duty). The lower the duty, the lower the percentage point that can be adopted; whereas the higher the duty, the higher the percentage point that is adopted. However, it is desirable that a point near the 100% point is avoided when noise of the reading system has a significant influence.

<<Description of Image Distortion Correction>>

Next, image distortion correction for correcting the distortion of the read image is performed (S28 in FIG. 9). Hereinafter, contents of the image distortion correction according to the present embodiment are described. First, the distortion of the read image is briefly explained.

Figure 16A:
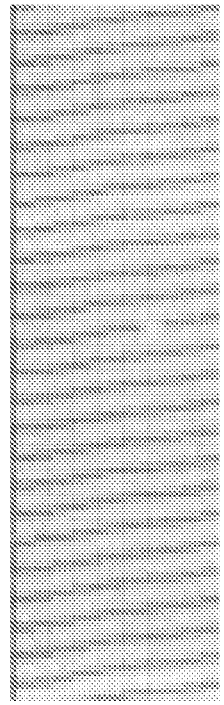
FIGS. 16A and 16B are diagrams showing examples of an undistorted read image and a distorted read image.
Figure 16B:
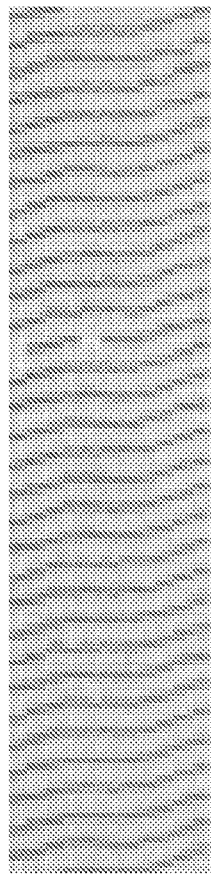

FIGS. 16A and 16B show a comparison of a read image without any distortion and a read image with distortion. FIG. 16A shows an example of a read image without any distortion. FIG. 16B shows an example of a read image of a 1-on n-off test pattern 102 having distortion which is attributable to the sinking of the leading end portion of the recording sheet due to the recording sheet being held down by a gripper and is also attributable to the rising of the recording sheet due to the rigidity of the recording sheet. As shown in FIG. 16B, when the distortion occurs in the read image, the image is produced in which the formed lines wobble in the widthwise direction (X-direction) and the lengthwise direction (Y-direction) of the recording sheet.

Figure 17A:
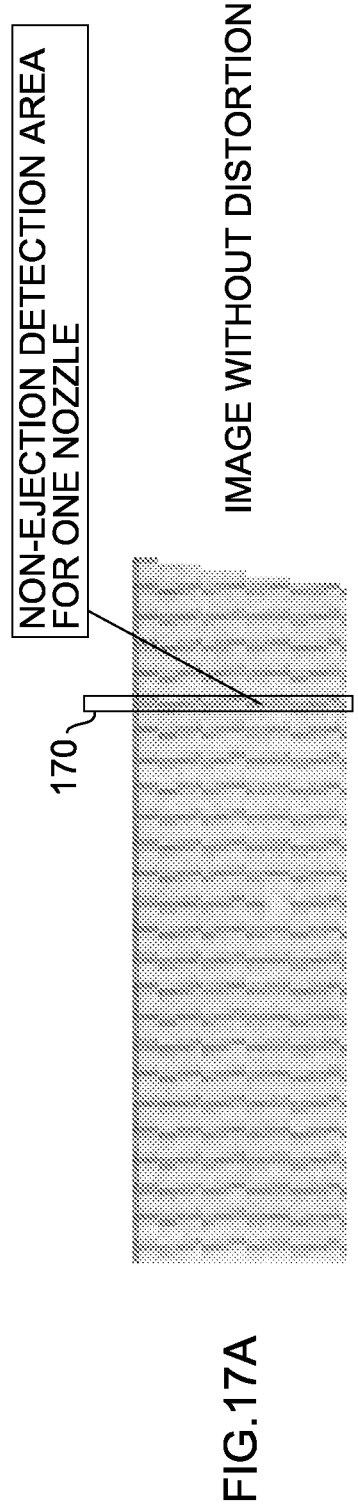
FIGS. 17A and 17B are diagrams showing examples of images obtained by shifting a line block on the basis of a design value with respect to an undistorted read image and a distorted read image.
Figure 17B:
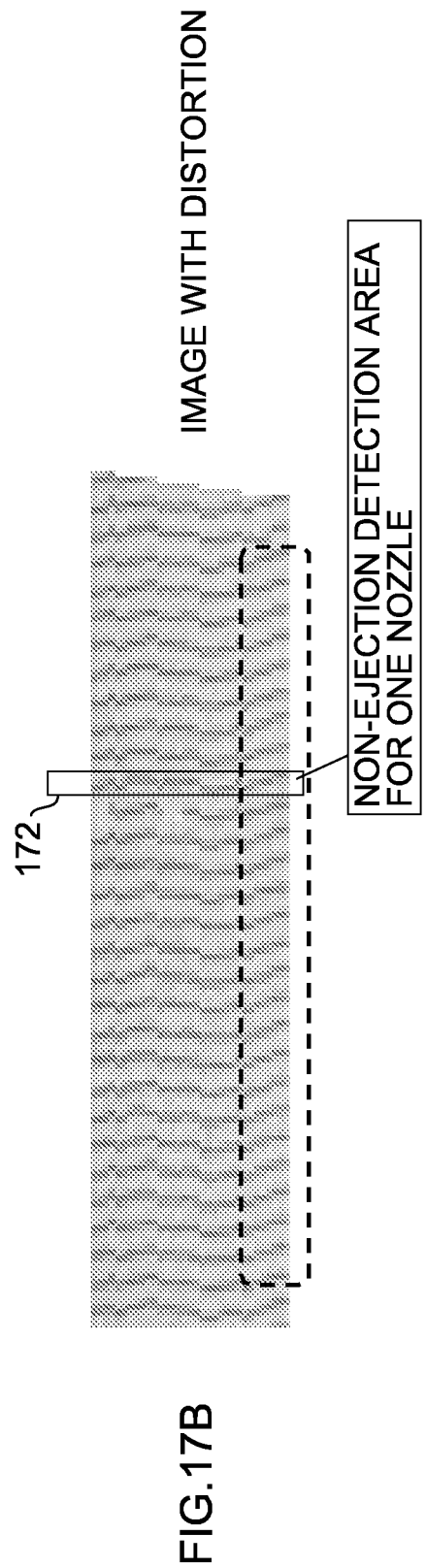

As already described with reference to FIGS. 5 and 6, the defective nozzle detection pattern (the test pattern 102) is configured so that the positions of the line patterns (line blocks) having the regular intervals in the X-direction are changed in the Y-direction and shifted by one stage per nozzle. FIGS. 17A and 17B show results of shifting the line blocks of the stages in the read image in the X-direction while using the shift amount per nozzle as the design value. FIG. 17A shows the shifted read image without any distortion (obtained by shifting FIG. 16A), and FIG. 17B shows the shifted read image with distortion (obtained by shifting FIG. 16B).

As shown in FIG. 17A, with the shifted read image having no distortion, each nozzle position can be easily identified since the positions of lines in the stages are aligned in the recording sheet conveyance direction. Therefore, as shown in FIG. 17A, a defective ejection such as a non-ejection can be detected on the basis of the density distribution in a rectangular area (a non-ejection detection area for the nozzles) 170 including the lines of the stages.

In contrast, as shown in FIG. 17B, with the shifted read image having the distortion, the nozzle positions cannot be covered unless a non-ejection detection area 172 is expanded to around an amount of distortion, because of the wobble of the line positions caused by the influence of the distortion. In particular, since the end (the lower end in FIG. 17B) of the line pattern has a large amount of distortion, a correct determination cannot be made unless the non-ejection detection area 172 is set wide. In other words, an accurate determination cannot be made with the same non-ejection detection area 170 shown in FIG. 17A. Moreover, in the case of FIG. 17B, it is difficult to cope with significant wobbling of the line positions.

Figure 18:
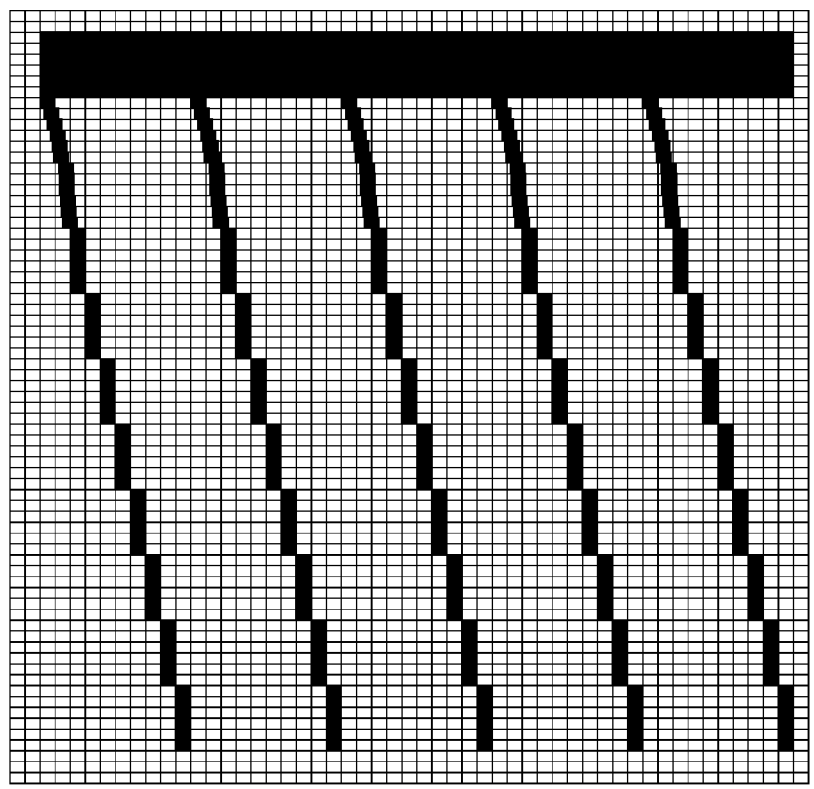
FIG. 18 is an explanatory diagram of a read result with image distortion.

FIG. 18 is an explanatory diagram of the read image with distortion. FIG. 18 illustrates how the distortion is being generated at a first-stage line block that is close to the leading end of the recording sheet and at a second-stage line block, in a read image of a 1-on 9-off test pattern. Such an image distortion likely occurs due to an influence of a gripper that fixes the leading end of the recording sheet.

Figure 19:
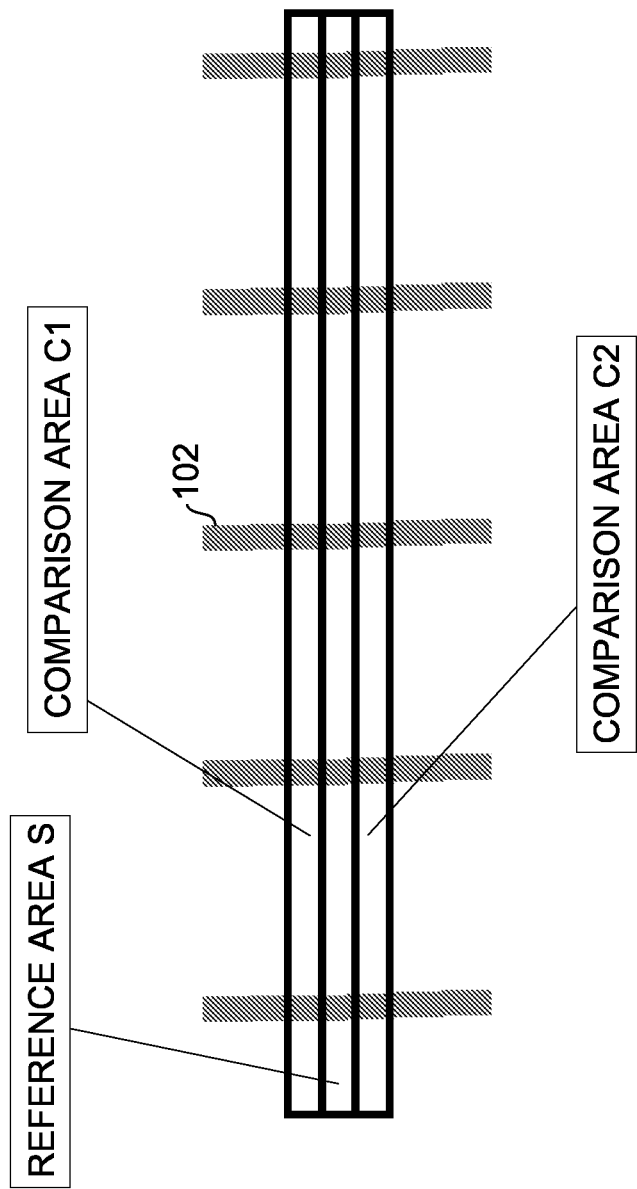
FIG. 19 is a diagram showing a relationship between a reference area and a comparison area of a line pattern having image distortion.

FIG. 19 is an explanatory diagram of contents of processing for correcting the image distortion, and shows a relationship between a reference area and comparison areas which are set in an image area having line patterns. A size of each area is set so as to enable the distortion to be ignored with respect to the direction of the distortion on the read image. This size varies depending on characteristics of the distortion. When there is no distortion in the lateral direction such as in a case of vibration, the lateral size of the area can be up to the recording sheet width size. Even when there is distortion in the longitudinal direction, the longitudinal size of the area can be set to include a plurality of pixels as long as the distortion period is significantly greater than the reading resolution. When there are distortions in both the longitudinal direction and the lateral direction, the longitudinal size of the area is set to one pixel, and the lateral size of the area is set to a size which includes at least a predetermined number of lines while enables the distortion to be ignored.

In FIG. 19, the reference area S is set to have the size of one pixel in the longitudinal direction and the size including five lines in the lateral direction, and the comparison areas C1 and C2 are set to have the same sizes as the reference area S and to be adjacent to the reference area S from both sides in the longitudinal direction.

Figure 20:
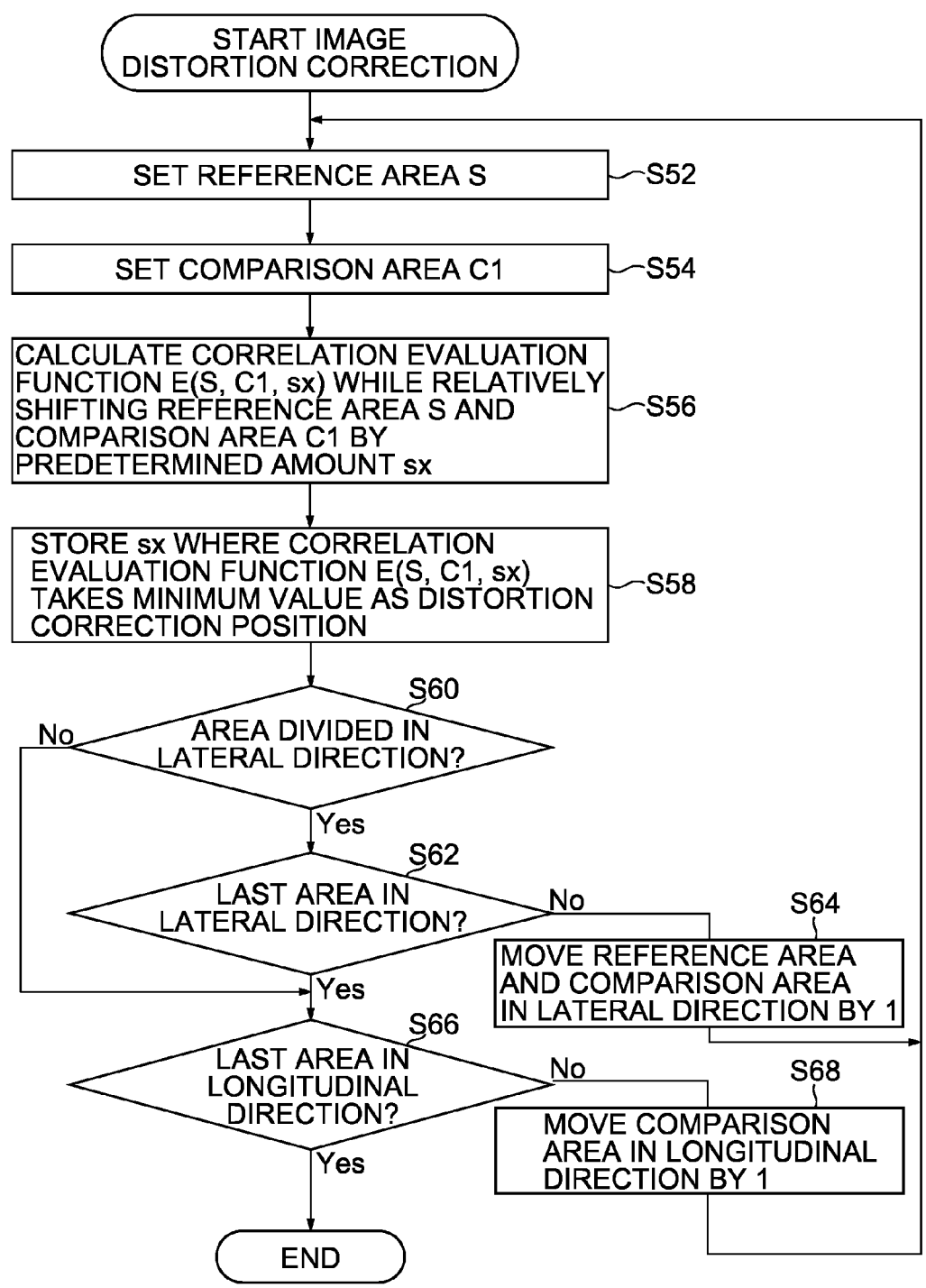
FIG. 20 is a flow chart of image distortion correction.

FIG. 20 is a flow chart of the image distortion correction.

First, a reference area S is set on a read image (S52). An area size of the reference area S is assumed to comply with conditions described with reference to FIG. 19. Next, a comparison area C1 to be compared with the reference area S is set (S54, refer to FIG. 19).

Subsequently, a correlation evaluation function E(S, C1, sx) is calculated while shifting the reference area S and the comparison area C1 relatively to each other within a predetermined range (S56), where "sx" represents a shift amount in the X-direction.

FIG. 21A shows a situation in which the comparison area C1 is shifted by +1 pixel in the lateral direction in S56 in FIG. 20. FIG. 21B shows a situation in which the comparison area C1 is shifted by −1 pixel in the lateral direction in S56 in FIG. 20. The correlation evaluation function E is calculated by shifting the comparison area in a unit of one pixel in the lateral direction as shown in FIGS. 21A and 21B. While the increment of one pixel is most favorable when performing the lateral shifting, it is also possible to perform shifting in units of a plurality of pixels.

For example, the correlation evaluation function E can be defined as the following equation 1 or 2:

Correlation evaluation function $E(S, C1, sx) = \Sigma |Is(x) - Ic1(x+sx)|$; or (1)

Correlation evaluation function $E(S, C1, sx) = \Sigma (Is(x) - Ic1(x+sx))^2$, (2)

where x is a position (pixel position) in the lateral direction, Is(x) is an image signal at the position x in the reference area S, and Ic1(x) is an image signal at the position x in the comparison area C1.

The equation 1 calculates the sum of the absolute values of the differences in the image signals between the reference area and the comparison area. The equation 2 calculates the sum of the squares of the differences in the image signals between the reference area and the comparison area. With the correlation evaluation functions E defined as the equations 1 and 2, the correlation is greatest when the evaluation value is smallest.

When the reference area S is set to include a plurality of pixels in the longitudinal direction, the average value of the image signals in the longitudinal direction is obtained as follows, and the obtained profile IPs(x) is used in place of Is(x) in the equation 1 or 2:

$IPs(x) = \{\Sigma (Is(x, y))\}/N$, (3)

where N is the number of pixels in the area in the longitudinal direction.

In a similar manner, when the comparison area C1 is set to include a plurality of pixels in the longitudinal direction, the average value of the image signals in the longitudinal direction is obtained as follows, and the obtained profile IPc1(x) is used in place of Ic1(x) in the equation 1 or 2:

$IPc1(x) = \{\Sigma (Ic1(x, y))\}/N$, (4)

where N is the number of pixels in the area in the longitudinal direction.

The correlation evaluation function E (S, C1, sx) is calculated while varying the shift amount sx (S56 in FIG. 20), and the value of the shift amount sx at which the correlation evaluation function E has the minimum value is stored in the memory as a "distortion correction position" (S58).

When the reference area S is divided in the lateral direction (recording sheet widthwise direction) on the read image of the test pattern 102 (when YES is judged in S60), a judgment is made on whether or not the area that is the operation object is the final area in the lateral direction (S62). If there is another area in the lateral direction, a NO judgment is made in S62, the reference area S that is the operation object and the comparison area C1 are moved by one in the lateral direction (S64), and a return is made to S52. In this manner, the processes of S52 to S64 described above are repeated while changing the reference area S.

When the reference area S is divided in the lateral direction and the comparison operation (determination of the distortion correction position by the calculation of the correlation evaluation function E) has been completed for the final area in the lateral direction, a YES judgment is made in S62 and a transition is made to S66.

A transition to S66 is also made when the reference area S is not divided in the lateral direction (when a NO judgment is made in S60). In S66, a judgment is made on whether or not the comparison area that is the operation object is the final area in the longitudinal direction (S66). If there is another comparison area in the longitudinal direction, a NO judgment is made in S66, the comparison area C1 is moved by one in the longitudinal direction (S68), a return is made to S52, and similar processes (S52 to S68) are repeated while varying the comparison area C1 to Ck (k=2, 3, ... ).

When the comparison operation (determination of the distortion correction position by the calculation of the correlation evaluation function E) has been completed for the final area in the longitudinal direction, a YES judgment is made in S68, the present processing is finished, and a return is made to the main routine shown in FIG. 9.

<Relationship Between Reference Area and Comparison Area>

FIG. 22 is an explanatory diagram showing a first example of a relationship between the reference area and the comparison area in the distortion correction operation with respect to the read image with distortion. As shown in FIG. 22, a mode can be adopted in which the reference area S is fixed, and centered on the reference area S, the comparison areas Ci (where i=1, 2, 3, ... ) are sequentially set in a continuous manner from the reference area S (so that adjacent areas are in contact with each other) and at gradually increasing distances from the reference area S. In FIG. 22, centered on the reference area S, the comparison areas C1, C3, C5, ... are set in the upward direction in FIG. 22, and the comparison areas C2, C4, C6, ... are set in the downward direction in FIG. 22 from the reference area S. When the comparison areas Ci are consecutively set upward and downward from the reference area S in this manner and the areas are sequentially compared, with Ci and Ci+2 which are adjacent to each other (when performing the operation on the area Ci+2 after the area Ci), it is desirable that the distortion correction position obtained previously for the comparison area Ci is set as the initial shift value in the operation for the comparison area Ci+2. Accordingly, a reduction in to operation time can be achieved.

Figure 23:
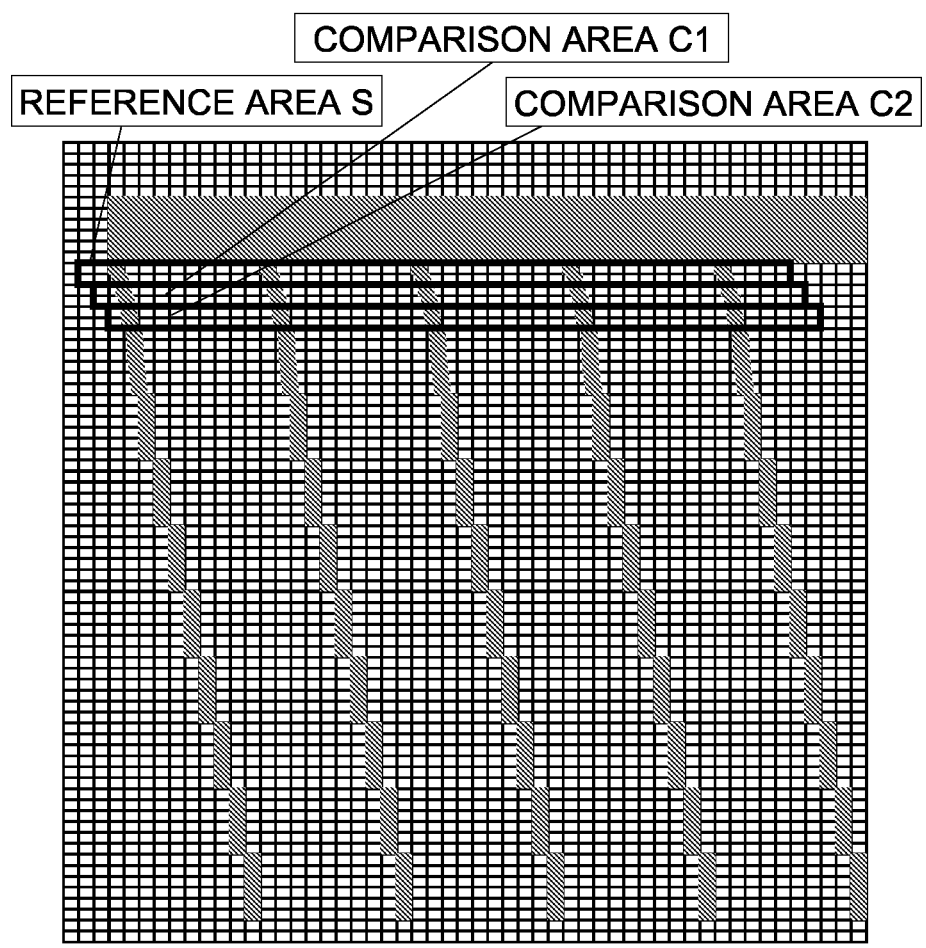
FIG. 23 is a diagram showing a relationship between a read result with image distortion and a reference area and a comparison area in a distortion correction operation.

FIG. 23 is an explanatory diagram showing a second example of a relationship between the reference area and the comparison area in the distortion correction operation with respect to the read image with distortion.

As shown in FIG. 23, a mode can be adopted in which an end of the test pattern is set as the reference area S, and the comparison areas Ci (where i=1, 2, 3, ... ) are sequentially set in the separating direction from the reference area S. In the case of FIG. 23, adjacent areas are in contact with each other. When performing the operation in which the comparison areas Ci (where i=1, 2, 3, ... ) that are aligned in the gradually separating direction from the reference area S in this manner are sequentially compared with the reference area S, with Ci and Ci+1 which are adjacent to each other (when performing the operation on the area Ci+1 after the area Ci), it is desirable that the distortion correction position obtained previously for the comparison area Ci is set as the initial shift value in the operation for the comparison area Ci+1.

Figure 24:
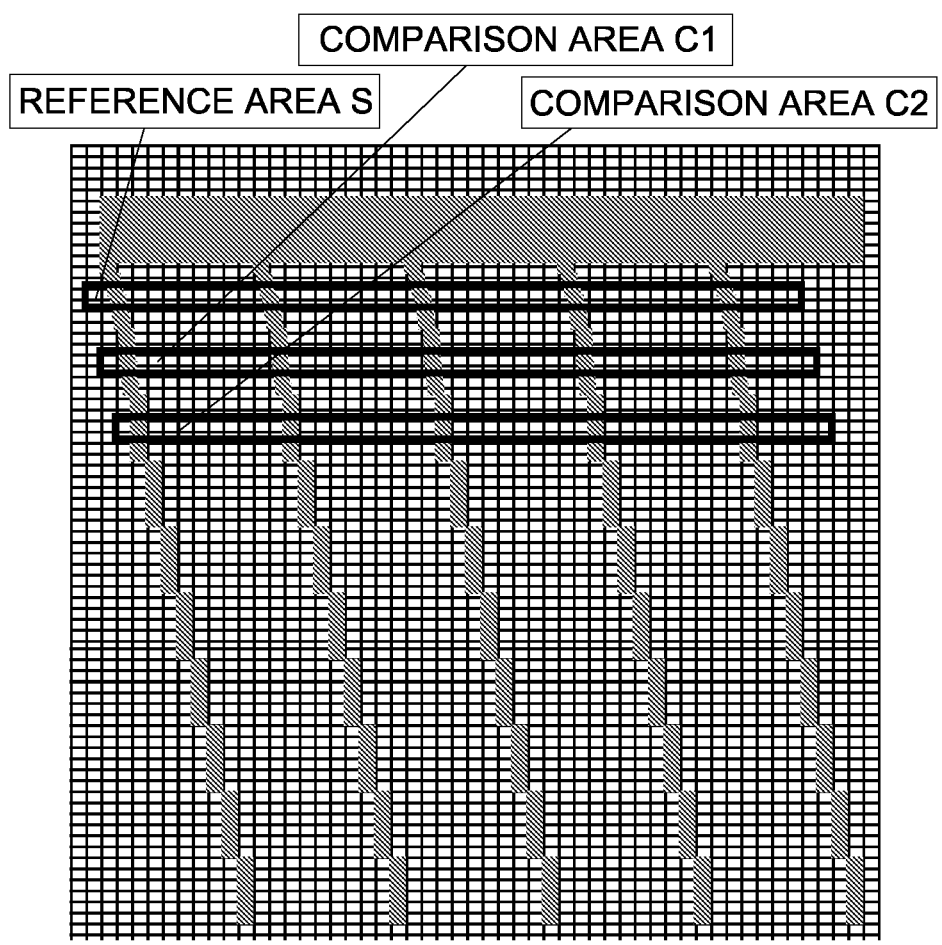
FIG. 24 is a diagram showing a relationship between a read result with image distortion and a reference area and a comparison area in a distortion correction operation.

FIG. 24 is an explanatory diagram showing a third example of a relationship between the reference area and the comparison area in the distortion correction operation with respect to the read image with distortion.

As shown in FIG. 24, even when the comparison areas Ci (where i=1, 2, 3, ... ) that are set in the separating direction from the reference area S are not in contact with each other and are separated from each other, the comparison can be performed by shifting by a predetermined range based on a reliable initial value (design value).

Since the line patterns in each stage are periodic with respect to the lateral direction (X-direction), an operation of the correlation evaluation function E has an extreme value for each line period. Then, a use of an excessively wide predetermined shifting range can entrap the correlation evaluation function E into an extreme value of a different period. Therefore, the comparison operation is performed while substantially keeping the following condition: "the line pattern repetition period">"the predetermined shifting range".

For example, in a case where the reading resolution is low with respect to the line width, such as a printing resolution of 1200 DPI and a reading resolution of 500 DPI, it is desirable that a line period is sufficiently widened (a value of n in "1-on n-off" is increased) if the distortion is large (see FIG. 8).

<<Image After Distortion Correction>>

FIGS. 25A and 25B show examples of the read images after the distortion correction. FIG. 25A shows the image obtained by applying the image distortion correction according to the present embodiment to the read image without any distortion, and the obtained image is approximately consistent with the image shown in FIG. 17A. FIG. 25B shows the image obtained by applying the image distortion correction to the distorted read image. As is apparent from a comparison of FIG. 25B and FIG. 17B, the line positions of the respective stages are approximately aligned in FIG. 25B. Thus, with respect to the read image after the distortion correction, a defective nozzle can be accurately detected by means of the determination area (analytical window) 170 having the similar width as that shown in FIG. 25A.

While the above-described comparison operation involves simply shifting in units of one pixel, when performing a comparison operation after interpolating the comparison area in the lateral direction (in this case, expanding in the lateral direction) as shown in FIGS. 26A and 26B, the distortion can be determined with precision in units smaller than one pixel. For example, by doubling the number of pixels of the original read image through interpolation, the distortion can be corrected in units of 0.5 pixels (in units of ½ pixels) with respect to the reading resolution, and when multiplying the number of pixels of the original read image by four through interpolation, the distortion can be corrected in units of 0.25 pixels (in units of ¼ pixels) with respect to the reading resolution. Such modes enable the detection of defective nozzles to be performed at even higher accuracy.

Moreover, the method of correcting image distortion according to the present embodiment enables correction of the distortion between lines in the test pattern 102 as well as correction of the distortion inside a line. Since it is impossible to identify in advance at what position in a read image an irreproducible image distortion is to occur, the above-described image distortion correction operation (the correlation operation of the reference area and the comparison areas) is favorably performed over an entire read image (on all line blocks in the test pattern). A common reference area can even be used when correcting the distortion with respect to different line blocks.

<Method of Detecting Defective Nozzle from Image After Distortion Correction>

A method of detecting a nozzle that is determined as being non-ejection or having large error in droplet deposition position, using an image after the distortion correction is described.

Figure 27:
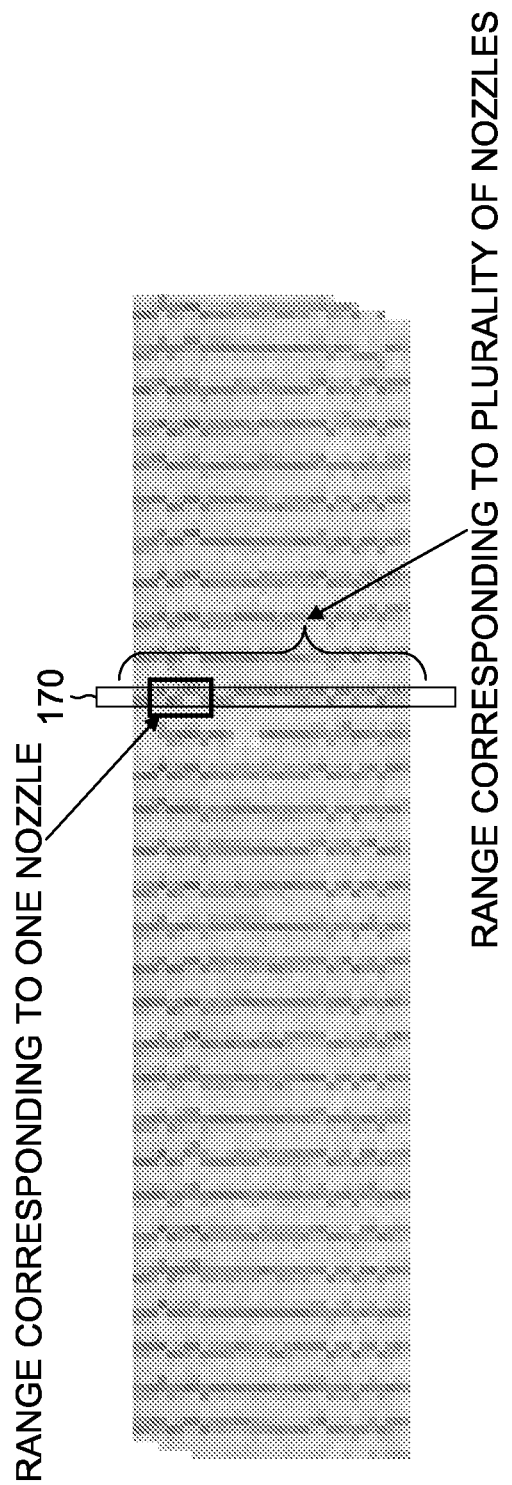
FIG. 27 is an explanatory diagram of a method of determining a defective nozzle from an image after the distortion correction.

FIG. 27 shows a part of the image after the distortion correction. As described with reference to FIG. 25B, in the image after the distortion correction, the lines recorded by the respective nozzles in each nozzle block are aligned approximately in a single row (aligned linearly). In other words, the image positions of the line blocks of the "n+1" stages formed by "1-on n-off" are corrected, and the respective lines ("n+1" number of lines) formed by the "n+1" number of nozzles corresponding to the respective stages are aligned approximately in a single row.

Thus, the lines that are aligned approximately in each row in the longitudinal direction (Y-direction) in FIG. 27 after the distortion correction reflect the droplet ejection results of the plurality of nozzles. The determination area 170 for determining the defective ejection is set for the range that includes the lines aligned approximately in each row and corresponds to the plurality of nozzles. Subsequently, with respect to the lines aligned approximately in each row correspondingly to the plurality of nozzles, an average signal value in the Y-direction (image longitudinal direction) is calculated and an average profile Paveall(x) in the range corresponding to the plurality of nozzles is calculated.

Moreover, for each range (a range corresponding to one nozzle) in each of the lines corresponding to the nozzles in the range corresponding to the plurality of nozzles, an average signal value in the Y-direction is calculated and an average profile Pavenzj(x) of the range corresponding to the one nozzle is calculated. The variable x represents the X-direction position within the range that approximately corresponds to the nozzles in the image (the rectangular range 170 in FIG. 27).

The "nzj" denotes the position of each nozzle by the variable j. In a case of a line row of "n+1" stages according to "1-on n-off" in the range corresponding to the plurality of nozzles, j can range from "1" to "n+1" (or 0 to n).

A correlation calculation (or a difference calculation) is performed between Paveall(x) and Pavenzj(x) of each nozzle that are obtained in this manner. For example, an evaluation value E(nzj) is calculated as the sum of the squares of the differences as follows:

$$E(nzj)=\Sigma(\text{Paveall}(x)-\text{Pavenzj}(x))^2, \quad (5)$$

where $\Sigma$ represents the calculation of the sum with respect to all x values in the operation object range.

When the thus obtained evaluation value deviates from a predetermined value (determination reference value), the subjected nozzle is determined as being "non-ejection" or having "large error in droplet deposition position".

In a case of the non-ejection, Pavenzj(x) takes a gradation value approximately equal to that of white recording sheet (a blank portion of recording sheet) and the calculated evaluation value E(nzj) takes a large value.

Moreover, when the droplet deposition position error is large, since a white recording sheet position of a gradation value and a position of line formed by a nozzle differ between Paveall(x) and Pavenzj(x), the calculated evaluation value E(nzj) takes a large value.

Conversely, when the droplet deposition position error is small (when average profiles are approximately consistent), the calculated evaluation value E(nzj) becomes approximately zero or takes a relatively small value.

Therefore, by comparing the calculated evaluation value E(nzj) with the predetermined value, it is possible to detect the nozzle that is determined as being non-ejection or having large error in droplet deposition position.

<<Addressing Line Block with Inclination>>

As already described with reference to S26 and S28 in FIG. 9, the shading correction data is produced on the basis of the line block position, and the shading is corrected (S26), and the image distortion is then corrected on the basis of the line block position (S28).

When the line block is inclined, processing such as follows is performed.

Figure 28:
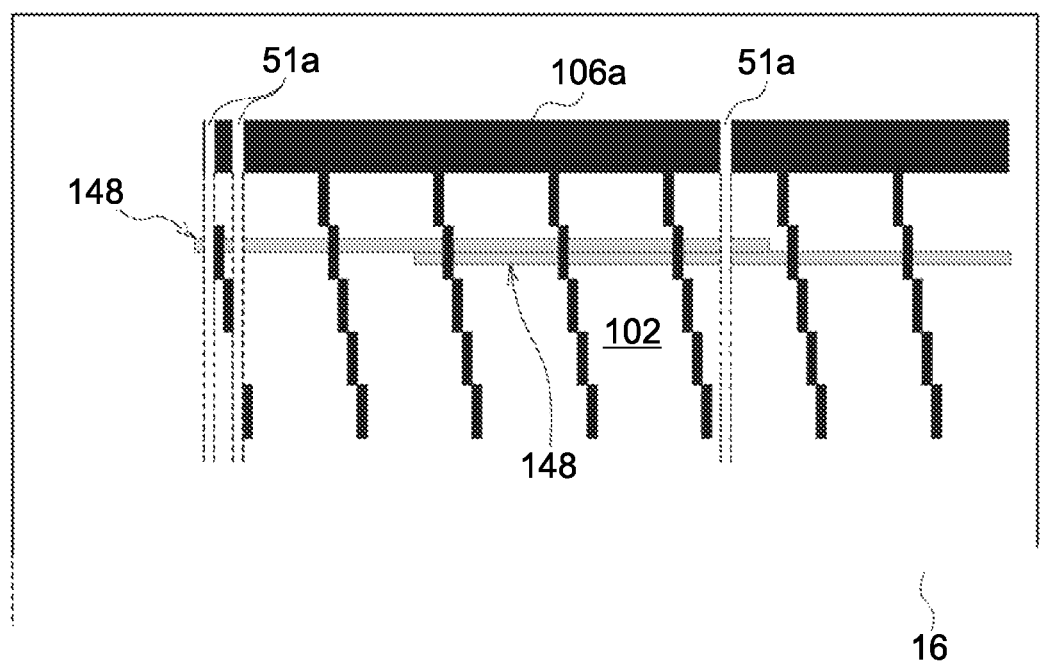
FIG. 28 is a diagram for describing a method of clipping a line block from an inclined read image.

(1) When an image distortion in the longitudinal direction is negligible with respect to a line block clipping height, the analytical areas 148 for producing a profile are partially overlapped with each other inside the line block 146 as shown in FIG. 28, and the profile is produced while the overlapped portion is averaged. Subsequently, the image distortion is corrected.

(2) When an image distortion in the longitudinal direction is not negligible with respect to a line block clipping height, the image distortion is first corrected as an image. Then, from the data after the image distortion correction and on the basis of the line block position, the analytical areas 148 for producing a profile are partially overlapped with each other inside the line block 146 as shown in FIG. 28, and the profile is produced while the overlapped portion is averaged. A presence or absence of the inclination or an amount (angle) of the inclination of a line block is determined from the test pattern corners CL1, CL2, CR1 and CR2.

<<Binarization of Profile>>

Next, the profile in the line block 146 of each stage (see FIG. 11) is binarized by means of a predetermined threshold, and a line position of the test pattern 102 is determined in units of a pixel of the read image (in units of a reading pixel pitch) (S30 in FIG. 9). As the predetermined threshold that is used at this point, a relative value with respect to a blank gradation value can be used, and the predetermined threshold can be altered for each different type of the recording sheet 16. Moreover, in a sheet-dependent case where there is a certain difference in ink density, the threshold can be determined by analyzing an image. A known threshold determining method such as a discriminant analysis method or a percentile method can be used when determining the threshold.

Alternatively, a value relative to the gradation values of the first reference position determination bar 106a and the second reference position determination bar 106b and the blank gradation value can be used. For example, by setting the gradation values of the first reference position determination bar 106a and the second reference position determination bar 106b to 100% and the blank gradation value to 0%, a gradation value corresponding to X% can be adopted as the threshold.

In the binarization of the profile using the threshold, the profile is produced for a selected portion (near a center) in the line block of interest (the set line block) which the portion is not influenced by other line blocks 146 that are adjacent above and below the line block of interest, and the binarization is then performed on the profile.

Figure 29:
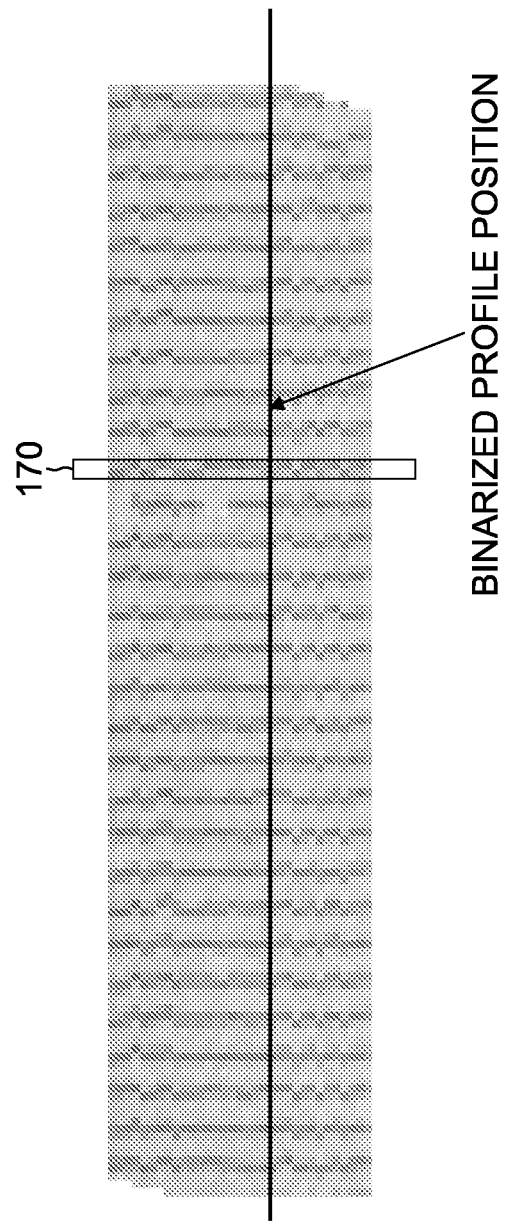
FIG. 29 is an explanatory diagram that shows obtaining a density distribution profile of a position that traverses a line corresponding to each nozzle in an image after the distortion correction.

FIG. 29 shows a portion of the image after the distortion correction which has been described with reference to FIG. 25B, and is an explanatory diagram of the binarization performed on the profile in the image after the distortion correction.

Figure 30:
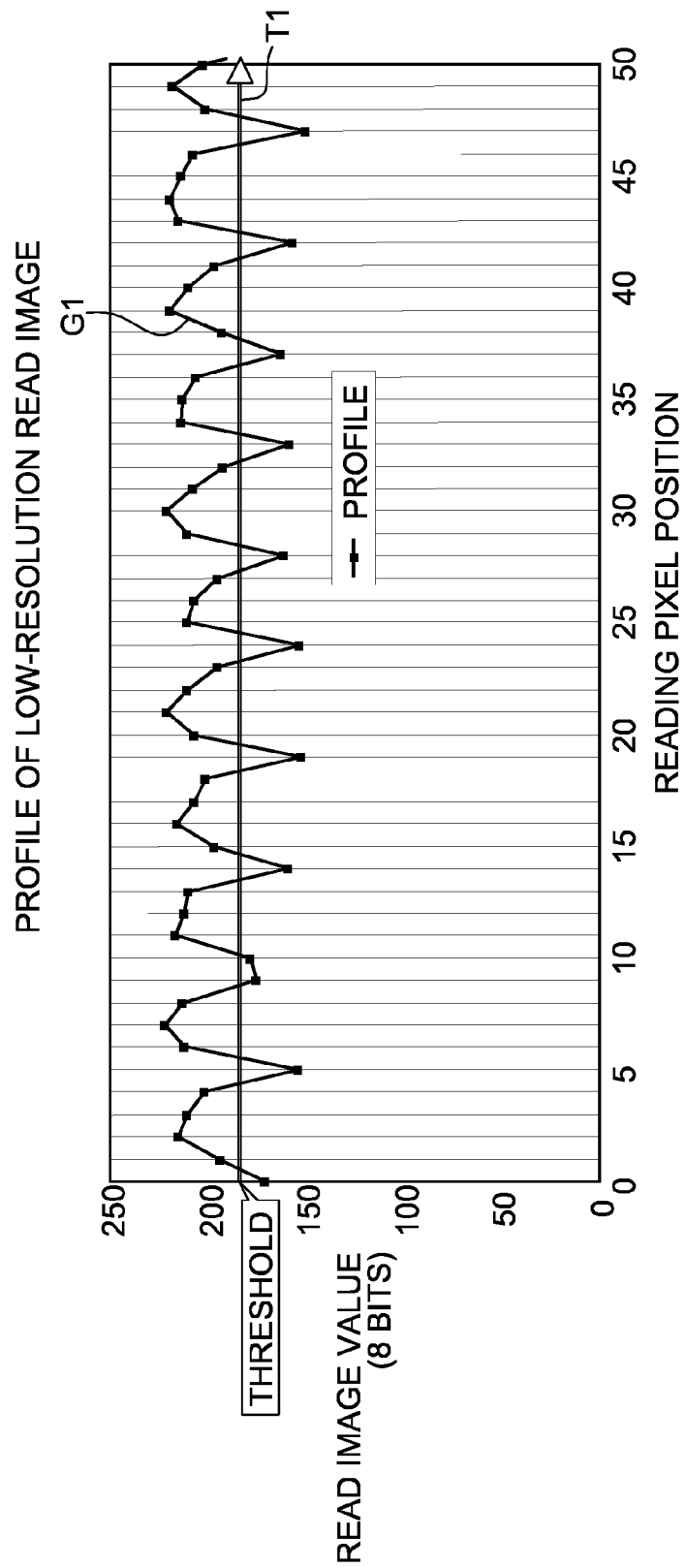
FIG. 30 is a graph showing how a density distribution profile in a line block is binarized.

As shown in FIG. 29, in the image after the distortion correction, the profiles are obtained with respect to the position that traverses the line corresponding to each nozzle (see FIG. 30). The binarization is performed on the profiles using the predetermined threshold, and non-ejection/ejection is determined on the basis of the binarization result.

For the profile, it is favorable from a perspective of accuracy, to average a number of pixels in the Y-direction (the longitudinal direction of the image) instead of one pixel.

Moreover, while FIG. 29 illustrates the situation where the profile binarizing position is set at the position that traverses the line corresponding to each nozzle among the plurality of lines (lines corresponding to the plurality of nozzles) aligned in the approximately single row in the longitudinal direction, the profiles are also respectively obtained for positions that traverse respective lines corresponding to other nozzles.

FIG. 30 shows the binarization of the profiles. In FIG. 30, the abscissa of the graph G1 represents the pixel position of the read image (read position) of the test pattern 102, and the ordinate of the graph G1 represents the read signal value (in 8 bits) of the gradation value (optical density) of the line pattern read image. The threshold T1 is set in the graph G1, and the pixel position on the lower side of the threshold T1 (having the smaller read signal than the threshold T1) is assumed to be a "line position". When a plurality of continuous pixels are on the lower side of the threshold, a central pixel among the plurality of pixels is set as the line position. In addition, for example, when two continuous pixels are on the lower side of the threshold, the pixel position indicating the smaller value (gradation value) can be set as the line position.

<<Correspondence of Line Positions and Nozzles>>

After the line positions are obtained for all lines in each line block LBk (where k=1, 2, 3, . . . ) according to the procedure described above, a relationship between each line position and a corresponding nozzle number is identified on the basis of the relationship between each line position and the reference positions (test pattern corners CL1, CR1, CL2 and CR2 (see FIG. 11)). The angle of rotation and the magnification errors in the X-direction and Y-direction of the test pattern 102 are calculated from the positional relationship among the test pattern corners CL1, CR1, CL2 and CR2.

Figure 31:
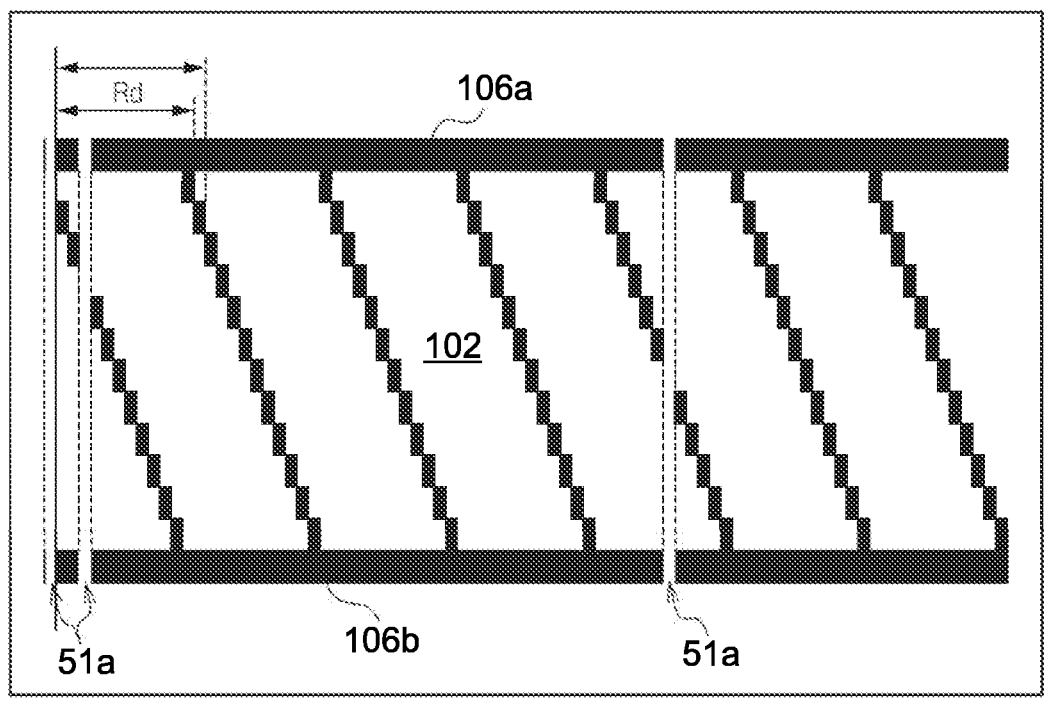
FIG. 31 is a diagram schematically showing a method of calculating a relative position of the test pattern on the read image.

Since the layout of the test pattern 102 can be treated as known information, the position (the relative position from the test pattern corner CL1 (equivalent)) of each nozzle within the line block position is obtained from the known test pattern design information. As shown in FIG. 31, the relative position Rd of each line position of the test pattern 102 on the read image from the test pattern corner CL1 is calculated on the basis of the magnification errors and the angle of rotation described above, and the coordinates on the profile can be obtained from the calculated value Rd.

Thus, the correspondence relationship between the position of each line and the nozzle position is identified (S32 in FIG. 9).

Subsequently, as described with reference to FIGS. 25A to 27, a defective nozzle is identified on the basis of the density distribution in the determination area 170 including the line (S34 in FIG. 9). Alternatively, as described with reference to FIGS. 29 and 30, a defective nozzle is identified by means of the binarization of the profile.

According to the present embodiment, the irreproducible image fluctuation (e.g., image distortion and shading) can be effectively corrected and the defective nozzle can be detected with high accuracy. Moreover, according to the present embodiment, a dedicated area for the shading correction need not be prepared on the recording medium, and data for the shading correction can be acquired from the test pattern image area for the defective nozzle detection. Accordingly, it is possible to avoid increasing the area of the pattern area that has no commercial value from the user's perspective.

Next, an example of an image forming apparatus having the image correcting function using the above-described detecting function of defective nozzles and the detection results thereof is described.

Inkjet Recording Apparatus

Figure 32:
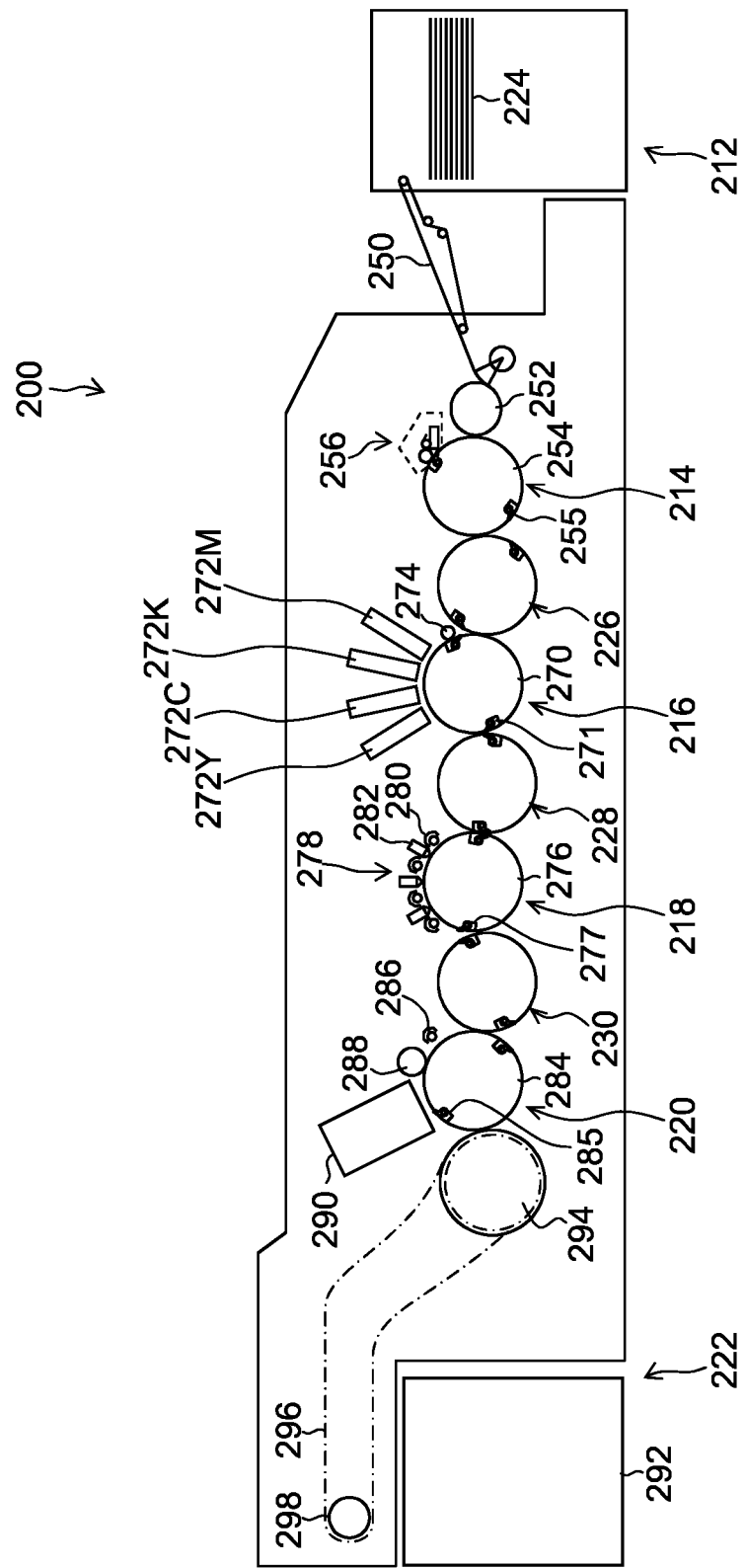
FIG. 32 is an overall configuration diagram of an inkjet recording apparatus according to an embodiment of the present invention.

FIG. 32 is a diagram showing a configuration of an inkjet recording apparatus 200 according to an embodiment of the present invention. The inkjet recording apparatus 200 includes a recording sheet supply unit 212, a treatment liquid deposition unit 214, an image forming unit 216, a drying unit 218, a fixing unit 220, and a recording sheet output unit 222. The inkjet recording apparatus 200 is an on-demand droplet ejection type image forming apparatus which deposits ink of a plurality of colors from inkjet heads (corresponding to "image forming heads") 272M, 272K, 272C and 272Y onto a recording sheet 224 held by a pressure drum (image forming drum 270) of the image forming unit 216 to form a desired color image.

<Recording Sheet Supply Unit>

The recording media 224 that are sheets of recording paper are stacked on the recording sheet supply unit 212. The recording sheets 224 are supplied one sheet at a time from a recording sheet supply tray 250 of the recording sheet supply unit 212 to the treatment liquid deposition unit 214. While sheets of paper (cut paper) are used as the recording media 224 in the present embodiment, a configuration can also be adopted in which continuous-form paper (a roll of paper) is cut down to a necessary size and then supplied.

<Treatment Liquid Deposition Unit>

The treatment liquid deposition unit 214 is a mechanism which deposits treatment liquid onto a recording surface of the recording sheet 224. The treatment liquid contains a coloring material aggregating agent which aggregates the coloring material (in the present embodiment, the pigment) in the ink deposited by the image forming unit 216, and the separation of the ink into the coloring material and the solvent is promoted due to the treatment liquid and the ink making contact with each other.

The treatment liquid deposition unit 214 includes a recording sheet supply drum 252, a treatment liquid drum 254 and a treatment liquid application device 256. The treatment liquid drum 254 has hook-shaped holding devices (grippers) 255 arranged on the circumferential surface thereof, and is devised in such a manner that the leading end of the recording sheet 224 can be held by gripping the recording sheet 224 between the hook of the holding device 255 and the circumferential surface of the treatment liquid drum 254. The treatment liquid drum 254 can have suction holes, which are arranged in the circumferential surface thereof and are connected to a suction device to hold the recording sheet 224 by suction through the suction holes. By this means, it is possible to hold the recording sheet 224 tightly against the circumferential surface of the treatment liquid drum 254.

The treatment liquid application device 256 is arranged to face the circumferential surface of the treatment liquid drum 254, to the outside of the drum. The treatment liquid application device 256 includes: a treatment liquid vessel, in which the treatment liquid is stored; an anilox roller, which is partially immersed in the treatment liquid in the treatment liquid vessel; and a rubber roller, which transfers a dosed amount of the treatment liquid to the recording sheet 224, by being pressed against the anilox roller and the recording sheet 224 on the treatment liquid drum 254. By means of the treatment liquid application device 256, it is possible to apply the treatment liquid to the recording sheet 224 while dosing the amount of the treatment liquid. In the present embodiment, the composition is described which uses the roller-based application method, but the deposition method of the treatment liquid is not limited to this, and it is also possible to employ various other methods, such as a spray method, an inkjet method, or the like.

The recording sheet 224 onto which the treatment liquid has been deposited by the treatment liquid deposition unit 214 is transferred from the treatment liquid drum 254 to the image forming drum 270 of the image forming unit 216 through an intermediate conveyance unit 226.

<Image Forming Unit>

The image forming unit 216 includes the image forming drum 270, a recording sheet pressing roller 274, and the inkjet heads 272M, 272K, 272C and 272Y. Similarly to the treatment liquid drum 254, the image forming drum 270 has hook-shaped holding devices (grippers) 271 on the circumferential surface thereof. The image forming drum 270 according to the present embodiment is configured so that the grippers 271 are arranged at two locations on the circumferential surface thereof at 180 degree intervals with respect to a direction of rotation and two sheets of the recording media 224 can be conveyed by one rotation.

A large number of suction holes (not shown) are formed in a predetermined pattern on the circumferential surface of the image forming drum 270. As air is sucked inward through the suction holes, the recording sheet 224 is held by suction onto the circumferential surface of the image forming drum 270. Moreover, in addition to the configuration in which the recording sheet 224 is held by the negative pressure suction, for example, a configuration in which the recording sheet 224 is held by electrostatic attraction can also be adopted.

Each of the inkjet heads 272M, 272K, 272C and 272Y is a full-line type inkjet image forming head having a length corresponding to the maximum width of the image forming region on the recording sheet 224, and a row of nozzles for ejecting droplets of the ink arranged throughout the whole width of the image forming region is formed in the ink ejection surface of the head. The inkjet heads 272M, 272K, 272C and 272Y are arranged so as to extend in the direction perpendicular to the conveyance direction of the recording sheet 224 (the direction of rotation of the image forming drum 270).

When droplets of the corresponding colored ink are ejected from the inkjet heads 272M, 272K, 272C and 272Y and deposited onto the recording surface of the recording sheet 224 which is held tightly on the image forming drum 270, the ink makes contact with the treatment liquid which has previously been deposited on the recording surface by the treatment liquid deposition unit 214, the coloring material (pigment) dispersed in the ink is aggregated, and a coloring material aggregate is thereby formed. By this means, flowing of the coloring material, and the like, on the recording sheet 224 is prevented, and an image is formed on the recording surface of the recording sheet 224.

The recording sheet 224 is conveyed at a uniform speed by the image forming drum 270, and it is possible to record the image on the image forming region of the recording sheet 224 by performing just one operation of moving the recording sheet 224 and the respective inkjet heads 272M, 272K, 272C and 272Y relatively to each other in the conveyance direction (in other words, by the single sub-scanning operation). This single-pass type image formation with such the full line type (page-wide) heads can achieve a higher printing speed compared with a case of a multi-pass type image formation with the serial (shuttle) type of heads which move back and forth reciprocally in the direction (the main scanning direction) perpendicular to the conveyance direction of the recording sheet (sub-scanning direction), and hence it is possible to improve the print productivity.

Although the configuration with the CMYK standard four colors is described in the present embodiment, combinations of the ink colors and the number of colors are not limited to those. As required, light inks, dark inks and/or special color inks can be added. For example, a configuration in which inkjet heads for ejecting droplets of light-colored inks such as light cyan and light magenta are added is possible. Moreover, there are no particular restrictions of the sequence in which the heads of respective colors are arranged.

The recording sheet 224 onto which the image has been formed in the image forming unit 216 is transferred from the image forming drum 270 to a drying drum 276 of the drying unit 218 through an intermediate conveyance unit 228.

<Drying Unit>

The drying unit 218 is a mechanism which dries the water content contained in the solvent that has been separated by the action of aggregating the coloring material, and includes the drying drum 276 and a solvent drying device 278. Similarly to the treatment liquid drum 254, the drying drum 276 has hook-shaped holding devices (grippers) 277 arranged on the circumferential surface thereof. The solvent drying device 278 is arranged in a position opposing the circumferential surface of the drying drum 276, and is constituted of a plurality of halogen heaters 280 and hot air spraying nozzles 282 disposed respectively between the halogen heaters 280. It is possible to achieve various drying conditions, by suitably adjusting the temperature and air flow volume of the hot air flow which is blown from the hot air flow spraying nozzles 282 toward the recording sheet 224, and the temperatures of the respective halogen heaters 280.

The recording sheet 224 on which the drying process has been carried out in the drying unit 218 is transferred from the drying drum 276 to a fixing drum 284 of the fixing unit 220 through an intermediate conveyance unit 230.

<Fixing Unit>

The fixing unit 220 includes the fixing drum 284, a halogen heater 286, a fixing roller 288 and an in-line sensor 290. Similarly to the treatment liquid drum 254, the fixing drum 284 has hook-shaped holding devices (grippers) 285 arranged on the circumferential surface thereof.

By means of the rotation of the fixing drum 284, the recording sheet 224 is conveyed with the recording surface facing to the outer side, and preliminary heating by the halogen heater 286, a fixing process by the fixing roller 288 and inspection by the in-line sensor 290 are carried out in respect of the recording surface of the recording sheet 224.

The fixing roller 288 is a roller member for melting self-dispersing polymer particles contained in the ink and thereby causing the ink to form a film, by applying heat and pressure to the dried ink, and is composed so as to apply heat and pressure onto the recording sheet 224. More specifically, the fixing roller 288 is disposed so as to press against the fixing drum 284, in such a manner that a nip is created between the fixing roller 288 and the fixing drum 284. By this means, the recording sheet 224 is pressed between the fixing roller 288 and the fixing drum 284 and is nipped with a prescribed nip pressure (for example, 0.15 MPa), whereby the fixing process is carried out.

Furthermore, the fixing roller 288 is constituted of a heated roller formed by a metal pipe of aluminum, or the like, having good thermal conductivity, which internally incorporates a halogen lamp, and is controlled to a prescribed temperature (for example, 60° C. to 80° C.). By heating the recording sheet 224 by means of this heating roller, thermal energy to achieve the temperature equal to or greater than the Tg temperature (glass transition temperature) of the latex contained in the ink is applied and the latex particles are thereby caused to melt. By this means, fixing is performed by pressing the latex particles into the undulations in the recording sheet 224, as well as leveling the undulations in the image surface and obtaining a glossy finish On the other hand, the in-line sensor 290 is a measuring device which measures an ejection failure check pattern, an image density, defect in the image, and the like of the image (including a test pattern for non-ejection detection, a test pattern for density correction, and the printed image) recorded on the recording sheet 224. A CCD line sensor or the like is applied as the in-line sensor 290. The in-line sensor 290 corresponds to the test pattern reading unit 136 described with reference to FIG. 3.

Instead of the ink which contains a high-boiling-point solvent and polymer particles (thermoplastic resin particles), it is also possible to use ink containing a monomer which can be polymerized and cured by irradiation of ultraviolet (UV) light. In this case, the inkjet recording apparatus 200 includes a UV light irradiation unit for irradiating the ink on the recording sheet 224 with UV light, instead of the heat and pressure fixing unit (fixing roller 288) by means of the heat roller. When using ink containing an active light-curable resin in this way, such as a ultraviolet-curable resin, the fixing unit 220 is provided with a device which irradiates the active light, such as a UV lamp or an ultraviolet LD (laser diode) array, instead of the fixing roller 288 for heat fixing.

<Recording Sheet Output Unit>

The recording sheet output unit 222 is arranged subsequently to the fixing unit 220. The recording sheet output unit 222 includes an output tray 292, a transfer drum 294, conveyance belts 296 and a tensioning roller 298, and the conveyance belts 296 and the tensioning roller 298 are arranged between the output tray 292 and the fixing drum 284 so as to oppose same. The recording sheet 224 is sent to the conveyance belt 296 by the transfer drum 294 and output to the output tray 292. Although the details of the recording sheet conveyance mechanism constituted of the conveyance belts 296 are not illustrated, the leading end portion of the recording sheet 224 after the printing is held by a gripper on a bar (not shown) which spans between the endless conveyance belts 296, and the recording sheet 224 is conveyed over the output tray 292 due to the rotation of the conveyance belts 296.

Furthermore, although not illustrated in FIG. 32, the inkjet recording apparatus 200 according to the present embodiment further includes: an ink storing and loading unit, which supplies the ink to the inkjet heads 272M, 272K, 272C and 272Y; and a device which supplies the treatment liquid to the treatment liquid deposition unit 214; a head maintenance unit, which carries out cleaning (nozzle surface wiping, purging, nozzle suctioning, nozzle cleaning and the like) of the inkjet heads 272M, 272K, 272C and 272Y; a position determination sensor, which determines the position of the recording sheet 224 in the recording sheet conveyance path; a temperature sensor, which measures the temperature of the respective units of the apparatus, and the like.

<Structure of Inkjet Head>

Next, the structure of the inkjet heads is described. The respective inkjet heads 272M, 272K, 272C and 272Y have the same structure, and a reference numeral 350 is hereinafter designated to any of the heads.

Figure 33A:
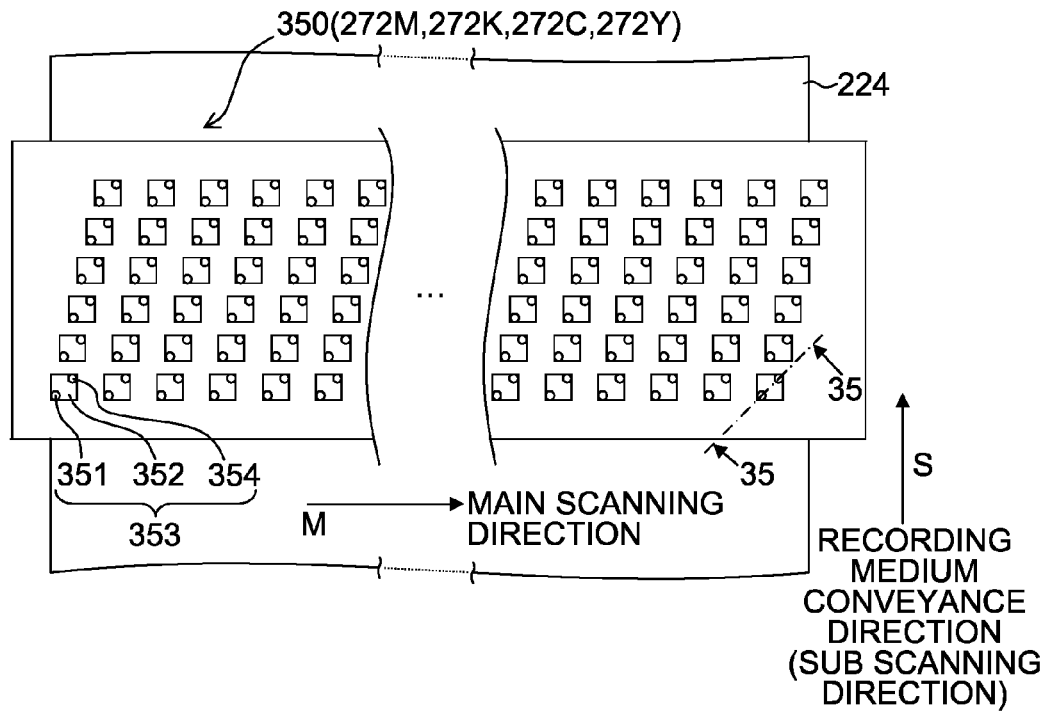
FIGS. 33A and 33B are plan perspective views showing a configuration example of an inkjet head.
Figure 33B:
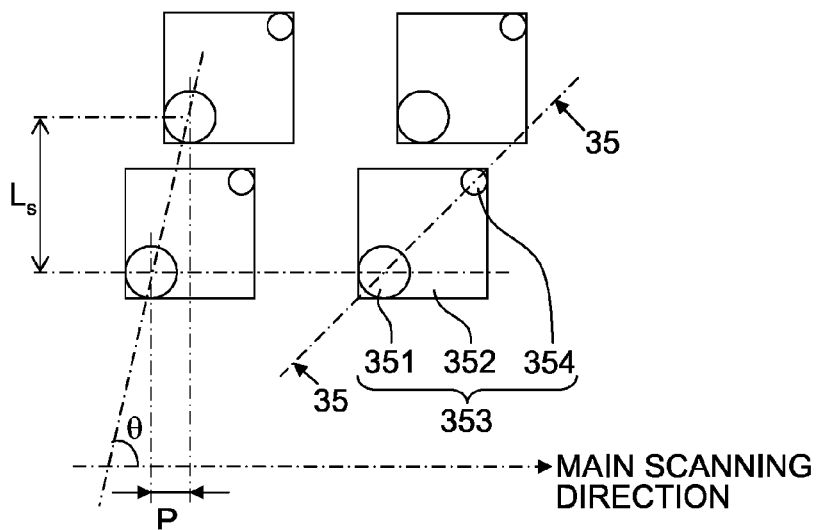
Figure 34A:
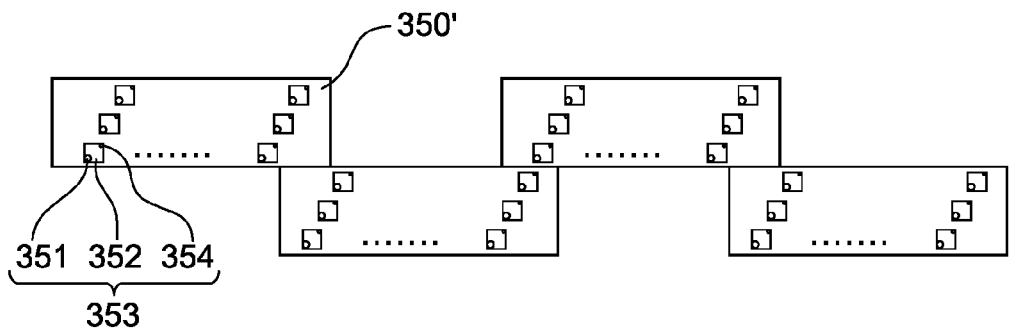
FIGS. 34A and 34B are diagrams showing examples of inkjet heads configured by coupling together a plurality of head modules.
Figure 34B:
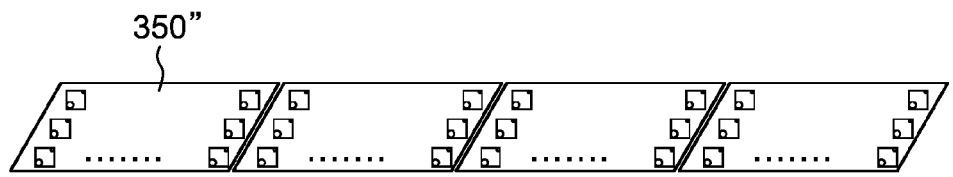
Figure 35:
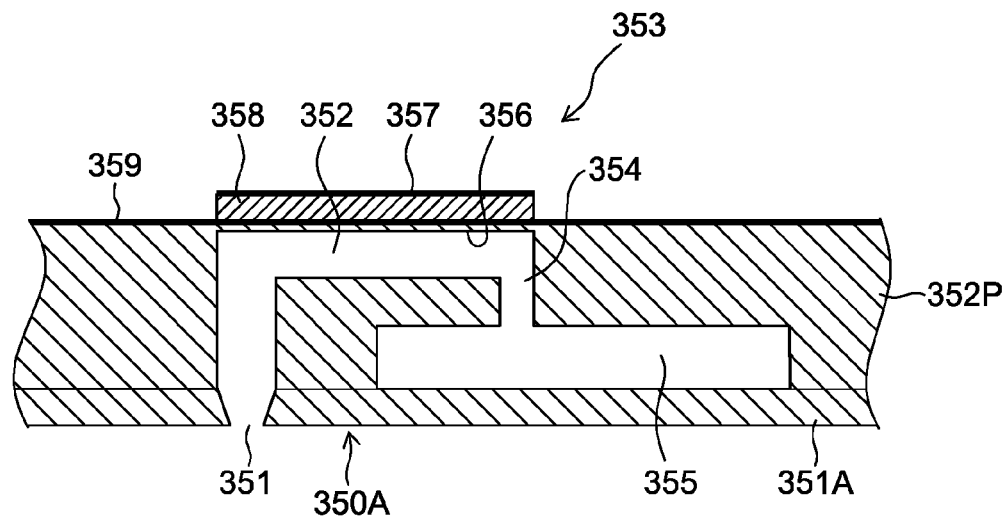
FIG. 35 is a cross-sectional view taken along line 35-35 in FIGS. 33A and 33B.

FIG. 33A is a plan perspective diagram illustrating an example of the structure of the head 350, and FIG. 33B is a partial enlarged diagram of same. FIGS. 34A and 34B show arrangement examples of a plurality of head modules forming the heads 350. FIG. 35 is a cross-sectional diagram (a cross-sectional diagram along line 35-35 in FIGS. 33A and 33B) illustrating an inner structure of a liquid droplet ejection element for one channel being a recording element unit (ejection element unit).

As illustrated in FIGS. 33A and 33B, the head 350 according to the present embodiment has a structure in which a plurality of ink chamber units (liquid droplet ejection elements) 353, each of which includes a nozzle 351 forming an ink droplet ejection aperture, a pressure chamber 352 corresponding to the nozzle 351, and the like, are disposed two-dimensionally in the form of a staggered matrix, and hence the effective nozzle interval as orthographically projected (the projected nozzle pitch) in the lengthwise direction of the head (the direction perpendicular to the recording sheet conveyance direction) is reduced and high nozzle density is achieved.

In order to form a row of nozzles that is equal to or longer than a length accommodating an entire width of an image-formation range of the recording sheet 224 in the direction (the direction of an arrow M; corresponding to the "x-direction") which is substantially perpendicular to the feed direction of the recording sheet 224 (the direction of an arrow S; corresponding to the "y-direction"), as shown in FIG. 34A, short head modules 350', each of which has a plurality of nozzles 351 in a two-dimensional arrangement, are disposed in a staggered pattern to form the long linear head, for example. Alternatively, as shown in FIG. 34B, a mode can be adopted in which head modules 350" are aligned in a single row and joined together.

With a single-pass printing full-line print head, in addition to a case where an entire surface of the recording sheet 224 is set as an image-formation range, when a portion on the surface of the recording sheet 224 is set as an image-formation range, a row of nozzles necessary for forming image within a predetermined image-formation range need only be formed.

The pressure chamber 352 provided to each nozzle 351 has substantially a square planar shape (see FIGS. 33A and 33B), and has an outlet port for the nozzle 351 at one of diagonally opposite corners and an inlet port (supply port) 354 for receiving the supply of the ink at the other of the corners. The planar shape of the pressure chamber 352 is not limited to this embodiment and can be various shapes including quadrangle (rhombus, rectangle, etc.), pentagon, hexagon, other polygons, circle, and ellipse.

As illustrated in FIG. 35, the head 350 is configured by stacking and joining together a nozzle plate 351A, in which the nozzles 351 are formed, a flow channel plate 352P, in which the pressure chambers 352 and flow channels including a common flow channel 355 are formed, and the like. The nozzle plate 351A constitutes a nozzle surface (ink ejection surface) 350A of the head 350 and has formed therein the plurality of two-dimensionally arranged nozzles 351 communicating respectively to the pressure chambers 352.

The flow channel plate 352P constitutes lateral side wall parts of the pressure chambers 352 and serves as a flow channel formation member, which forms the supply port 354 as a limiting part (the narrowest part) of the individual supply channel leading the ink from the common flow channel 355 to the pressure chamber 352. FIG. 35 is simplified for the convenience of explanation, and the flow channel plate 352P can be structured by stacking a plurality of substrates.

The nozzle plate 351A and the flow channel plate 352P can be made of silicon and formed in the prescribed shapes by means of the semiconductor manufacturing process.

The common flow channel 355 is connected to an ink tank (not shown), which is a base tank for supplying ink, and the ink supplied from the ink tank is delivered through the common flow channel 355 to the pressure chambers 352.

A piezoelectric actuator (piezoelectric element) 358 having an individual electrode 357 is connected on a diaphragm 356 constituting a part of face (the ceiling face in FIG. 35) of the pressure chamber 352. The diaphragm 356 in the present embodiment is made of silicon (Si) having a nickel (Ni) conductive layer serving as a common electrode 359 corresponding to lower electrodes of a plurality of piezoelectric actuators 358, and also serves as the common electrode of the piezoelectric actuators 358, which are disposed on the respective pressure chambers 352. The diaphragm 356 can be formed by a non-conductive material such as resin; and in this case, a common electrode layer made of a conductive material such as metal is formed on the surface of the diaphragm member. It is also possible that the diaphragm is made of metal (an electrically-conductive material) such as stainless steel (SUS), which also serves as the common electrode.

When a drive voltage is applied to the individual electrode 357, the piezoelectric actuator 358 is deformed, the volume of the pressure chamber 352 is thereby changed, and the pressure in the pressure chamber 352 is thereby changed, so that the ink inside the pressure chamber 352 is ejected through the nozzle 351. When the displacement of the piezoelectric actuator 358 is returned to its original state after the ink is ejected, new ink is refilled in the pressure chamber 352 from the common flow channel 355 through the supply port 354.

As illustrated in FIG. 33B, the plurality of ink chamber units 353 having the above-described structure are arranged in the prescribed matrix arrangement pattern in a line direction along the main scanning direction and a column direction oblique at a given angle of θ, which is not orthogonal to the main scanning direction, and thereby the high density nozzle head is formed in the present embodiment. In this matrix arrangement, the nozzles 351 can be regarded to be equivalent to those substantially arranged linearly at a fixed pitch P=Ls/tan θ along the main scanning direction, where Ls is a distance between the nozzles adjacent in the sub-scanning direction.

In implementing the present invention, the mode of arrangement of the nozzles 351 in the head 350 is not limited to the embodiments shown in the drawings, and various nozzle arrangement structures can be employed. For example, instead of the matrix arrangement as described with reference to FIGS. 33A and 33B, it is also possible to use a V-shaped nozzle arrangement, or an undulating nozzle arrangement, such as zigzag configuration (W-shape arrangement), which repeats units of V-shaped nozzle arrangements.

The devices which generate pressure (ejection energy) applied to eject droplets from the nozzles in the inkjet head are not limited to the piezoelectric actuators (piezoelectric elements), and can employ various pressure generation devices (ejection energy generation devices), such as heaters (heating elements) in a thermal system (which uses the pressure resulting from film boiling by the heat of the heaters to eject ink), electrostatic actuators, and various actuators in other systems. According to the ejection system employed in the head, the corresponding energy generation devices are arranged in the flow channel structure body.

<Control System>

Figure 36:
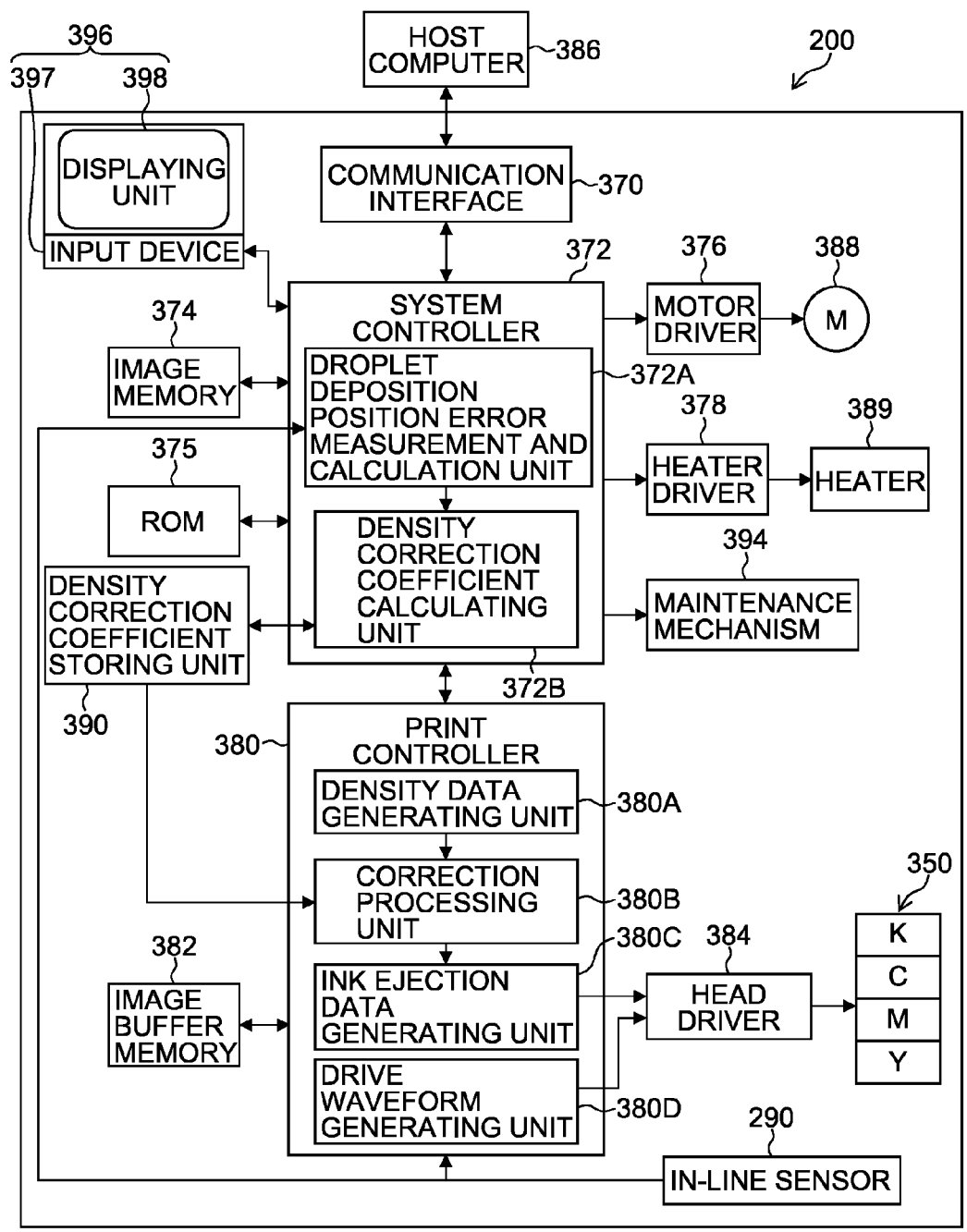
FIG. 36 is a block diagram showing a configuration of a control system of the inkjet recording apparatus.

FIG. 36 is a block diagram showing the system configuration of the inkjet recording apparatus 200. As shown in FIG. 36, the inkjet recording apparatus 200 includes a communication interface 370, a system controller 372, an image memory 374, a ROM 375, a motor driver 376, a heater driver 378, a print controller 380, an image buffer memory 382, a head driver 384, and the like.

The communication interface 370 is an interface unit (image input device) for receiving image data sent from a host computer 386. A serial interface such as USB (Universal Serial Bus), IEEE1394, Ethernet, and wireless network, or a parallel interface such as a Centronics interface can be used as the communication interface 370. A buffer memory (not shown) can be mounted in this portion in order to increase the communication speed.

The image data sent from the host computer 386 is received by the inkjet recording apparatus 200 through the communication interface 370, and is temporarily stored in the image memory 374. The image memory 374 is a storage device for storing images inputted through the communication interface 370, and the data is written and read to and from the image memory 374 through the system controller 372. The image memory 374 is not limited to a memory composed of semiconductor elements, and a hard disk drive or another magnetic medium can be used.

The system controller 372 is constituted of a central processing unit (CPU) and peripheral circuits thereof, and the like, and functions as a control device for controlling the whole of the inkjet recording apparatus 200 in accordance with a prescribed program, as well as a calculation device for performing various calculations. More specifically, the system controller 372 controls the various sections, such as the communication interface 370, image memory 374, motor driver 376, heater driver 378, and the like, as well as controlling communications with the host computer 386 and writing and reading to and from the image memory 374 and the ROM 375, and it also generates control signals for controlling the motor 388 and heater 389 of the conveyance system.

Furthermore, the system controller 372 includes a droplet deposition position error measurement and calculation unit 372A, which performs calculation processing for generating data indicating the positions of defective nozzles, droplet deposition position error data, data indicating the density distribution (density data) and other data from the image data read in from the test chart by the in-line sensor (in-line determination unit) 290, and a density correction coefficient calculation unit 372B, which calculates density correction coefficients from the information relating to the measured droplet deposition position error and the density information. The processing functions of the droplet deposition position error measurement and calculation unit 372A and the density correction coefficient calculation unit 372B can be achieved by means of an ASIC (application specific integrated circuit), software, or a suitable combination of same. Further, the system controller 372 functions as the device for analyzing the read image which has been described with reference to FIG. 9. The density correction coefficient data obtained by the density correction coefficient calculation unit 372B is stored in a density correction coefficient storage unit 390.

The program executed by the CPU of the system controller 372 and the various types of data (including data for droplet deposition to form the test chart for detecting defective nozzles, information on defective nozzles, and the like) which are required for control procedures are stored in the ROM 375. A rewriteable storage device, such as an EEPROM can be employed as the ROM 375. By utilizing the storage region of the ROM 375, the ROM 375 can be configured to be able to serve also as the density correction coefficient storage unit 390.

The image memory 374 is used as a temporary storage region for the image data, and it is also used as a program development region and a calculation work region for the CPU.

The motor driver (drive circuit) 376 drives the motor 388 of the conveyance system in accordance with commands from the system controller 372. The heater driver (drive circuit) 378 drives the heater 389 of the drying unit 218 and the like in accordance with commands from the system controller 372.

The print controller 380 is a control unit which functions as a signal processing device for performing various image treatment processes, corrections, and the like, in accordance with the control implemented by the system controller 372, in order to generate a signal for controlling droplet ejection from the image data (multiple-value input image data) in the image memory 374, as well as functioning as a drive control device which controls the ejection driving of the head 350 by supplying the thus generated ink ejection data to the head driver 384.

More specifically, the print controller 380 includes a density data generating unit 380A, a correction processing unit 380B, an ink ejection data generating unit 380C, and a drive waveform generating unit 380D. These functional units 380A to 380D can be realized by means of an ASIC, software or a suitable combination of same.

The density data generating unit 380A is a signal processing device which generates initial density data for the respective ink colors, from the input image data, and it carries out density conversion processing (including UCR processing and color conversion) and, where necessary, it also performs pixel number conversion processing.

The correction processing unit 380B is a processing device which performs density correction calculations using the density correction coefficients stored in the density correction coefficient storage unit 390, and it carries out the non-uniformity correction processing for eliminating an image defect attributable to a defective nozzle or the like.

The ink ejection data generating unit 380C is a signal processing device including a halftoning device which converts the corrected image data (density data) generated by the correction processing unit 380B into binary or multiple-value dot data, and the ink ejection data generating unit 380C carries out binarization (multiple-value conversion) processing on the image data.

The ink ejection data generated by the ink ejection data generating unit 380C is supplied to the head driver 384, which accordingly controls the ink ejection operation of the head 350.

The drive waveform generating unit 380D is a device for generating drive signal waveforms in order to drive the piezoelectric actuators 358 (see FIG. 35) corresponding to the respective nozzles 351 of the head 350. The signal (drive waveform) generated by the drive waveform generating unit 380D is supplied to the head driver 384. The signal outputted from the drive waveforms generating unit 380D can be digital waveform data, or an analog voltage signal.

The drive waveform generating unit 380D selectively generates a recording waveform drive signal and an abnormal nozzle detection waveform drive signal. The various waveform data is stored in advance in the ROM 375 and, when needed, waveform data to be used is selectively outputted. The inkjet recording apparatus 200 in the present embodiment adopts a drive system in which a common driving power waveform signal is applied to each piezoelectric actuator 358 of the module that constitutes the head 350, and a switching element (not shown) connected to the individual electrode of each piezoelectric actuator 358 is turned on and off according to the ejection timing of each nozzle 351 to cause the nozzle 351 corresponding to the piezoelectric actuator 358 to eject ink.

The print controller 380 is provided with the image buffer memory 382, which temporarily stores data such as image data and parameters during image data processing performed by the print controller 380. While FIG. 36 shows a mode in which the image buffer memory 382 is attached to the print controller 380, the image memory 374 can serve also as the image buffer memory 382. Moreover, a mode can be adopted in which the print controller 380 and the system controller 372 are integrated and configured by a single processor.

To give a general description of the sequence of processing from image input to print output, image data to be printed is inputted from an external source through the communication interface 370, and is accumulated in the image memory 374. At this stage, multiple-value RGB image data is stored in the image memory 374, for example.

In the inkjet recording apparatus 200, an image which appears to have a continuous tonal graduation to the human eye is formed by changing the deposition density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 374 is sent to the print controller 380 through the system controller 372, and is converted to the dot data for each ink color by a half-toning technique, using dithering, error diffusion, or the like, by passing through the density data generating unit 380A, the correction processing unit 380B and the ink ejection data generating unit 380C of the print controller 380.

Dot data is generally generated by performing color conversion and halftone processing on image data. Color conversion is processing for converting image data expressed as sRGB and the like (for example, RGB 8-bit image data) into color data of each color of ink used by the inkjet printer (in the present embodiment, KCMY color data). Halftone processing is processing for applying an error diffusion method, a threshold matrix method, and the like, on color data of each color generated by color conversion in order to convert the color data into dot data of each color (in the present embodiment, KCMY dot data).

More specifically, the print controller 380 performs processing for converting the input RGB image data into dot data for the four colors of K, C, M and Y. Processing for correcting ejection failure in order to correct an image defect attributable to a defective nozzle is performed when the processing of conversion to dot data is carried out.

The dot data thus generated by the print controller 380 is stored in the image buffer memory 382. The dot data of the respective colors is converted into CMYK droplet ejection data for ejecting ink from the nozzles of the head 350, thereby establishing the ink ejection data to be printed.

The head driver 384 includes a power amplifier circuit and outputs drive signals for driving the piezoelectric actuators 358 corresponding to the nozzles 351 of the head 350 in accordance with the print contents, on the basis of the ink ejection data and the drive waveform signals supplied by the print controller 380. A feedback control system for maintaining constant drive conditions in the head can be included in the head driver 384.

By supplying the drive signals outputted by the head driver 384 to the head 350 in this way, droplets of the ink are ejected from the corresponding nozzles 351. By controlling the ink ejection from the print head 350 in accordance with the conveyance of the recording sheet 224, an image is formed on the recording sheet 224.

As described above, the ejection volume and the ejection timing of the ink droplets from the respective nozzles are controlled through the head driver 384, on the basis of the ink ejection data generated by implementing prescribed signal processing in the print controller 380, and the drive signal waveform. By this means, prescribed dot size and dot positions can be achieved.

As described with reference to FIG. 32, the in-line sensor (determination unit) 290 is a block including the image sensor, which reads in the image printed on the recording sheet 224, performs various signal processing operations, and the like, and determines the print situation (presence/absence of ejection, variation in droplet deposition, optical density, and the like), these determination results being supplied to the print controller 380 and the system controller 372.

The print controller 380 implements various corrections with respect to the head 350, on the basis of the information obtained from the in-line sensor (determination unit) 290, according to requirements, and it implements control for carrying out cleaning operations (nozzle restoring operations), such as preliminary ejection, suctioning, or wiping, as and when necessary.

The maintenance mechanism 394 includes members used to head maintenance operation, such as an ink receptacle, a suction cap, a suction pump, a wiper blade, and the like.

The operating unit 396 which forms a user interface is constituted of an input device 397, through which an operator (user) can make various inputs, and a display unit 398. The input device 397 can employ various formats, such as a keyboard, mouse, touch panel, buttons, or the like. The operator is able to input print conditions, select image quality modes, input and edit additional information, search for information, and the like, by operating the input device 397, and is able to check various information, such as the input contents, search results, and the like, through a display on the display unit 398. The display unit 398 also functions as a warning notification device which displays a warning message, or the like.

Moreover, the color conversion processing unit 110, the non-ejection nozzle correction image processing unit 112, the halftone processing unit 114, the image memory 116, the image analyzing unit 124, the test pattern combining unit 118, the head driver 128, the defective nozzle determining unit 130, the defective nozzle detecting unit 132, the defective nozzle information accumulating unit 126, the defective ejection correction determining unit 122, the correction information setting unit 120 and the like, which are described with reference to FIG. 3, are configured as a single component or a combination of a plurality of components of the control system shown in FIG. 36.

The image memory 116, the head driver 128 and the head 50 shown in FIG. 3 correspond to the image memory 374, the head driver 384 and the head 350 shown in FIG. 36.

A combination of the system controller 372 and the print controller 380 shown in FIG. 36 functions as the "reference area setting device", the "comparison area setting device", the "correlation operation device", the "distortion correction value determining device", the "image distortion correcting device", the "defective recording element determining device", the "interpolating device", the "analytical area setting device", the "histogram generating device", the "shading characteristics information generating device", the "shading correcting device", the "test pattern output control device", the "image correcting device", and the "recording control device".

It is also possible to adopt a mode in which the host computer 386 is equipped with all or a portion of the processing functions carried out by the droplet deposition position error measurement and calculation unit 372A, the density correction coefficient calculation unit 372B, the density data generating unit 380A and the correction processing unit 380B described with reference to FIG. 36.

As described above, with the inkjet recording apparatus according to the present embodiment, since the deposition positions of the ink droplets ejected from the respective nozzles on the recording sheet can be accurately grasped by analyzing the read image of the test pattern, the position of the defective nozzle can be identified with high accuracy. Thus, precise correction that compensates for the image defect attributable to the defective nozzle can be performed on the input image data. An overall processing flow based on the various processes described above is described below.

<Description of Image Printing Process>

Figure 37:
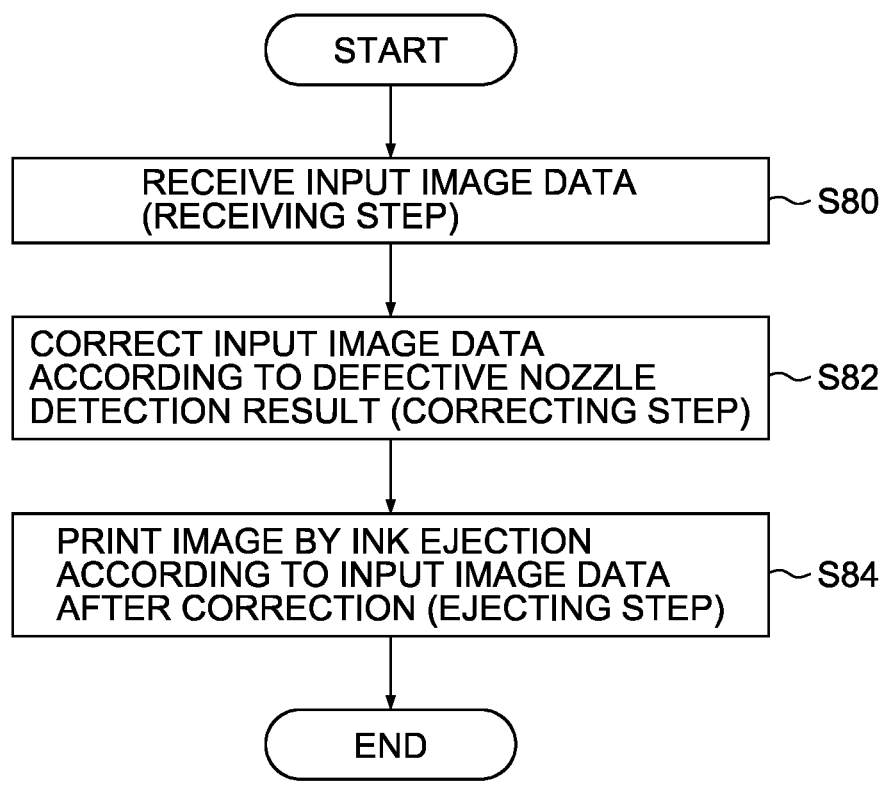
FIG. 37 is a flow chart showing a flow of image printing according to the present embodiment.

FIG. 37 is a flow chart showing an entire flow of image printing. When input image data of a desired image that is sent from the host computer 386 (see FIG. 36) is received through the communication interface (receiving device) 370 (the receiving step S80 in FIG. 37), the input image data is corrected (the correcting step S82 in FIG. 37) through color conversion (with the color conversion processing unit 110 shown in FIG. 3), defective nozzle correction (with the non-ejection nozzle correction image processing unit 112), halftone processing (with the halftone processing unit 114), and test pattern combining (with the test pattern combining unit 118).

Subsequently, the head driver 384 (the head driver 128 in FIG. 3) drives the heads 350 to eject ink droplets from the nozzles 351 toward the recording sheet 224 according to the corrected input image data (the ejection step S84 in FIG. 37), the desired image can be precisely printed on the recording sheet 224.

In the correcting step (S82) described above, ejection of ink droplets from a defective nozzle is compensated by another normal nozzle and, at the same time, the defective nozzle correction (with the non-ejection nozzle correction image processing unit 112) for preventing ink droplets from being ejected from the defective nozzle is performed on the input image data. The defective nozzle correction is performed at the defective nozzle detecting unit 132 (see FIG. 3) on the basis of the read image data of the test pattern 102 sent from the test pattern reading unit 136.

Moreover, there are various methods for performing ejection suspension on the defective nozzle and compensating an image-formation defect of the defective nozzle by another nozzle such as (1) correcting an output image and (2) increasing ejection signal strength and correcting an ejection dot diameter to a larger size.

(1) Method of Correcting Output Image

When an image formation density in a periphery of a non-ejection correction nozzle is $D^{default}$, the image-formation density of the non-ejection correction nozzle can be increased and white streak visibility can be reduced by setting an image density at the non-ejection correction nozzle to $D^{No\ Print}$ ($>D^{default}$). A ratio between the image densities can be defined as a non-ejection correction nozzle image density amplification amount $P^{density}$.

(2) Method of Increasing Ejection Signal and Increasing Ejection Dot Diameter

When an image formation dot diameter in a periphery of a non-ejection correction nozzle is $R^{default}$, the image-formation density of the non-ejection correction nozzle can be increased and white streak visibility can be reduced by setting a dot diameter at the non-ejection correction nozzle to $R^{No\ Print}(>R^{default})$. A ratio between the dot diameters can be defined as a non-ejection correction nozzle dot diameter amplification amount $P^{density}$ If amounts of increase of the image-formation density by the non-ejection correction nozzle such as the non-ejection correction nozzle image density amplification amount $P^{density}$ and the non-ejection correction nozzle dot diameter amplification amount $P^{dot}$ in the two representative examples described above or similar compensation amounts are collectively defined as a non-ejection correction parameter P, then image correction is performed using the non-ejection correction parameter P.

<First Modification>

While the image distortion is corrected after the shading correction in FIG. 9, a sequence of the shading correction step and the image distortion correction step can be transposed.

<Second Modification>

The 1-on n-off line pattern has been exemplified as the test pattern 102. However, in addition to a line corresponding to a single nozzle, a pattern can be used in which band-like blocks or the like in which a plurality of (for example, two to three) lines are integrally combined are aligned approximately regularly.

<Configuration example Using Off-Line Scanner>

While the embodiment in which the in-line sensor 290 built in the inkjet recording apparatus 200 is used to read the test pattern and the device for analyzing the read image is also mounted in the inkjet recording apparatus 200 has been described with reference to FIGS. 32 to 37, the present invention can be implemented also by a configuration in which the print result of the test pattern is read using an off-line scanner that is independent of the inkjet recording apparatus 200 and the data of the read image is analyzed by an apparatus such as a personal computer.

<Recording Medium>

"Recording medium" is a collective term for media on which dots are recorded by the recording elements and include variously named media such as a print medium, a recorded medium, an image-formed medium, an image-receiving medium, and an ejection-receiving medium. When implementing the present invention, materials, shapes, and the like of the recording medium are not particularly restricted. The present invention can be applied to various types of media regardless of material or shape including continuous-form paper, a cut sheet, a printer label, resin sheets such as an OHP sheet, film, cloth, a print board on which a wiring pattern or the like can be formed, and a rubber sheet.

<Device for Relatively Moving Head and Recording Sheet>

While the configuration in which the recording medium is conveyed with respect to the stationary heads has been exemplified in the embodiment described above, the present invention can also be implemented with a configuration in which heads are moved with respect to a stationary recording medium. While single-pass full-line recording heads are normally disposed along a direction perpendicular to a feed direction (conveyance direction) of a recording medium, a mode is also possible in which the heads are disposed along an oblique direction having a predetermined angle with respect to a direction perpendicular to the conveyance direction.

<Modification of Head Configuration>

While the inkjet recording apparatus using the page-wide full-line heads having the rows of nozzles which are long enough to accommodate the entire width of the recording medium has been described in the embodiment, a range of application of the present invention is not restricted thereto. The present invention can also be applied to an inkjet recording apparatus which moves short recording heads such as serial (shuttle scan) heads and which records an image by performing a plurality of scanning operations using the heads. Moreover, when forming a color image using the inkjet print heads, a plurality of heads can be disposed respectively for the plurality of color inks (recording fluids), or a configuration can be adopted in which a single recording head is capable of ejecting a plurality of color inks.

<Application of the Present Invention>

In the embodiments described above, the application of the present invention to the inkjet recording apparatus for graphic printing has been described, but the scope of application of the present invention is not limited to this. For example, the present invention can be applied widely to inkjet systems which form various shapes or patterns using liquid function material, such as a wire printing apparatus, which forms an image of a wire pattern for an electronic circuit, manufacturing apparatuses for various devices, a resist printing apparatus, which uses resin liquid as a functional liquid for ejection, a color filter manufacturing apparatus, a fine structure forming apparatus for forming a fine structure using a material for material deposition, or the like.

<Utilization of Non-Inkjet Recording Heads>

While the inkjet recording apparatus has been exemplified as the image forming apparatus using the recording head in the description above, a range of application of the present invention is not restricted thereto. In addition to the inkjet systems, the present invention can also be applied to various types of image forming apparatuses which perform dot recording such as a thermal transfer recording apparatus having a recording head that uses a thermal element as a recording element, an LED electronic photograph printer having a recording head that uses an LED element as a recording element, and a silver halide photography printer having an LED line exposure head.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A defective recording element detecting apparatus, comprising:
   a read image data acquiring device which acquires read image data of a test pattern recorded on a recording medium by a recording head having a plurality of recording elements;
   a reference area setting device which sets a reference area including a part of the test pattern on a read image representing image contents of the read image data;
   a comparison area setting device which sets a comparison area to be compared with the reference area on the read image;
   a correlation operation device which performs a correlation operation between the comparison area and the reference area while relatively shifting the comparison area with respect to the reference area;

a distortion correction value determining device which determines a distortion correction value for correcting an amount of deviation of an image in the comparison area with respect to an image in the reference area, from a result of the correlation operation;

an image distortion correcting device which corrects image distortion of the read image using the distortion correction value; and a defective recording element determining device which identifies a defective recording element among the plurality of recording elements of the recording head in accordance with the read image having been corrected by the image distortion correcting device.

2. The defective recording element detecting apparatus as defined in claim 1, wherein:

the test pattern includes an image content in which a pattern having a resemblance appears repetitively along a direction in which the comparison area is relatively shifted; and the correlation operation device performs the correlation operation between the comparison area and the reference area by relatively shifting the comparison area within a predetermined range that is smaller than a repetition interval of the pattern having the resemblance.

3. The defective recording element detecting apparatus as defined in claim 1, wherein the test pattern includes a line pattern in which lines recorded by the recording elements are regularly aligned.

4. The defective recording element detecting apparatus as defined in claim 1, wherein:

the correlation operation device calculates a correlation evaluation function while the comparison area is relatively shifted with respect to the reference area, and fords a shift amount with which a highest correlation is obtained in accordance with a calculation result of the correlation evaluation function; and the distortion correction value determining device determines the distortion correction value from the shift amount with which the highest correlation is obtained.

5. The defective recording element detecting apparatus as defined in claim 1, further comprising:

an interpolating device which performs interpolation of image data of the comparison area along the shifting direction, wherein the correlation operation device performs the correlation operation after the interpolation by the interpolating device.

6. The defective recording element detecting apparatus as defined in claim 1, further comprising:

an analytical area setting device which sets analytical areas for analyzing shading characteristics of the read image, at a plurality of positions in the read image;

a histogram generating device which generates a histogram of image signals inside each of the analytical areas set in the image area by the analytical area setting device;

a shading characteristic information generating device which obtains a gradation value corresponding to a predetermined percentage point of the histogram of each of the analytical areas and generates distribution information indicating the shading characteristics of the read image; and a shading correcting device which performs shading correction of the read image in accordance with the distribution information indicating the shading characteristics, wherein the defective recording element determining device identifies the defective recording element in accordance with results of the shading correction by the shading correcting device and the image distortion correction by the image distortion correcting device.

7. The defective recording element detecting apparatus as defined in claim 1, wherein:

the recording head is an inkjet head provided with the recording elements each of which includes a nozzle that functions as a droplet ejection port and an ejection energy generating element that generates ejection energy for ejecting a droplet from the nozzle; and the defective recording element determining device identifies the defective recording element rendering at least one abnormality of a recording position error exceeding a predetermined position error permissible range, inability to record due to non-ejection, and an error of a volume of ejected droplet exceeding a predetermined volume error permissible range.

8. An image forming apparatus, comprising:

the defective recording element detecting apparatus as defined in claim 1;

the recording head which has the plurality of recording elements;

a medium conveying device which relatively moves the recording medium with respect to the recording head;

a test pattern output control device which controls a recording operation of the recording head so that the test pattern is recorded on the recording medium by the recording head;

an image reading device which reads the test pattern recorded on the recording medium and converts the read test pattern into electronic image data to produce the read image data to be acquired by the read image data acquiring device;

a storage device which stores information on the defective recording element identified by the defective recording element determining device;

an image correcting device which suspends a recording operation of the identified defective recording element and corrects image data to record a target image by compensating a recording defect rendered by the defective recording element using at least one of the recording elements other than the defective recording element; and a recording control device which performs image recording by controlling recording operations of the recording elements other than the defective recording element, according to the image data corrected by the image correcting device.

9. A defective recording element detecting method, comprising the steps of:

acquiring read image data of a test pattern recorded on a recording medium by a recording head having a plurality of recording elements;

setting a reference area including a part of the test pattern on a read image representing image contents of the read image data;

setting a comparison area to be compared with the reference area on the read image;

performing a correlation operation between the comparison area and the reference area while relatively shifting the comparison area with respect to the reference area;

determining a distortion correction value for correcting an amount of deviation of an image in the comparison area with respect to an image in the reference area, from a result of the correlation operation;

correcting image distortion of the read image using the distortion correction value; and identifying a defective recording element among the plurality of recording elements of the recording head in accordance with the read image having been corrected in the image distortion correcting step.

10. The defective recording element detecting method as defined in claim 9, further comprising the steps of:

recording the test pattern on the recording medium by the recording head having the plurality of recording elements; and generating the read image data by reading, using an image reading device, the test pattern recorded on the recording medium in the test pattern recording step.

11. An image forming method comprising the defective recording element detecting method as defined in claim 9, the method further comprising the steps of:

relatively moving the recording medium with respect to the recording head having the plurality of recording elements to form an image on the recording medium by the recording head;

controlling a recording operation of the recording head so that the test pattern is recorded on the recording medium by the recording head;

reading the test pattern recorded on the recording medium and converting the read test pattern into electronic image data to produce the read image data to be acquired in the read image data acquiring step;

storing information on the defective recording element identified in the defective recording element determining step, in a storage device;

suspending a recording operation of the identified defective recording element, and correcting image data to record a target image by compensating a recording defect rendered by the defective recording element using at least one of the recording elements other than the defective recording element; and performing image recording by controlling recording operations of the recording elements other than the defective recording element, according to image data corrected in the image correcting step.

* * * * *